US009053500B2

(12) United States Patent
Etesse et al.

(10) Patent No.: US 9,053,500 B2
(45) Date of Patent: Jun. 9, 2015

(54) INTERNET-BASED EDUCATION SUPPORT SYSTEM AND METHOD WITH MULTI-LANGUAGE CAPABILITY

(75) Inventors: Christopher E. Etesse, Burke, VA (US); Jennifer R. West, Arlington, VA (US); Michael L. Chasen, Chevy Chase, MD (US)

(73) Assignee: BLACKBOARD INC., Washington, DC (US)

(*) Notice: Subject to any disclaimer, the term of this patent is extended or adjusted under 35 U.S.C. 154(b) by 934 days.

(21) Appl. No.: 10/443,149

(22) Filed: May 22, 2003

(65) Prior Publication Data

US 2004/0030781 A1 Feb. 12, 2004

Related U.S. Application Data

(63) Continuation-in-part of application No. 09/608,280, filed on Jun. 30, 2000, now Pat. No. 6,988,138.

(60) Provisional application No. 60/141,283, filed on Jun. 30, 1999, provisional application No. 60/141,864, filed on Jul. 1, 1999, provisional application No. 60/187,890, filed on Mar. 8, 2000, provisional application No. 60/382,079, filed on May 22, 2002, provisional application No. 60/404,276, filed on Aug. 19, 2002, provisional application No. 60/406,304, filed on Aug. 28, 2002, provisional application No. 60/449,507, filed on Feb. 25, 2003.

(51) Int. Cl.
*G06F 15/173* (2006.01)
*G06Q 30/06* (2012.01)
*G09B 5/00* (2006.01)
*G09B 7/02* (2006.01)

(52) U.S. Cl.
CPC ........ *G06Q 30/06* (2013.01); *G09B 5/00* (2013.01); *G09B 7/02* (2013.01)

(58) Field of Classification Search
USPC ........... 709/225, 223; 705/26; 455/414.2, 403
See application file for complete search history.

(56) References Cited

U.S. PATENT DOCUMENTS

| 5,441,415 A | 8/1995 | Lee et al. |
|---|---|---|
| 5,727,950 A | 3/1998 | Cook et al. |
| 5,810,605 A | 9/1998 | Siefert |
| 5,933,841 A | 8/1999 | Schumacher et al. |
| 6,039,575 A * | 3/2000 | L'Allier et al. ............... 434/323 |
| 6,161,139 A * | 12/2000 | Win et al. ...................... 709/225 |

(Continued)

OTHER PUBLICATIONS

Jastrow, David. Dec. 1, 1997. "CBT Systems Roll Out New Training Pack for Microsoft." *Computer Reseller News*.

(Continued)

*Primary Examiner* — Tammy Nguyen
(74) *Attorney, Agent, or Firm* — McDermott Will & Emery LLP

(57) ABSTRACT

A system, method and medium for determining and displaying one or more locales on a web browser. The method can include the steps of providing in the web browser a plurality of display regions, associating a locale with a plurality of web pages, selecting by a user a user-specified locale, associating the locale with one or more particular display regions, and determining whether the locale is mandatory. If the locale is mandatory, content associated with the user-specified locale can be translated to content associated with the locale. Finally, content is displayed in the one or more particular frames in accordance with the locale.

38 Claims, 50 Drawing Sheets

Machine Scalability Using Load Balancing

(56) References Cited

U.S. PATENT DOCUMENTS

| | | | |
|---|---|---|---|
| 6,199,099 B1* | 3/2001 | Gershman et al. | 709/203 |
| 6,212,555 B1* | 4/2001 | Brooks et al. | 709/219 |
| 6,427,063 B1* | 7/2002 | Cook et al. | 434/350 |
| 6,442,574 B1 | 8/2002 | Schumacher et al. | |
| 6,665,376 B1* | 12/2003 | Brown | 379/85 |
| 7,272,377 B2 | 9/2007 | Cox et al. | 455/403 |
| 7,620,643 B2* | 11/2009 | Erhard et al. | 1/1 |
| 2001/0044728 A1* | 11/2001 | Freeman et al. | 705/1 |
| 2001/0044833 A1* | 11/2001 | Eisendrath et al. | 709/217 |
| 2003/0144922 A1* | 7/2003 | Schrantz | 705/26 |
| 2003/0149557 A1* | 8/2003 | Cox et al. | 704/2 |
| 2005/0192999 A1* | 9/2005 | Cook et al. | 707/102 |
| 2006/0098583 A1* | 5/2006 | Baker et al. | 370/252 |
| 2008/0261572 A1* | 10/2008 | Tsui et al. | 455/414.2 |
| 2009/0112845 A1* | 4/2009 | Byers et al. | 707/5 |

OTHER PUBLICATIONS

Menefee, Sami. Dec. 24, 1997. "Using the Internet to Advance Education." *Newsbytes News Network*.

Gill, Dee. Dec. 22, 1997. "Online Learning in the Off Hours." *Business Week*. New York: The McGraw Hill Companies, Inc.

"Unicode and the Web." www.iath.virginia.edu/babble/uniweb.html. 2002. "Unicode, An Overview." *Basis Technology*. www.basistech.com/papers/unicode/overview.html.

Jun. 11, 2003. "Universal Character Set." *Wikipedia: The Free Encyclopedia*. www.wikipedia.org/wiki/UCS-2.

* cited by examiner

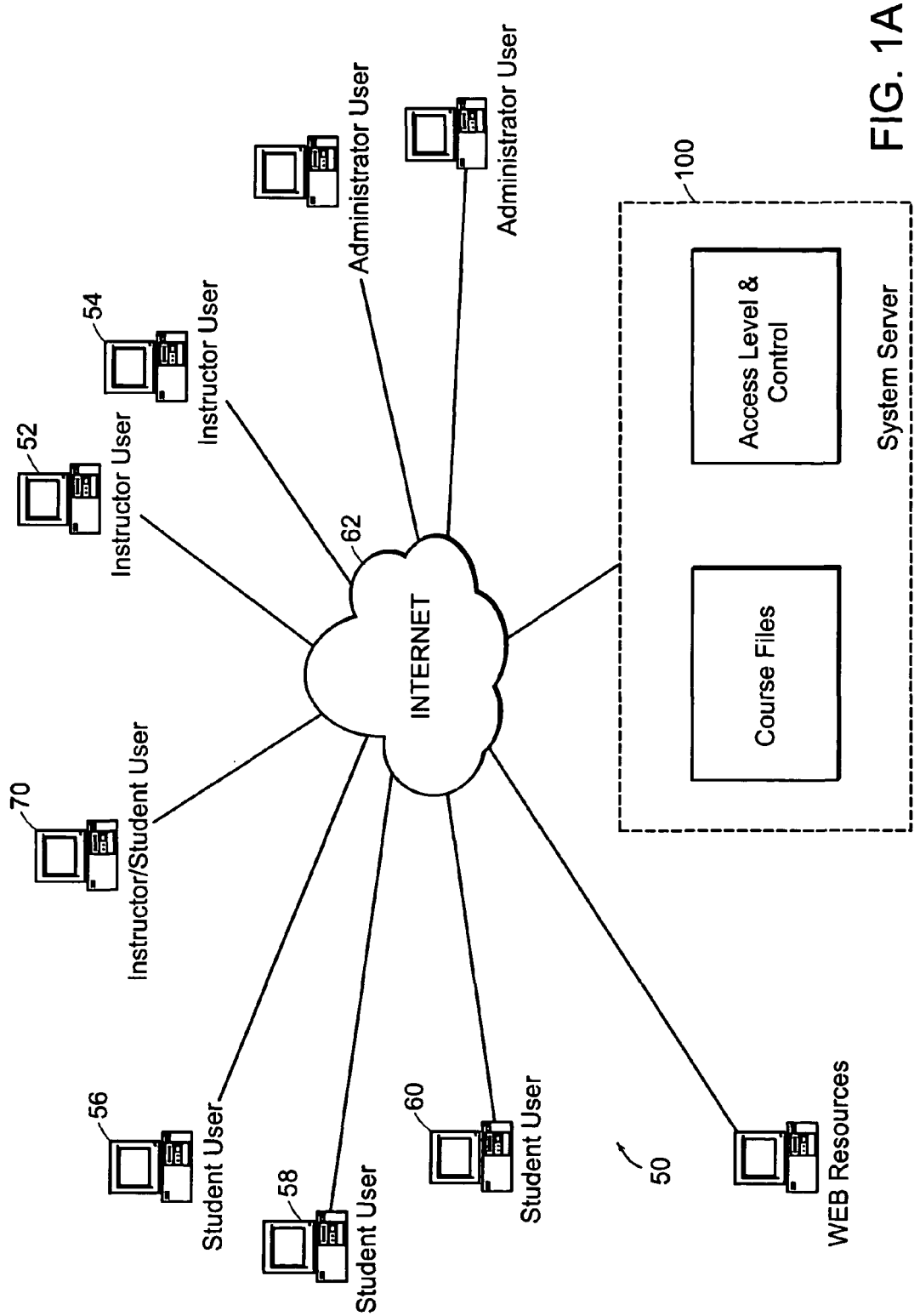

Machine Scalability Using Load Balancing

John Wayne
Student Tools

Student Drop Box

Use your student drop box to submit files to your instructor. Also, your instructor can return your files to you with comments attached.

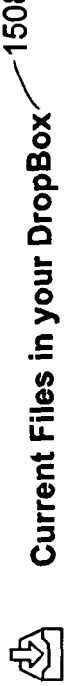 Current Files in your DropBox —1508

Note: If you want to save a file, right click on the Link Name and choose *Save Link As*

| File Name | Link Name | File Size | Status |
|---|---|---|---|
| none | none | none | none |

[Remove Files]—1510

 Add File to DropBox

Click the *Browse* button to select the file to attach from your computer.
Be sure to specify a linkname for your file.

File to Upload: _____ 1502  [Browse...] —1504

Name of Link to File: _____

(Example: *Homework One, Assignment One*)

[Send File to Instructor] —1506

◁Back

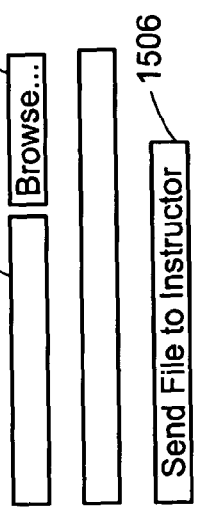

Course Gradebook

Students whose last names begin with: Show All
Items that are grouped by: Show All  [Go]

| ✓ - completed | | Participation | Space 301-c Quiz | Assignment #1 | Total Points |
|---|---|---|---|---|---|
| - no info | | Participation | Quiz | Assignment | |
| I - taken, but ungraded | | Edit | Edit | Edit | |
| Arnold, Jeremy | Edit | - | - | - | 0 |
| Baggins, T | Edit | 80 | 50 | 50 | 315 |
| Bell, Norman | Edit | - | 10 | - | 10 |
| Cane, Jon | Edit | 72 | 25 | 35 | 251 |
| Chasen, Michael | Edit | - | 25 | - | 25 |
| Chi, Timothy | Edit | 92 | 35 | 50 | 311 |
| Clark, Andrea | Edit | 100 | 20 | 50 | 285 |
| Clark, Jim | Edit | 75 | - | 50 | 220 |
| Cox, Meg | Edit | - | 25 | - | 25 |
| Davies, Greg | Edit | - | - | - | 0 |
| Witkowski, Francis | Edit | - | 10 | - | 10 |
| Points Possible | | 100 | 35 | 50 | 335 |

FIG. 22

COURSES > INTRODUCTION TO MUSIC > CONTROL PANEL > COURSE STATISTIC > REPORT

  Course Statistics

Statistics Generated on Thursday, February 24, 2000 11:26:28AM
Note: You may have to reload/refresh this page for the images to be correct. 2300

Total Number of Accesses per Area —— 2302
Number of Accesses over Time —————— 2304
User Accesses per Hour of the Day —— 2306
User Accesses per Day of the Week ——— 2308
Total Accesses by User ——————— 2310

Total Number of Accesses per Area —— 2302

| Area Name | Hits | Percent |
|---|---|---|
| Content Areas | 139 | 83.2 % |
| Communication Areas | 10 | 5.98 % |
| Group Areas | | 0 % |
| Student Areas | 15 | 8.98 % |
| Total | 167 | 100 % |

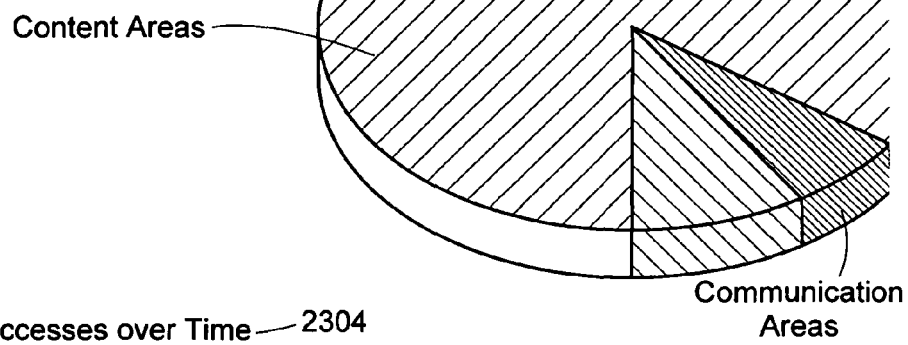

Number of Accesses over Time —— 2304

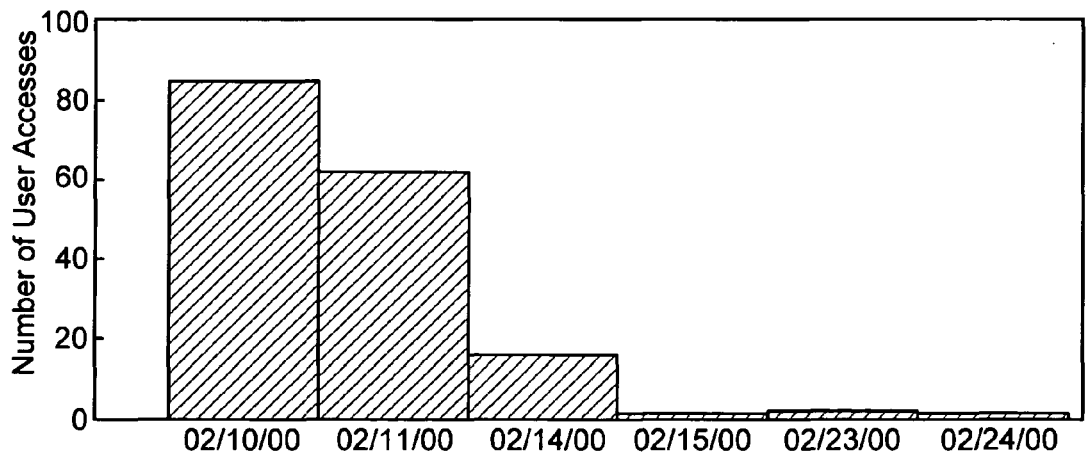

FIG. 23A

User Accesses by Hour of the Day — 2306

| Hour of the Day | Hits | Percent |
|---|---|---|
| 8 | 1 | 0.59 % |
| 9 | 7 | 4.19% |
| 10 | 94 | 56.2 % |
| 11 | 15 | 8.98 % |
| 12 | 4 | 2.39 % |
| 13 | 22 | 13.1 % |
| 15 | 1 | 0.59 % |
| 16 | 3 | 1.79 % |
| 17 | 14 | 8.38 % |
| 22 | 3 | 1.79 % |
| 23 | 3 | 1.79 % |
| Total | 167 | 100 % |

Linking to the E-Commerce Server

Myserver. blackboard.com

100

Ready to checkout?

OK

BLOCK 120

The link to butter passes the following information:

name: Name of the purchaser
address_1
address_2
city
state
zip
country
price: price in USD that the user is being asked to pay
order-id: null if butter should generate an order number (default)
order-descr: Text description of what the user is buying:
url: The location the referring server that butter should return the user to after the payment process is complete hyperlink Butter blackboard.com
Linux Apache Perl CGI

First E-Commerce Screen Display

Accepts VISA, MC, Diner's Club, JCB and Carte Blanche (but not Amex)

Whatever user info is available is populated from the data passed from the previous page.

The unique order number displayed is dynamically generated by the server.

The Chosen services and price displayed are passed in from the previous screen.

The look and feel of this plate (and all butter e-commerce pages) can be modified by an HTML template. This template is selected as one of the script parameters.

FIG. 35

Second E-Commerce Screen Display

Butter.blackboard.com

Payment is authorized and queued at Cybercash, Inc for processing.

The payment will go throigh and appear in Blackboard's Cybercash account within 12 hours.

There is no way that the user can back out at this point without Blackboard issuing a manual refund.

No services are provided yet. The user must follow the link at the bottom of the page, or he will receive nothing for his money.

All links on this page are disabled except the one that says :YOU MUST CLICK HERE". This prevents users from failing to get their orders filled.

A authorization code is calculated by the script as a secure hash of the purchase price, the order id, and a secret number.

FIG. 37

Returning to the Originating Server

- The link at the bottom of the page points back to the referring server using the location passed in the URL parameter to the first butter script.

- The authorization code, the order_id and a subset of the credit card digits (show_card) are passed back as parameters.

- The authorization code should be checked upon return by making an identical hash calculation. If the two hash values match, the order should be fulfilled, otherwise, and error should be shown.

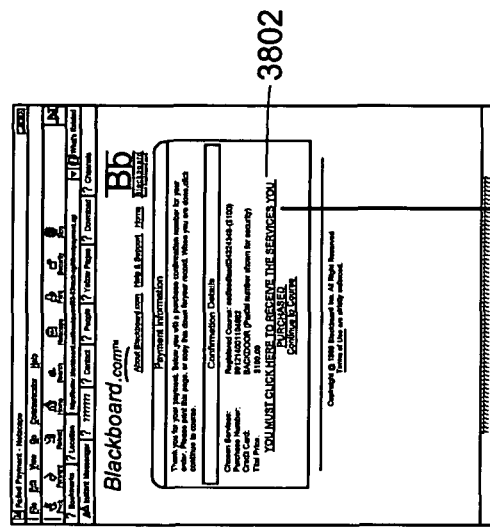

FIG. 38

Locale Settings

ADMINISTRATION PANEL > SYSTEM SETTINGS > LOCALE SETTINGS

① Configure Locales

Each locale installed in the system is listed below. You may set following options for each:

System Default: Only one locale may be chosen as the system default. Set this to the locale that will be used most by administrators, instructors, and students.

Allowed for Users: This field controls whether users are able to select a particular locale. Checking this column for all locales will allow users to pick any of the installed locales for personal use. Unchecking this column for all locales will result in users being forced to the use the default.

Allowed for Courses: Setting this option allows instructors to create courses for the chosen locale. If every value in this column is checked, Instructors will be able to create courses for any installed locale. If no values are checked, instructors will not be able to specify the locale of their courses.

| Locale (3902) | Locale Code (4004) | System Default (4002) | Allowed for Users (4006) | Allowed for Courses (4008) |
|---|---|---|---|---|
| 1) English (United States) | en_US | ◉ | ☑ | ☑ |
| 2) Deutsch (Deutschland) | de_DE | ○ | ☑ | ☑ |
| 3) 日本語 (日本) | ja_JP | ○ | ☑ | ☑ |
| 4) Francais (France) | fr_FR | ○ | ☑ | ☑ |
| 5) 简体中文 | zh_CN | ○ | ☑ | ☑ |
| 6) Nederlands (Nederland) | nl_NL | ○ | ☑ | ☑ |
| 7) Español (España) | es_ES | ○ | ☑ | ☑ |
| 8) Portugués | pt_BR | ○ | ☑ | ☑ |
| 9) Italiano (Italia) | it_IT | ○ | ☑ | ☑ |
| 10) 中文繁體 | zh_TW | ○ | ☑ | ☑ |
| 11) 한국어 (한국) | ko_KR | ○ | ☑ | ☑ |

FIG. 40

INTERNET-BASED EDUCATION SUPPORT SYSTEM AND METHOD WITH MULTI-LANGUAGE CAPABILITY

CROSS-REFERENCE TO RELATED APPLICATIONS

This application is a continuation-in-part of U.S. application Ser. No. 09/608,208, filed Jun. 30, 2000, which is incorporated herein by reference. This application claims the benefit of U.S. Provisional Application No. 60/382,079, filed May 22, 2002, U.S. Provisional Application No. 60/406,304, filed Aug. 28, 2002, and U.S. Provisional Application No. 60/449,507, filed Feb. 25, 2003, all of which are incorporated herein by reference. U.S. application Ser. No. 09/608,208 claims the benefit of U.S. Provisional Application No. 60/141,283, filed on Jun. 30, 1999, U.S. Provisional Application No. 60/141,864, filed on Jul. 1, 1999, and U.S. provisional Application No. 60/187,890, filed on Mar. 8, 2000, all of which are incorporated herein by reference.

FIELD OF THE INVENTION

The present invention relates generally to systems and methods for the exchange of information between instructors and students in an educational context. More specifically, the present invention relates to systems and methods in which an educational instructor interacts with one or more non-collocated students by transmitting course lectures, textbooks, literature, and other course materials, receiving student questions and input, and conducting participatory class discussions using an electronic network such as a Local Area Network (LAN), a Metropolitan Area Network (MAN), a Wide Area Network (WAN), the Internet and/or the World Wide Web (WWW). The present invention also relates to the provision of an infrastructure that allows for on-line registration and tuition payment of educational courses.

In addition, the present invention relates to systems and methods that may be used by system users at various levels for the distribution and use of information over a network. More specifically, the present invention relates to interactive systems and methods that may be used by system users at various levels for distributing and using information over a network such that it is readily adaptable for more than one language.

BACKGROUND ART

The ability of educators, including educational institutions, private corporations, and institutions of higher learning, to reach potential students has generally been limited by geography. In most instances, a potential student must physically move to within commuting distance or onto a campus in order to have access to course instructors, classes, and materials. Furthermore, potential students and persons seeking knowledge of all sorts are generally limited to proximate sources of courses of instruction, tutoring, or training. Due to these limitations, a prospective student must either seek to learn a given subject from whatever local means of instruction is available to her or move her household in order to be able to access her preferred sources of instruction. Many prospective students are deprived of receiving instruction from other, possibly better-qualified instructors or institutions located outside of their immediate locale. Similarly, educational institutions have been limited to serving only those students located within commutable distance of their campuses. This applies whether the student(s) and/or instructors(s) are in the United States, Japan, Kenya, Germany, or India.

The advent of networked computers and communications has afforded a partial solution to these limitations. In particular, the widespread use and availability of electronic networks such as the Internet and the WWW have made it possible for students and educators to overcome geographic dispersion and physical location as a barrier to education or training. Using this electronic medium, students and instructors are able to exchange information including live or transcribed classroom lectures, homework assignments, texts and materials, grading, live or transcribed question and answer interaction sessions, and other related information to effect a traditional learning or educational experience regardless of physical location.

However, electronic networks, including the Internet, are complex technological systems requiring the user to have or acquire specialized knowledge in order to use them effectively. Even graphical user interfaces (GUIs) designed to enhance simplicity of use, such as that provided by the WWW, may require specialized knowledge of network terminology and technical aspects. For example, an Internet user's ability to access information using that medium is significantly reduced if the user lacks understanding of how to use Uniform Resource Locators (URLs) to navigate web pages. Slow adoption of new technology and lack of technological sophistication have a chilling effect on the widespread use of the medium in general. Applied specifically in an educational context, these chilling factors apply to instructors who, while possessing high expertise in their respective intellectual or educational fields, would be required to further attain technological knowledge necessary to effectively use the Internet to educate non-collocated students.

Furthermore, the complexity of using the Internet for educational purposes is compounded as the number of user choices required at the user interface increases because not only must the instructor and students acquire technological competency in the use of the medium, but they must in addition understand the presentation and consequences of large number of choices required by a particular user interface such as a web page. The design of the user interface, therefore, can be critical in enabling widespread use of the medium in an educational context. Solutions other than the present invention may be characterized as having relatively complicated and confusing user interfaces. Users, including students and instructors, of these other solutions are confronted with one or more web pages that typically require the user to review and select a subsequent web page or function from among a large array of potential user choices, thereby complicating the user's task of interacting with the system.

Further, many educational institutions have existing or legacy network-based systems that students access to obtain various types of information (e.g., class schedules). The addition of yet another network-based system requires the host or sponsoring institution to incur implementation and maintenance costs associated with the installation, integration, administration, and maintenance of a new network-based system. These costs place limits on the achieving the widespread use of the medium for educational purposes.

The exception has been so-called virtual schools. Virtual schools traditionally charge an enrollment fee, and then offer free courses. In lieu of paying for each course taken, a student is subjected to advertising while viewing on-line course material. While such billing and income generation methods may be acceptable for companies providing on-line training, such methods are inconsistent with traditional college and university billing practices. Colleges and universities typically charge a low enrollment fee and bill students on a per-credit or per course basis.

There are interactive systems currently being marketed for distributing and using information over a network that permit activities by system users according to the level of the user. A network in this context may be a LAN, MAN, WAN, intranet, the Internet and/or the WWW. Applications of such technology may be in the area of educational or corporate training systems. In such systems, system users, entities providing instruction, and system providers will interact with the system so that content may be provided to the student or person receiving training over the network. As stated, the student or person receiving training may be located at different locations than the instructor, yet be interactive with the instructor via a network system. Accordingly, these systems remove the geographic limitations that typically attach to typical teaching systems.

The removal of the geographic limitations was conducive to LAN, MAN, WAN, intranet, the Internet, or WWW-based system being used as the networking medium for providers, instructors, and entities receiving instruction. This also permitted the course of instruction to accommodate disparate sources of information that in the past could not be included in the course of instruction. Moreover, this model permitted classes of instruction to vary widely in make up. For example, a class may include a number of individuals and instructors connected only through the network system. However, it may also be configured to be groups of individuals at various locations connected through the network system and the instructor may be located with one of the groups of students. It may further include the instructor and students located in one location and the materials being used for instruction being provided only over the network system because of the rarity of the source material.

The networked systems that have just been described from a conceptual view are very attractive. However, once they are viewed from the practical, user-based level, there are considerable challenges to the implementation and use of these systems. Existing systems have not reached a level where standards have evolved so that there is some consistency in nomenclature, structure, or interfacing to such systems. Each system is technologically complex and specialized to what system developers believe are important. Therefore, the system users, regardless of level, may find it difficult to use without, in many cases, very specialized training as to the particularized interworkings of that specific system. Most of these systems do not lend themselves to rapid use after a brief introduction. Although the general populus in the Westernized countries are becoming more "computer savvy" with each passing year, this does not mean that the worldwide society that could make use of these non-geographically limited educational or training systems would not have difficulty using them because of their nonuser-friendly nature. This is magnified given the number of users types that will access and use the system, e.g., instructors, students, and individuals receiving instruction, system providers and everything or everyone that may be a hybrid of each of these groups, and potential language barriers without very specialized conversion of the systems.

To the extent that current networked educational or training systems exist, they are configured from the institution or company perspective and not to that of the user. Further, these systems are not readily adaptable to be converted to favor the individual user's perspectives. The student or individual receiving instruction is inextricably tied to the institution's configuration without the ability to tailor his/her experience that would better fit his/her individual style in obtaining, using, and processing information contributing information.

In a typical conventional system, the student or individual receiving instruction will access different locations or web pages of the institution's or company's network system to obtain the information that he/she desires or post with the institution or company. In order to gain such access, the student or individual may be required to logon a number of networks to obtain the desired information or upload it. This can be frustrating to students or individuals because small errors in the process can greatly increase the time to perform activities on the system. At some point, the frustrated student or individual may give up or be required to seek help. The alternative of consolidating all the activities at one web-site may itself cause problems given the institution's or company's purposeful segregation of the activities at the various network system sites since the main idea is to make the system more institutional or company-centric rather than student- or individual-centric.

Current networked systems that are used for education or training will require the instructor to make lecture and textual information available to the students or individuals. As can be imagined, various instructors, whether the educational or company setting, will have very different teaching styles. Present-day systems that typically are institution- or company-centric are not readily adaptable to accommodate these differences in teaching styles. The best description of these systems would be to refer to them as "one size fits all" types of systems. Therefore, there will exist a constant struggle between the instructors, and institutions or companies to derive system refinements and customizations to meet the instructors' needs. This creates nightmares for institutions and companies from the maintenance and management standpoint.

With regard to maintenance, the institution or company must continue to provide support for the ever changing nature of the system, which is very expensive and time consuming. And, with regard to management, the institution or company must create customizations on demand and attend to the development and testing processes associated with these new and varied customizations. This again is expensive and time consuming.

Current LAN, MAN, WAN, intranet, Internet or WWW-based systems that may accommodate the educational or corporate systems that have been discussed, slow significantly as the large numbers of students or trainees stress the network to obtain information or use the system for its intended purposes. This adds to user frustration and system dissatisfaction. If this is one of the major initiatives of the educational or company training system, it will reflect badly on the institution or company.

Current educational and company-based training systems have difficulty presenting multiple functions on-line activities because of the complexity. For example, there are problems in providing on-line registration for educational courses along with providing tuition payments. This is due in part to the incompatibility of billing practices and the continual customization of the integration of the registration for courses and payment techniques.

Current educational and company-based systems have difficulty being provided in various languages. Typically, in order to obtain a system that will be presented in a different language, it is necessary to take the system as created in a native language and translate it in its entirety to be presented in the second language. Current-day systems are not particularly adaptable to be rapidly changed from one language to another with little effort without the need to separately translate the system.

The present invention overcomes the problems of conventional system to provide a system that is user friendly and easy to use through a user interface.

Therefore, it is a general object of the present invention to provide a system and methods that allow users to interact with a computer network-based education support system through means of a simplified, easy-to-use user interface.

A further general object of the present invention is to provide a system that can be easily integrated with existing computer network and backend systems with minimal disruption to existing operations and systems.

A still further general object of the present invention is to provide a system that is scalable in order to accommodate increasing numbers of users, such that system responsiveness is not materially degraded as the number of users of the system grows to an increasingly large number.

A still further general object of the present invention is to provide a system and methods that can accommodate a variety of diverse teaching modes without requiring substantial modifications to the system.

A further object of the invention is to provide a system that allows multiple types of users to access the features of the system as a function of their predefined role within the framework of the system, such as, a student, a teacher, or an administrator.

It is a further object of the invention to provide such a system that integrates with the education platform so that there will be provided therein value added services and control such as calendar, task, contact and communication functions.

It is another object of the invention to support multiple locales, and have multiple locales display in a user's browser based on an administrative configuration.

An even still further object of the present invention is to provide a system and method that is accessible according to the access level of the system user.

It is still a further object of the present invention to provide a network-based interactive system that is readily adaptable to accommodate multiple languages.

These as well as other objects of the present invention are apparent upon inspection of the specification and drawings.

DISCLOSURE OF THE INVENTION

In accordance with these and other objects, provided is a system for providing to a community of users access to a plurality of on-line courses, comprising a plurality of user computers and a server computer in communication with each of the user computers over a network that includes LANs, MANs, WANs, the Internet, intranet, and/or the WWW. Each user computer is associated with a user of the system having predefined characteristics indicative of a predetermined access level to the system. Each level of access to data files is associated with a course, and a level of control over data files associated with a course. The preferred server computer is capable of storing data files associated with a course assigning a level of access to each file, determining an access level of a user requesting access to a file, and allowing access to a file associated with a course as a function of the access level of the user. Accordingly, the level of access preferably is associated with the ability of a user to access the file.

According to a preferred embodiment of the present invention, the user level associated with a student user, an instructor level is associated with an instructor user, and an administrator level is associated with an administrator user. However, multiple levels may be associated particular users. For example an instructor of one course may also be a student in another course.

The instructor user is provided with an access level to enable the creation and editing of a plurality of course files associated with a course. The course files may include an announcement file, a course information file, a staff information file, a course documents file, an assignments file, a dropbox file, an asynchronous communication file, and a synchronous communication file.

The student user is provided with an access level to enable reading of course files associated with a course. The student user is also provided with an access level to enable modification of some of the files associated with a course. Also, the user may be provided with an access level to enable creation of a student file associated with a file for which the student user is able to read. The file that the student is able to read may be an assessment file created by the instructor user, and the student file created by the student user is a response to the assessment file. The assessment file may be a plurality of examination questions selected by the instructor user to assess the learning level of the student user. The examination questions may be selected by the instructor user from a predetermined pool of available examination questions. The examination questions also may be created by the instructor user substantially at the time of the creation of the assessment file and optionally added to the pool. The student file may be reviewed by the instructor user and assigned a grade, which would be made available on-line to the student user. The instructor user may collate the grades obtained from reviewing a number of student files, and the collated grades may be made available on-line to all student users associated with the course.

The "digital dropbox" may contain a plurality of files transferred to the server computer from one or more student users associated with the course. The instructor user may be provided with access to the files in the dropbox file. The instructor user may download, edit and upload the files in the dropbox.

A user may be required to enter a logon sequence into a user computer in order to be provided with access to course files associated with that user. The user is then provided with access to all courses with which the he/she is associated after entry of the logon sequence. The user is provided with a web page that may include a plurality of course hyperlinks. These course hyperlinks preferably will be associated with each course that the user has been enrolled either as an instructor or as a student. Selection of a course hyperlink will provide the user with a web page associated with the selected course. This web page will have content hyperlinks and buttons to various content areas associated with the course. The content hyperlinks and/or buttons may include, for example, an announcement area hyperlink, a course information hyperlink, a staff information hyperlink, a course documents hyperlink, an assignments hyperlink, a communications hyperlink, and a student tools hyperlink.

Selection of the announcement area hyperlink provides a web page including a group of course announcements. Selection of the course information hyperlink provides a web page including information regarding the associated course. Selection of the staff information hyperlink provides a web page including data regarding the instructors of the associated course. Selection of the course documents hyperlink provides a web page including a listing of documents associated with the course, which may be active hyperlinks to the documents. Selection of the assignments hyperlink provides a web page including a group of course assignments. Selection of the communications hyperlink provides a web page including hyperlinks to a group of communication tools including an asynchronous communication tool and a synchronous communication tool.

In another aspect of the present invention, the system and method provide a community of users access to on-line courses that will include a server computer in communication with user computers over a network. The server computer preferably will be capable of creating course user accounts from a file of existing user accounts associated with an external computer. In this manner, existing legacy systems that have a large number of user accounts stored in memory may be integrated with this system without having to re-enter user data which is referred to as "batch enrollment."

The present invention also includes a method for providing on-line education that further may include the steps of establishing a course to be offered on-line, offering the course to be taken on-line to a group of student users, and providing access over the network to the course files to student users who have enrolled in the course. The establishment of the course includes an instructor user generating a set of course files for use in teaching the course, then transferring the course files to a server computer for storage. The stored files will be accessible by a predefined community of student users having access to the server computer over a network.

Preferably, at least one of the course files may include a course assignment. The student user creates a student file in response to the course assignment and transfers the student file to the server computer. The instructor user accesses the student file from the server computer, reviews the student file to determine compliance with the course assignment, and assigns a grade to the student file as a function of the determination of compliance with the course assignment. The instructor user also may post the grade to a file on the server computer accessible only by the student user with which the grade is associated. The instructor user may repeat this process for a number of student users that are enrolled in a course, and then perform a statistical analysis on the grades assigned to the student users. The results of the statistical analysis may be made available to the student users enrolled in the course.

An asynchronous communication tool accessible to student users enrolled in the course may be provided for enabling asynchronous communication amongst the student users. Likewise, a synchronous communication tool accessible to student users enrolled in the course may be provided for enabling synchronous communication amongst the student users.

The present invention also provides a flexible infrastructure for colleges, universities, and other institutions desiring to facilitate on-line registration and tuition payment. Further, the present invention can accommodate different billing methods, including, but not limited to, billing on a per-credit-hour basis, and billing on a per registrant basis. Tuition may be paid by credit card, debit card, check, or other verifiable payment method. Payment verification may be performed by the present invention, or the present invention may interface with third-parties providing payment verification services. In addition, the present invention allows on-line billing information to easily interface with a college, university, or other institution's standard billing practices. Integrating with existing billing practices simplifies transition to automated systems.

The present invention may be configured as an open system to which anyone can connect to a server over the Internet or WWW, and create a course on-line that may be taken by anyone else connected over the network. Thus, anyone may create a virtual classroom available to anyone else, regardless of whether they are affiliated with a particular institution. For example, a lawyer may create a course in patent law on-line, and configure the system to require entry of a password to enroll. The lawyer may then disseminate the passwords to students who desire to enroll in the course. Alternately, the lawyer can request the system to require payment to enroll in the course, such as by credit card.

In an embodiment of the invention, the system is capable of storing and displaying multiple locales, including a locale precedence that permits the locale to be displayed in a hierarchy. The present invention can display course materials in a specific locale, for example, to teach a foreign language course and/or to teach a course in a foreign language. Similarly, the present invention can be used to serve organizations that have a diverse user populations that require courses in multiple locales.

In another embodiment of the invention, the system can be operated to use and display information in multiple languages and even display content at different locations of a web page in different languages.

The system and method of the present invention will be described in further detail in the remainder of the specification, including the claims, referring to the attached drawings.

BRIEF DESCRIPTION OF THE DRAWING

FIG. 1A shows an overall block diagram of the system.

FIG. 5 shows a screen shot of the home page according to the present invention that a user will view.

FIG. 8 is a screen shot of an announcement web page provided to a student user according to the present invention.

FIG. 15 is a screen shot of a student drop box web page according to the present invention.

FIG. 17 is a screen shot of a second announcement web page according to the present invention.

FIG. 22 is a screen shot of a course gradebook web page according to the present invention.

FIGS. 23A and 23B are screen shots of the course statistics web page according to the present invention.

FIG. 25 is a screen shot of a community web page according to the present invention.

FIG. 29 is a screen shot of a create a course web page according to the present invention.

FIGS. 30A and 30B are screen shots of create user web pages according to the present invention.

FIG. 32 is a further screen shot of a web resource web page according to the present invention.

FIG. 34 is a diagram showing information passed from a course registration server to a payment server according to the present invention.

FIG. 35 is a sample of a payment form according to the present invention.

FIG. 37 is a sample of a payment information page according to the present invention.

FIG. 38 is a diagram showing post-order processing according to the present invention.

FIG. 40 shows an exemplary screen display directed to how a system administrator can specify a default locale according to the present invention.

DETAILED DESCRIPTION OF THE INVENTION

General System Architecture

Referring to FIG. 1A, generally at 50, the present invention comprises a system and methods for the exchange of course content and related information between non-collocated instructor users and student or trainee users. An instructor user, such as at 52, 54, interacts with one or more non-collocated student or trainee users, such as at 56, 58, 60, by using the system and methods of the present invention to, without limitation, transmit course files including course lectures, textbooks, literature, and other course materials, receive student questions and input, and conduct participatory class discussions using an electronic network such as a LAN, a MAN, a WAN, the Internet and/or the WWW, of which 62 is representative. Access to the course file is controlled by access levels assigned to system users and control logic, which helps ensure the integrity and security of the system. Also, administrator users, such as at 64, 66, have access to the system to perform administrative tasks as defined herein. Web resources 68 connect to the system to provide additional services and or functionality. Finally system server 100 also connects to the network 62. As shown at 70, a system user may have multiple access levels. Here, the user is an instructor/student user.

Figure 1B:
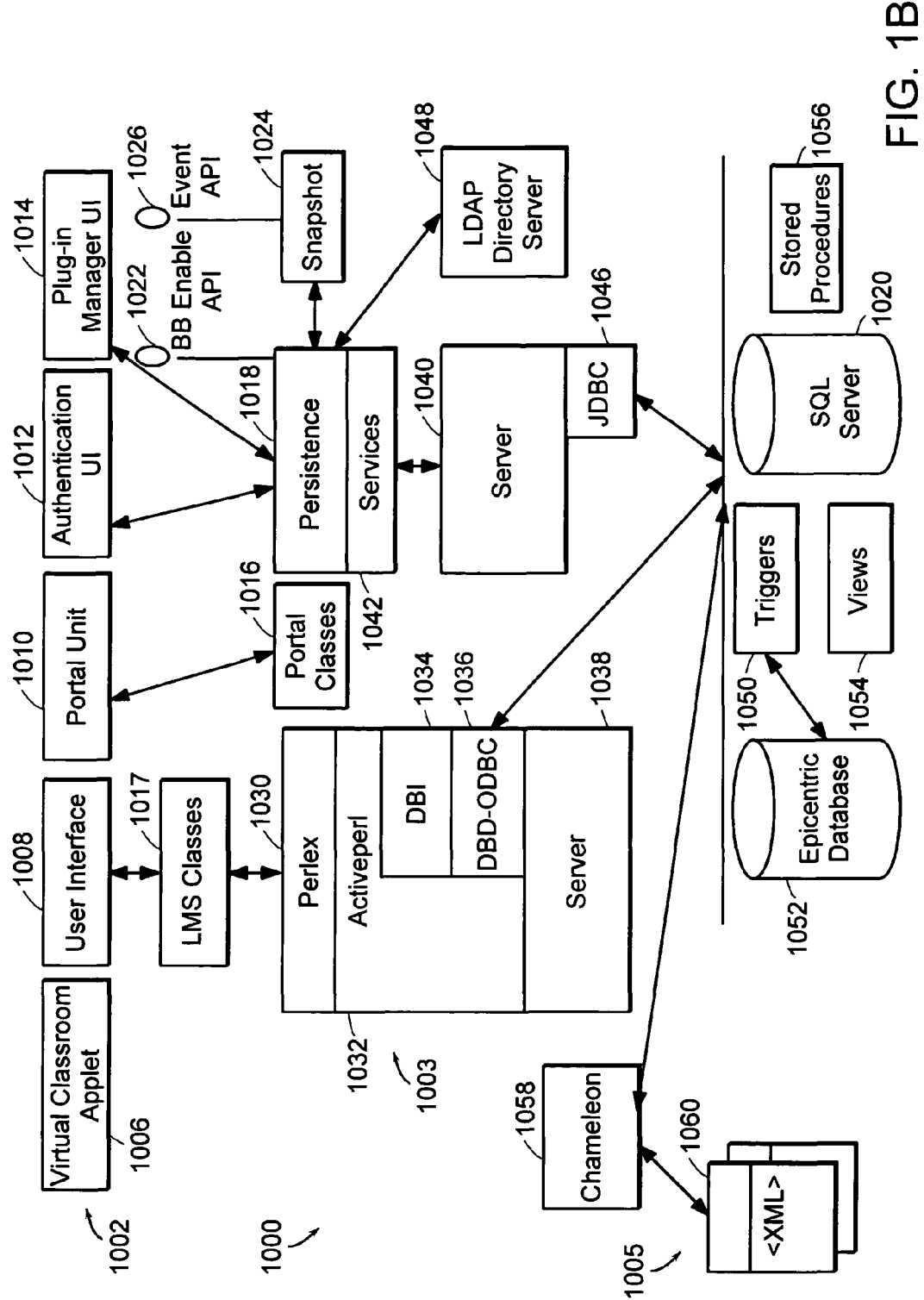
FIG. 1B shows an exemplary high level diagram of the system architecture, indicating a logical relationship between various system components.

FIG. 1B at 1000 is a further detailed view of FIG. 1A and shows an exemplary component architecture that (i) indicates logical relationships between various components, and (ii) can be used to implement multiple locales in a web-based implementation. FIG. 1B shows a three tier architecture. These tiers are user interface tier 1002, platform tier 1003, and data tier 1005. Other numbers of tiers can also be used and are encompassed within the scope of the present invention.

User interface tier 1002 includes components from an end user perspective. They may be used, for example, for a user to logon to server 1040 and conduct subsequent interactions. User interface tier 1002 will permit the system user to access, interact with, and retrieve information. For example, user interface layer 1002 can generally be used to create, revise, and/or delete content from system 1000. In particular, at user interface layer 1002, system 1000 can generate, access, retrieve and/or receive hypertext mark-up language (HTML) pages, optionally in an extensible mark-up language (XML) environment. Applets 1006 can be used in a conventional manner to enhance browser 1008 functionality. Portal unit 1010 can utilize portal classes 1016, for example, to render and/or aggregate the actual data displayed on portal pages, such as shown in FIGS. 5, 6, 12, 24, 25, 26 and/or 28. Portal classes 1016 represent software code that can be used to rendering data that can be displayed by or at user interface 1008. The portal classes are preferably implemented as object-oriented code, e.g., Java.

Authentication user interface 1012 can be used to verify user credentials, for example, at logon to determine if access to system 1000 will be granted. Plug-in manager 1014 can be used as a run time component, for example, to add and/or delete extensions to system 1000. Plug-in manager 1014 can thus be used to integrate new features and/or functionality, optionally made available from or by third party vendors. Plug-in manager 1014 can utilize, for example, Java *.war files to accommodate system 1000 extensibility. In addition, programming developed that could be viewed as a standard programming component could be uploaded to system 1000 via plug-in manager 1014. Lightweight Directory Access Protocol (LDAP) Directory Server 1048 can optionally be used to provide centralized authentication services, optionally as a platform tier 1003 component.

Learning Management System (LMS) classes 1017, persistence classes 1018, and snapshot classes 1024 can optionally be considered a fourth tier known as the application tier. LMS classes 1017 can include code components that define the semantic structure of the application. LMS classes 1017 can be implemented as object-oriented code, organized around concepts that "map" to real world objects. In an educational context, real world objects can be a course, identification of the course, the date(s) of the course, and/or a description of the course.

Persistence classes 1018 can be used to store data in database 1020. As shown, plug-in manager 1014 can utilize persistence classes 1018 to provide various user interfaces and application programming interfaces (APIs). Examples of persistence classes 1018 is a set of objects, classes and/or methods that third party developers can use.

Snapshot 1024 can be implemented to utilize event APIs 1026 in a conventional manner to import data into system 1000. Snapshot 1024 can interface with persistence classes 1018. For example, if system 1000 is utilized by a university, there may be a large amount of information stored pertaining to various students. Conventional systems can run programs, databases, and the like with regard to enrollment, staff assignments, room scheduling, etc. Snapshot 1024 can generate data files from the captured information for use in conjunction with system 1000. Snapshot 1024 can advantageously create data and/or sets of data grouped in a particular way. As such, data may be grouped semantically around terms or types of data. Snapshot 1024 can optionally be run from, for example, an operating system, e.g., DOS and/or Unix, command line and/or shell. This will permit a user to write programs that can be processed as application tier data.

An embodiment of platform tier 1003 can include and/or utilize, for example, server 1038, server 1040, LDAP server 1048, and/or associated scripting or interfaces 1030, 1032, 1034, 1036, 1046, 1016, 1018 and/or 1042. PerlEx 1030 (a known plug-in for Windows NT Web servers), and ActivePerl 1032 (JScript or ActiveState can also be used in lieu of ActivePerl) are used in connection with scripting services. ActivePerl 1032 also utilize database interface (DBI) 1034, which can interface e.g., locate and load, Database Driver-Open Database Connectivity (DBD-ODBC) 1036 which, in turn, can communicate with database 1020. DBD-ODBC 1036 is a known set of APIs, created by Microsoft, Inc. that defines how to move information in and out of a personal computer database. A different DBD-ODBC can be utilized for each different database. PerlEx 1030, ActivePerl 1032, DBI 1034, and DBD-ODBC 1036 can reside in or run on server 1038. In an embodiment, server 1038 can be a conventional Internet Information Server (IIS) (Microsoft Corporation, Redmond, Wash.) that is used to implement server-side scripting.

Server 1040 centralizes application services, such as web server functionality, and provides access to data tier 1005. Server 1040 can also optionally provide enterprise-level security. Java Database Connectivity (JDBC) 1046 is a standard Java API that consists of a set of classes and interfaces written in the Java programming language. JDBC 1046 can be used to write database applications and execute System Query Language (SQL) statements for use in connection with database 1040, which can store various locales. Accordingly, various views 1054 and stored procedures 1056 can be utilized and associated with database 1020 to associate and/or store locales with respective web pages. In an embodiment of the present invention, database 1040 can also utilize a separate server (not shown).

Figure 24:
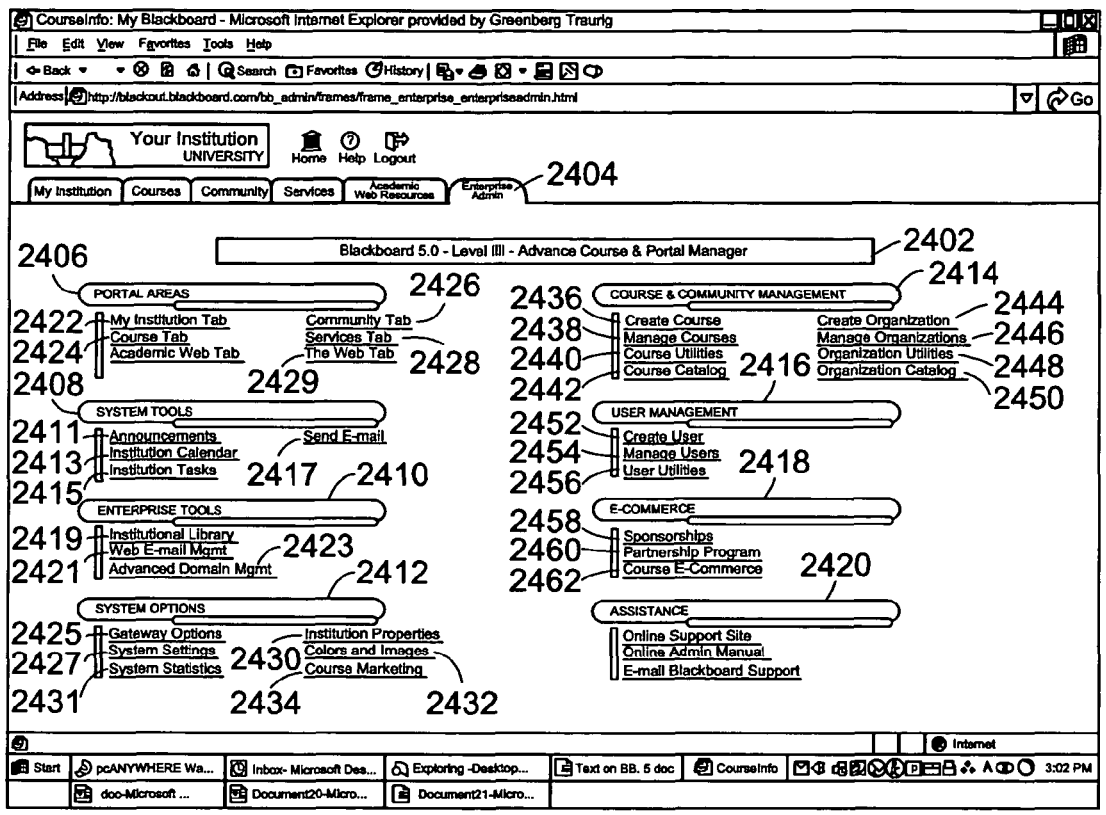
FIG. 24 is a screen shot of an advanced course and portal manager web page according to the present invention.
Figure 25:
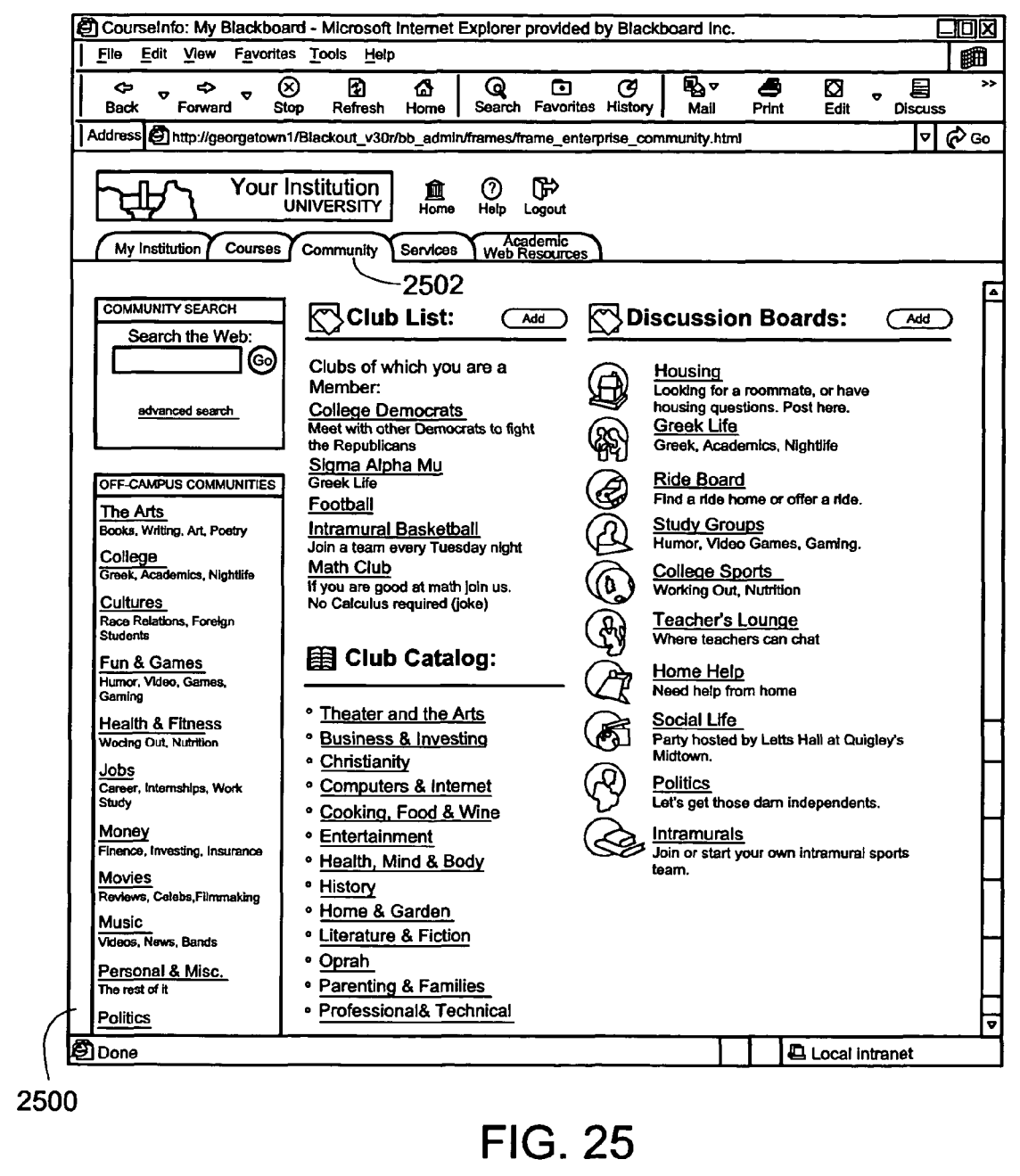
Figure 26:
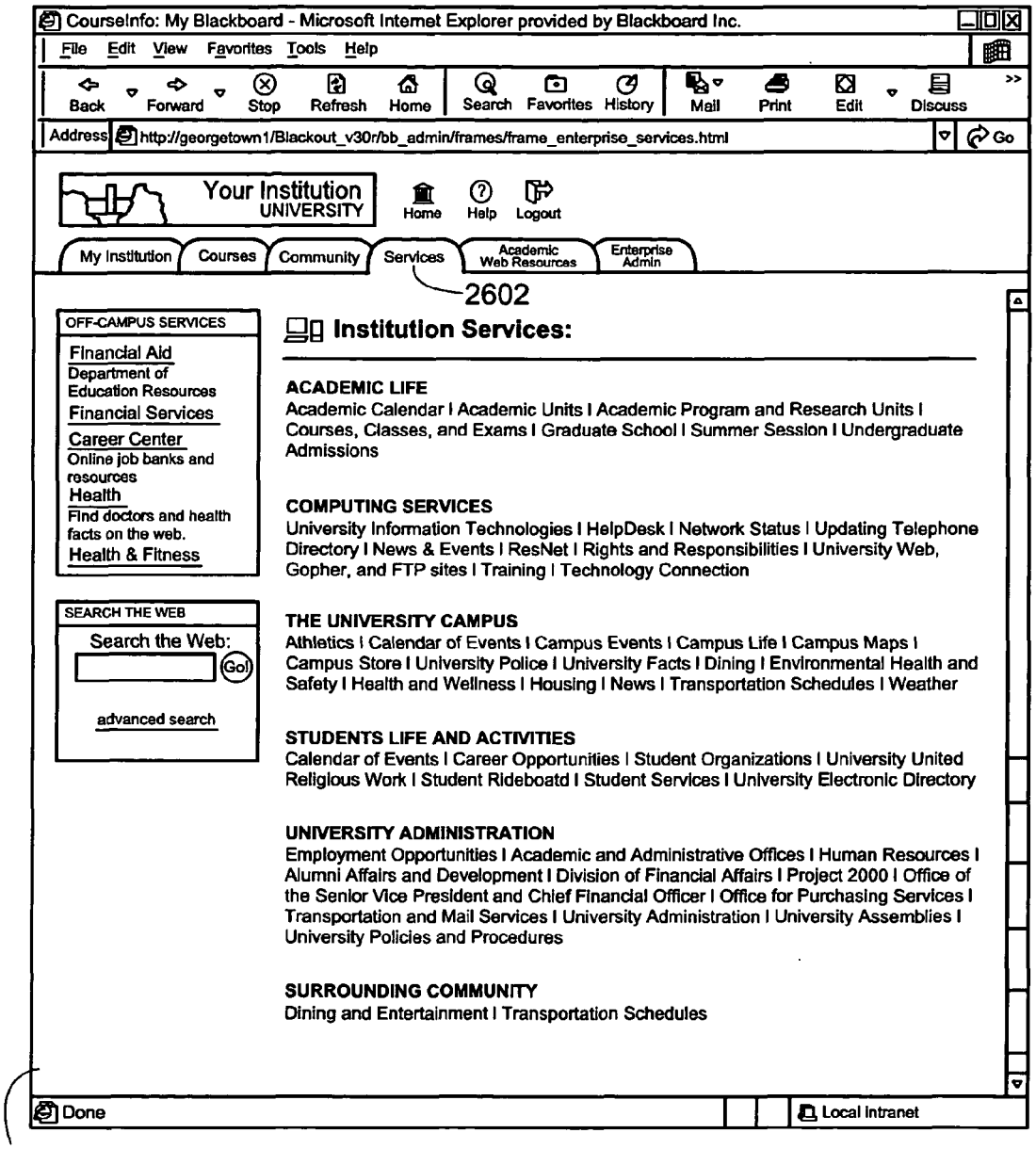
FIG. 26 is a screen shot of a services web page according to the present invention.

Triggers 1050, e.g., procedures, can be used to interface database 1020 with an epicentric database 1052, which can be used to store, various views, data and/or procedures used to render portal pages, such as shown in FIGS. 5, 6, 12, 24, 25, 26 and/or 28. Accordingly, various views 1054 and stored procedures 1056 can also be utilized and associated with database 1052. Although FIG. 24 shows that there are six portal modules, i.e., "My Institution" tab 2422, "Course" tab 2424, "Academic Web" tab, "Community" tab 2426, "Services" tab 2428, and "The Web" tab 2429, in Portal Areas 2406, system 1000 may include other numbers of portal modules.

Preferably, Chameleon 1058 is a Java-based import/export utility that can translate a course created on one server 1040 to an intermediate format such as an IMS Content & Packaging format (IMS Global Learning Consortium, Burlington, Mass.) which can be XML 1060 format, so it can be exported to another server (not shown).

Now that the general system has been described, beginning with FIG. 1C, the system will be described in detail.

Figure 1C:
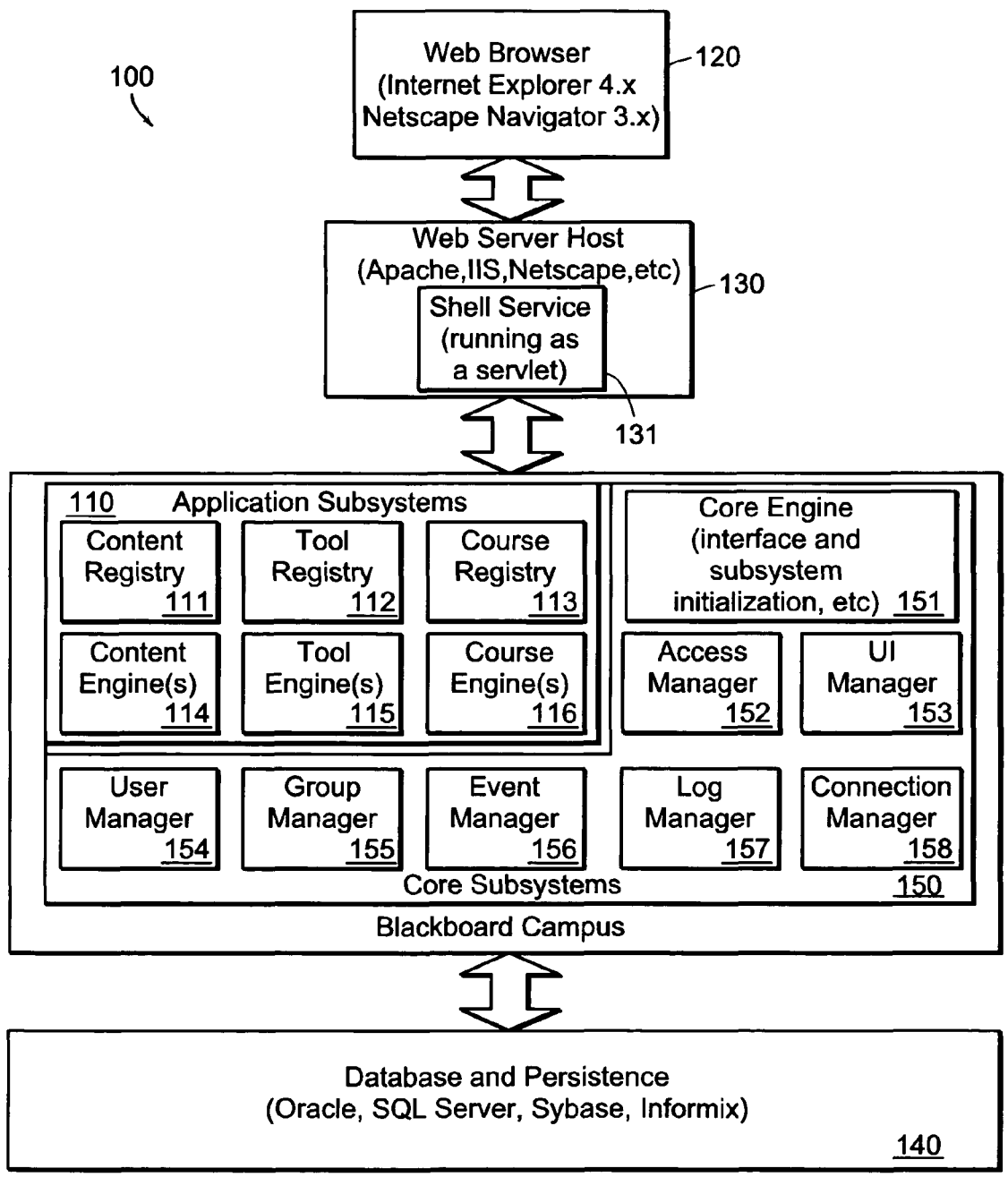
FIG. 1C shows a more detailed architectural block diagram of an embodiment of an education support system according to the present invention.

System and Architecture of FIG. 1C

The system architecture shown at FIG. 1C, generally at 100, represents an embodiment of the present invention relating to the web browser, web server, application and database components. What is shown in FIG. 1C may be incorporated as part of FIG. 1A. Moreover, it is also an embodiment that utilized the components described in FIG. 1B.

Referring now to FIG. 1C, education support system 100 comprises application subsystems 110, a web browser 120, a web host server 130, a database subsystem 140, and core subsystems 150. Web host server 130 further includes a shell service 131. Applications subsystems 110 further includes a content registry 111, a tool registry 112, a course registry 113, one or more content engines 114, one or more tool engines 115, and one or more course engines 116. Core subsystems 150 further includes a core engine 151, an access manager 152, a user interface (UI) manager 153, a user manager 154, a group manager 155, an event manager 156, a log manager 157, and a connection manager 158.

In an embodiment of the present invention, education support system 100 is implemented in a client-server network topology. Users who may have one or several roles, such as a student, instructor, teaching assistant (TA), or administrator, access and interact with education support system 100 via web browser 120. More specifically, a user accesses application subsystems 110 and core subsystems 150 through shell service 131 servlet providing a standard Internet interface including, but not limited to, Transmission Control Protocol/Internet Protocol (TCP/IP), HyperText Transport Protocol (HTTP), Simple Mail Transfer Protocol (SMTP), and File Transfer Protocol (FTP) to the user via web browser 120 running on a standard computing platform such as a personal computer or workstation. Specifically, shell service 131 servlet uses the URL-encoded information contained in HTTP requests received from web browser 120 clients to invoke the corresponding requested application subsystem 110 or core subsystem 150. Shell service 131 servlet also provides user authentication and session management.

Figure 3:
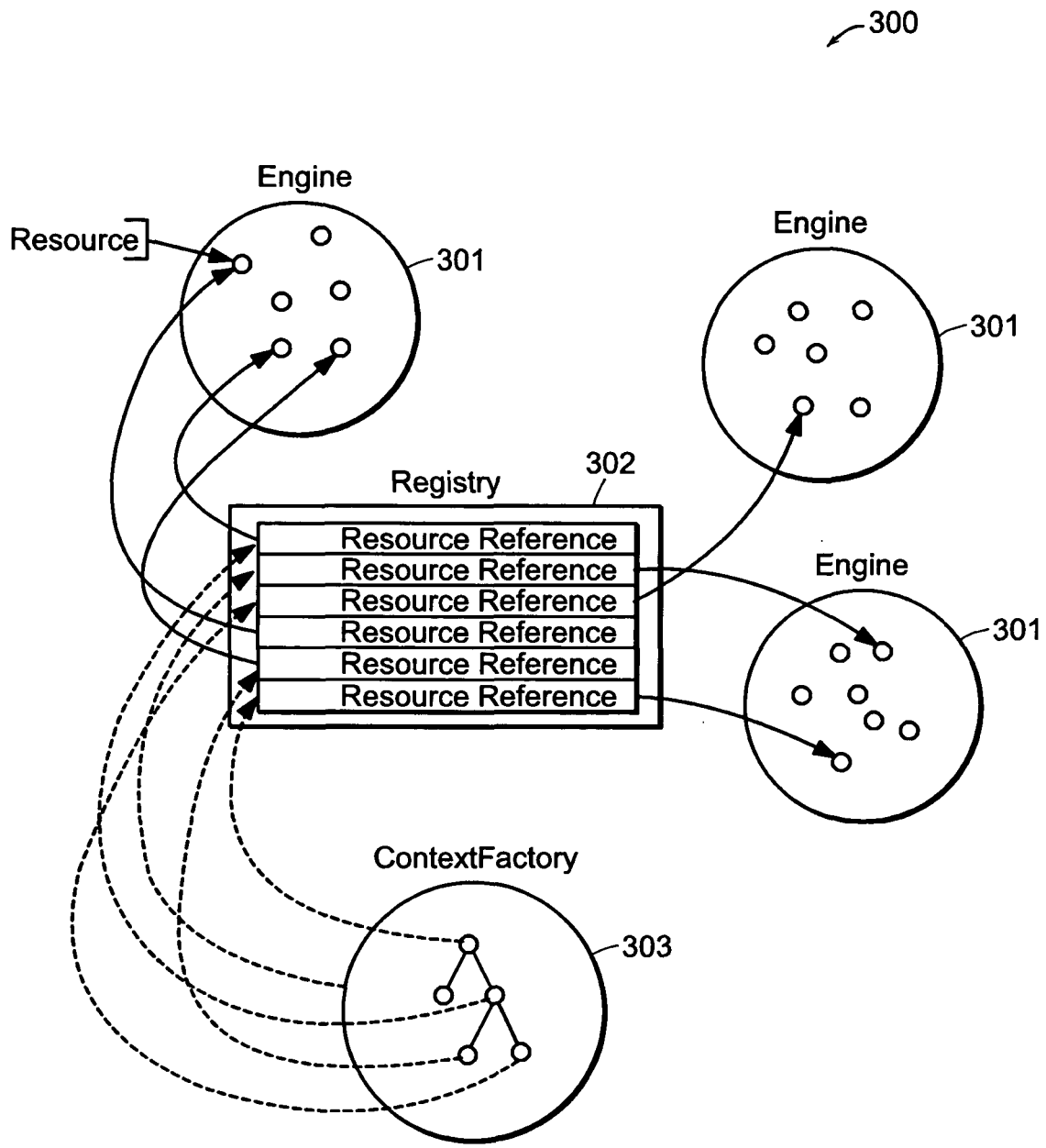
FIG. 3 shows the interaction of an embodiment of an engine/registry model according to the present invention.

Application subsystems 110 function in conformance with an engine/registry model 300 as described in FIG. 3. Referring to FIG. 3, engine/registry model 300 includes one or more engines 301, a registry 302, and a context factory 303. Context factory 303 contains information mapping a user to one or more courses associated with that user.

Engines 301 include, but are not limited to, content engine(s) 114, tool engine(s) 115, course engine(s) 116, and core engine 151. Registries 302 include, but are not limited to, content registry 111, tool registry 112, and course registry 113. Course engine(s) 116 creates a course by associating a set of educational materials to which a student user has access, by organizing references to these informational items as contained in content registry 111. Course engine(s) 116 queries content registry 111 for an index of content engine 114 associated with a particular resource being requested by a user.

Content engine(s) 111 includes an assessment engine that generates quizzes to assist and instruct users in the use of education support system 100. For example, one such quiz provided by an assessment engine of education support system 100 provides step-by-step instructions to an instructor for building a course. The quiz is then administered on-line to the instructor to allow him to build a customized course to be provided using education support system 100.

Unlike content engines 111, which represent actual course content, tool engine (s) 115 generally includes installable programs that provide capabilities available for use with a plurality of courses and not permanently associated with any particular course or courses.

Instructors have different modes of teaching. Further, the same instructor may emphasize different modes of teaching depending upon the subject being taught. For example, some instructors emphasize individual homework while others prefer a group or collaborative approach. Education support system 100 supports a variety of teaching methods. By invoking a particular set of tool engines 115 during interaction with the assessment engine, an instructor can customize a course offering to conform to his/her preferred mode of teaching. An example of a tool engine 115 is a chat/whiteboard communication tools (synchronous and/or asynchronous) provided by education support system 100 that allows for student group interaction and collaboration associated with a given course. Other tools include, but are not limited to, announcements for broadcast of group oriented messaging, a calendar mechanism for storing date related events and information, a discussion board for posting questions and answers in a threaded discussion format, notes-editing, group pages, and email services. Further capabilities provided by education support system 100 include, but are not limited to:

(i) a catalog listing of all courses available, (ii) a method for student users to enroll in either open enrollment or closed enrollment situations, (iii) a method for course creation including course templates and course themes, a course/page editor and viewer, a site page editor and viewer, (iv) a method for making and disseminating announcements, a calendar function, a chat board in the nature of an on-line discussion, a white board allowing group interaction and display of free-form information using, for example, Microsoft Paint™, (v) a method for sending email between instructors and students and groups of students, a list of course members and links to their web pages, a list of groups and links to their web pages, a file sharing area, means for providing assignments to student users, (vi) a method for conducting a variety of types of student assessments (e.g., testing), (vii) a method for providing lesson material in sequential format, means for adding and removing users, help documents, maintaining a grade book and progress tracking, links to personal web pages or home pages, and a resource library containing references to all uploaded content.

Course templates allow instructors to easily reuse a course structure for subsequent courses. Course themes allow the instructor to affect the look and feel of the course site.

Figure 4:
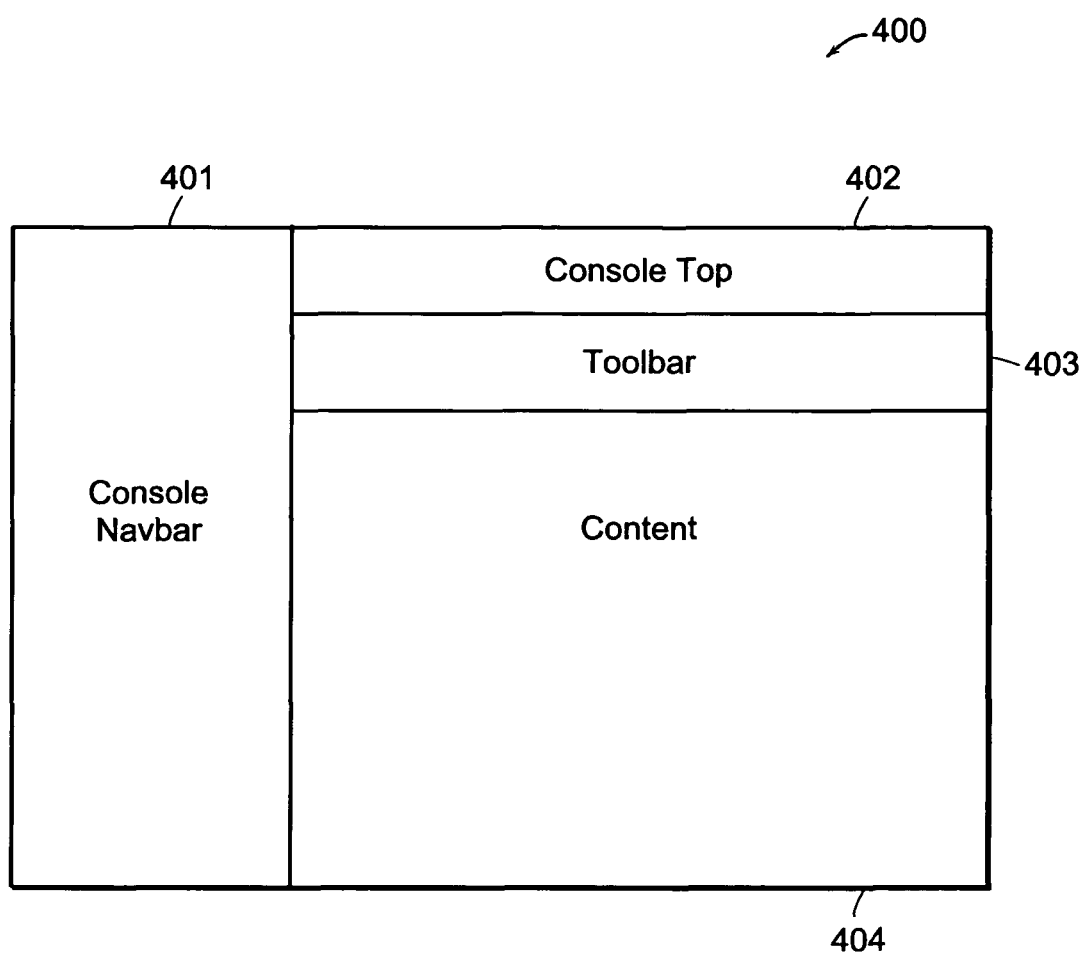
FIG. 4 shows a segmentation of a user interface according to the present invention.

Referring to FIG. 4, a preferred embodiment of education support system 100 supports a plurality of environments 400 in a single application. Examples of different environments 400 supported include a personalized web page of student-centric information accessed by a student user and the administrator's environment used for maintenance of the system. Certain parts of the education support system 100 application are consistent across all supported environments 400, while the appearance to the user may vary for different environments 400. An environment 400 is defined by console frames that surround the application areas. An example of an environment 400 defined by a four-frame page is shown in FIG. 4. The environment includes console navbar 401, and console top 402, a toolbar 403, and content 404. Console navbar 401 and console top 402 may be controlled by a console frameset, while toolbar 403 and content 404 may be controlled by a separate frameset. For example, toolbar 403 "buttons" are generally located in the top frame of an application area. This approach allows users, and especially instructors, the ability to customize their course offerings while conforming to consistent user interface features that allow application areas to be shared across environments 400. Student users and instructors interact with education support system 100 via the same basic environment 400 format.

Again, referring to FIG. 1C, access control manager 151 creates an access control list (ACL) for one or more subsystems in response to a request from a subsystem to have its resources protected through adherence to an ACL. Education support system 100 provides multiple levels of access restrictions to enable different types of users to effectively interact with the system, such as, access web pages, upload or download files, view grade information, while preserving confidentiality of information.

User manager 154 integrates the student-centric information with existing network-based systems of an associated educational institution. In an embodiment of the present invention, user manager 154 includes a runtime component and a batch component that periodically access and extract information contained in external institution databases in order to maintain current student-centric information. User manager 154 facilitates integration of education support system 100 with existing or legacy network-based systems, including proprietary institutional electronic networks and systems related to grades, registration, course schedules, financial aid, etc., without requiring modifications to existing systems or security procedures.

According to an embodiment of the present invention, application subsystems 110 and core subsystems 150 interface with database subsystem 140 using, for example, the Java Database Connectivity (JDBC) standard interface to allow use of any relational database including, but not limited to, SQL and DB2 Universal Database standards.

Figure 2:
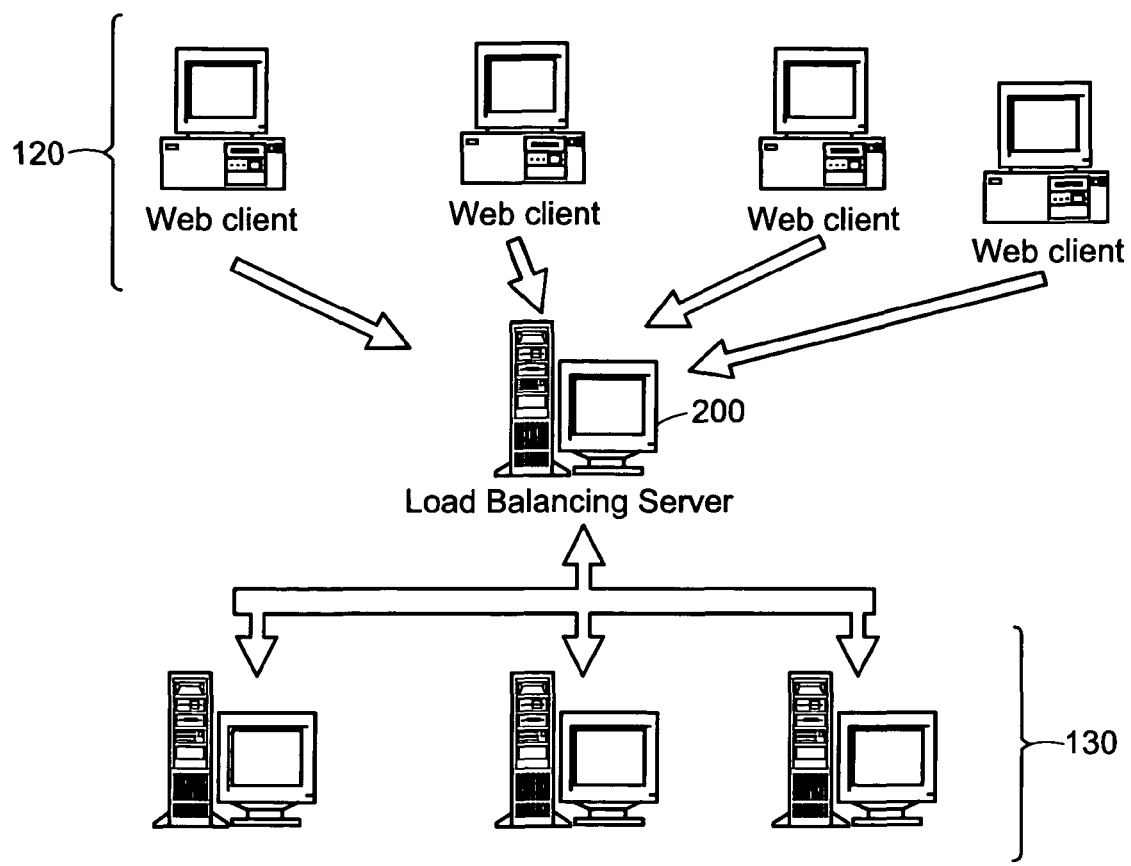
FIG. 2 shows an architectural diagram of an embodiment of the present invention implementing load balancing to achieve scalability.

Scalability is provided by the modular system architecture described in FIG. 1A, and, in an embodiment of the present invention, through use of a load balancing server 200 as shown in FIG. 2. As users are added to the system and access the system as web browser 120 clients, additional web server hosts 130 may be added to the overall system to provide a matching increase in system capacity. Load balancing server 200 allocates new web browser clients 120 to the least-busy web server host 130 for servicing. By balancing the load across all web server hosts 130, education support system 100 prevents response times from become unacceptably long for any one given user. In an embodiment of the present invention, load balancing server 200 maintains one or more metrics concerning the percent utilization for each web server host 130 and selects the least-busy web server host 130 based upon application of a load balancing algorithm to these utilization metrics.

In an embodiment of the present invention, upon logging onto education support system 100, shell service 131 servlet renders and presents to the user via web browser 120 a personalized web page that includes a student-centric aggregation of data that may include, without limitation, personal class schedules, grades, a rolled-up or consolidated calendar, links to related tools, student group events for groups of which a particular student is a member, and class announcements.

Education support system 100 executes on a variety of computing platforms including, but not limited to, UNIX™ servers, NT™ servers, Solaris™, HP™, and Linux™. Education support system 100 supports popular web browsers including, but not limited to, Netscape Navigator™ and Microsoft Internet Explorer™, and, in an embodiment, does not require plug-ins at the web browser client.

In an embodiment of the present invention, an automated upload or import capability is provided in which a user may upload a file to the system and system presents or displays the information contained in the uploaded file in a manner that preserves the grouping of the information, including fields and other categorization, based on the file type. Education support system 100 provides a standard import file format to accomplish this preservation of native grouping of information. In an embodiment of the present invention, an automated upload capability imports an uploaded file in both native and HTML formats, maintaining the file formats associated with the native format for the native formatted file and converting the native format into HTML formats for the HTML formatted file.

Education support system 100 supports a variety of business model. For example, an institution may charge each student for courses taken via education support system 100, or an instructor may use education support system 100 to process individual student tuition payments by providing links to e-commerce facilities.

The present invention allow users to interact with a computer network-based education support system through a simplified, easy-to-use user interface, and that can be easily integrated with existing computer network and backend systems with minimal disruption to existing operations and systems. The disclosed system and method is scalable in order to accommodate increasing numbers of users, and can accommodate a variety of diverse teaching modes.

Three Tier Embodiment

The embodiment in FIG. 1C is a three-tier structure. The "first tier" functionality that incorporates the basic system, referred to as the Course Manager. The Course Manager provides course management system tools to enable instructors to provide their students with course materials, discussion boards, virtual chat, on-line assessments, and a dedicated academic resource center on the Web. As explained further below, the Course Manager includes personal information management tools, course content management tools, course communication and collaboration tools, assessment tools, academic Web resources, course management tools, and system management tools.

The "second tier" can incorporate all of the functionality of the basic embodiment in an epicentric or portal model, also known as the Course & Portal Manager. The second tier provides customized institution-wide portals for faculty, students, staff, and alumni with access to numerous personalized news and information services from across the Web. The platform can be customized with institutional branding and a tailored look and feel. It enables institutions to develop on-line communities, Web based email, calendar, announcements and tasks. It also allows for a central access point to all of the institution's on-line services. In addition to the features of the Course Manager, the Course & Portal Manager includes enterprise database support, customizable portal modules and information services, web-based e-mail system, community management, institutional services management, extended customization for institutional branding, institution-wide content sharing and management, and course e-commerce management.

The "third tier" can be called the Advanced Course & Portal Manager. This tier incorporates the complete end-to-end "e-Learning" solution. In addition to the Course and Portal Manager, this third tier provides advanced Java-based APIs for unifying diverse on-line campus systems into one integrated platform allowing for user-driven single log-in service delivery, as well as capabilities that allow each school, department or campus within the institution to maintain its own customized environment. Thus, this is the fully functional embodiment that includes all the features and functionality of the first and second tiers and adds certain integration technologies that allow integration of the present invention with existing enterprise systems, such as for downloading student databases, etc., as defined subsequently. This includes a snapshot user management API, an event-driven (real-time) user management API, an end user authentication (security) API, and a network protocol for passing user authentication data.

An embodiment of the invention that utilizes the general structure shown in FIG. 1B and the refinement in FIG. 1C can be operated as a publicly available web site on the Internet or WWW, that may be accessed by anyone, whether they are affiliated with an institution or not. In this embodiment, anyone on the web can create a course, or enroll in a public course as explained subsequently. This provides for widespread dissemination of tools and utilities that enable anyone to generate his own course that can be taken by virtually any student.

The course management tools of the present invention allow instructors to monitor, control and customize their course web sites from a web browser interface. The Course Control Panel provides a robust and easy-to-use interface for such course management. The system allows instructors to customize the names of course web site navigation buttons to suit their needs and requirements. The system also allows the instructor to add or drop individuals or groups of students from a course as required. The system features extended student enrollment option, such as a limited-time self-enrollment, e.g., certain dates only for the self-enroll feature, password-protected enrollment, and defined course duration. This will allow self-paced study. Courses may be recycled between academic terms by automatically resetting discussion boards, assessment, and other content areas. In addition, the instructor can track student progress, grades and content usage through the system.

As further explained herein, the content management tools featured in the present invention allow instructors to post course documents, staff information, and assignments. Text may be typed directly into a form, or existing files may be accessed and uploaded automatically. Documents, such as word processing files, spreadsheets, slide presentations, graphics, audio and video clips, may be uploaded in this manner. Streaming multimedia may be provided interactivity between the student and the course. Pop-up maps provide easy course site navigation that enriches the teaching and learning experiences.

The communication and collaboration tools enhance the interaction between the students and instructors with asynchronous discussion boards as well as synchronous chat tools. On-line discussions may be managed wherein messages are sortable by date, author, title and may be archived and printed.

A digital dropbox is a file sharing utility that allows sharing of documents between users. Virtual office hours may be held and even field trips conducted on-line with these tools.

The assessment tools in the present invention increase student preparedness, measure student progress, and customize lessons by creating and administering quizzes and surveys. As such, there is an easy to use, step by step process to create the quizzes and surveys. The instructor, as desired, may mix and match multiple question types, such as multiple choice, multiple correct, true/false, matching, ordering, fill in the blank, and essays. Multimedia or other attachments may easily be included with the assessment questions. Questions may be randomized and re-used from assessment pools. Tests provided to students may be password protected and timed, and may provide instant feedback to students. Advantageously, statistical reports may be created from the assessments and student answers.

The personal information management tools in the present invention allow students, instructors, administrators and all other users to access basic course, personal, and institutional data through a user-centric "My Institution" screen. The user may view announcements from multiple courses in one central location, and maintain personal calendar, address book, user directory and to-do lists.

The present invention also provides for access to a great number of academic resources that supplement the student's on-line education experience. The user may browse discipline-specific information, resources, and communities linked to each course web-site. These academic resources may be customized and personalized to fit the users' needs.

The system management tools available with the present invention allow system administrators to monitor, control and customize an institution's on-line teaching and learning environment from a web browser. The system administrator may control security permissions and enable/disable features for numerous user access levels. Batch user enrollment and unenrollment may be performed system wide. Preferences and options may be managed on multiple courses from within a central system administrator panel. The system administrator may (i) track and report faculty, student, and course statistics, (ii) plan and manage system hardware requirements by assigning instructors with pre-assigned disk quotas for content storage, and (iii) employ system-wide announcements to broadcast messages to users about system maintenance or institutional announcements.

In the Course & Portal Manager embodiment, enterprise database support provides support for tens of thousands of users across an entire institution or network of institutions. User and course data may be managed efficiently and effectively. Moreover, large volumes of transactions may be managed efficiently and effectively. The "My Institution" interface includes portal and community functionality along with quick access to web email, course and institutional announcements, and links to other campus departments. Administrators may enable or disable portal modules and establish required and optional modules from the portal options menu bar. Administrators may also assign different portal default settings to different user access levels, e.g. students get different portals than instructors.

Course e-commerce management functionality allows institutions to set prices and charge fees for course enrollment directly through the "e-Learning" platform.

In the Advanced Course & Portal Manager embodiment, the snapshot user management tool allows scheduling of one-time or periodic (e.g., hourly, daily, weekly) data integration from existing student information systems, automating course population and keeping the "e-Learning" environment is synchronized with administrative and student data. Moreover, the end-user authentication enables a single logon environment for the institution portal for all students, instructors, administrators and staff. This streamlines all campus services into a single web portal environment.

Figure 5:
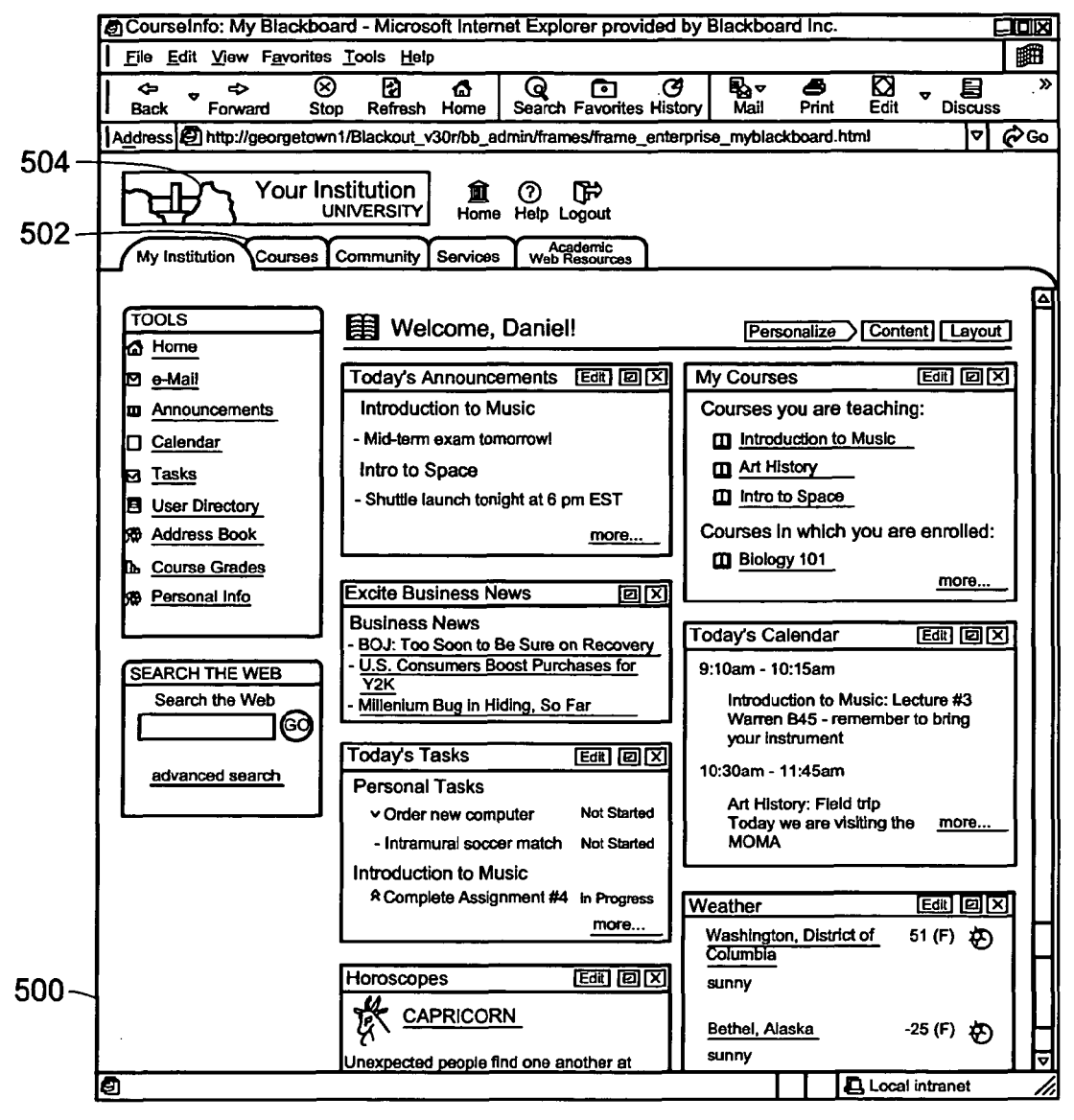

The present invention will now be described in further detail and embodiments. FIG. 5 shows a screen shot of the home page 500 that a user will view. This view is customizable in accordance with the requirements and desires of any user. The home page may also be institutionally branded, so that the "Your Institution" logo 504 shown in FIG. 5 would display the name of the institution that has licensed the product. The home page also provides the user with direct access to personal, course, and institutional tools. As an added feature, the system enables each user to select from a large number of news and information services, so that everyone who uses the system will have access to the most recent and relevant information for them. All of this functionality is provided in one place, the home page, so that the institution can provide a sense of community on campus, with courses, and with a view to the external information sources.

Figure 6:
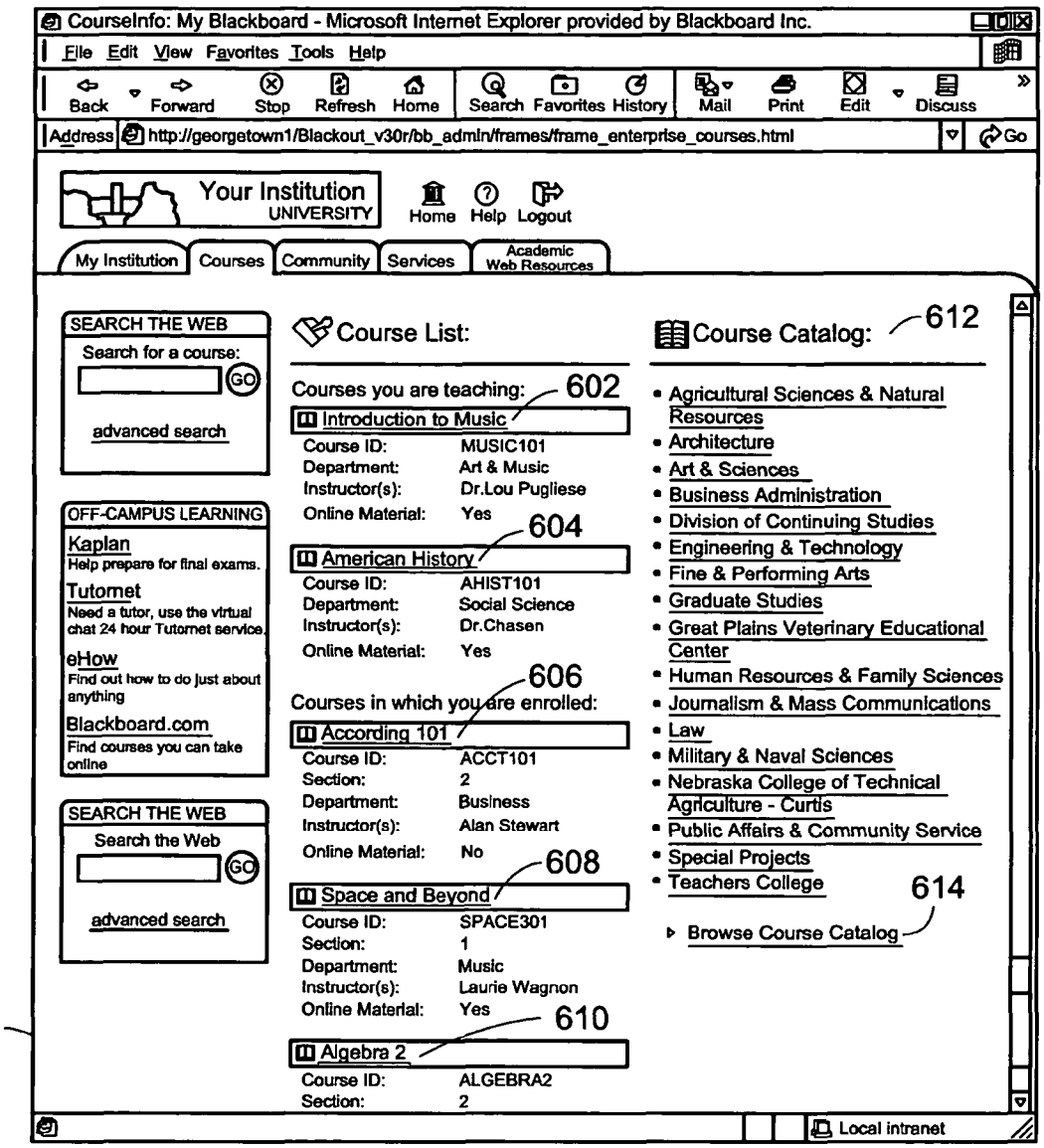
FIG. 6 is a screen shot of a web page according to the present invention that show the course list and course catalog available to student users.

By selecting the "Courses" tab 502, the user will be linked to a Course page 600 as shown in FIG. 6. Course page 600 provides direct links to the courses that they teach (602, 604) and/or are enrolled in (606, 608, 610). To access the course web-site, the user will click on the course title, such as at 602, 604, 606, 608 or 610, and he/she will be automatically linked to a web page associated with that course. The user also has the opportunity to browse the course catalog 612 by selecting the links on the right side of the page 600, where courses are listed according to category. The user may also search through the course search engine by selecting the Browse Course Catalog Link 614.

Figure 7:
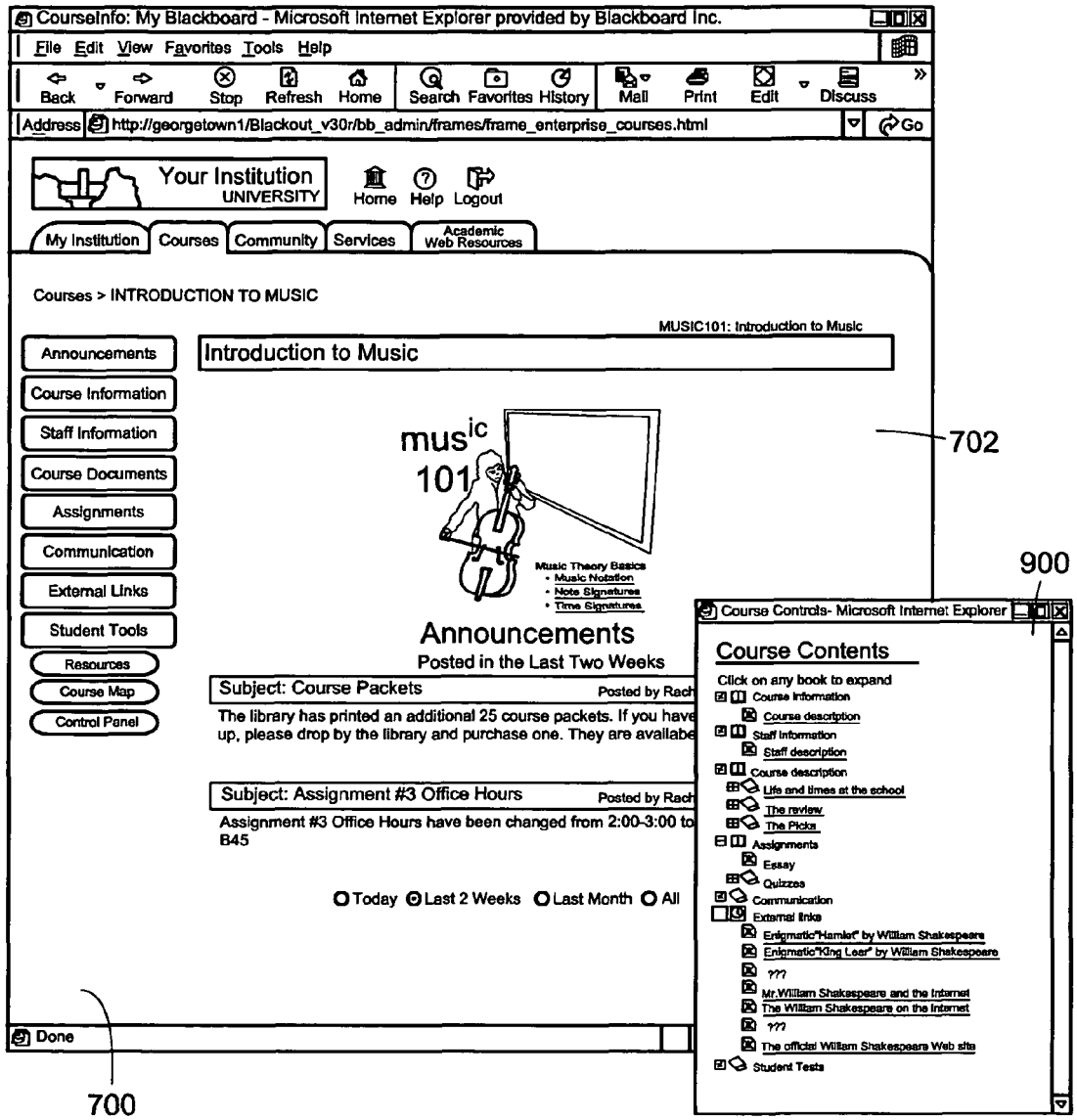
FIG. 7 is a screen shot of a default view for a course web site according to the present invention.
Figure 8:
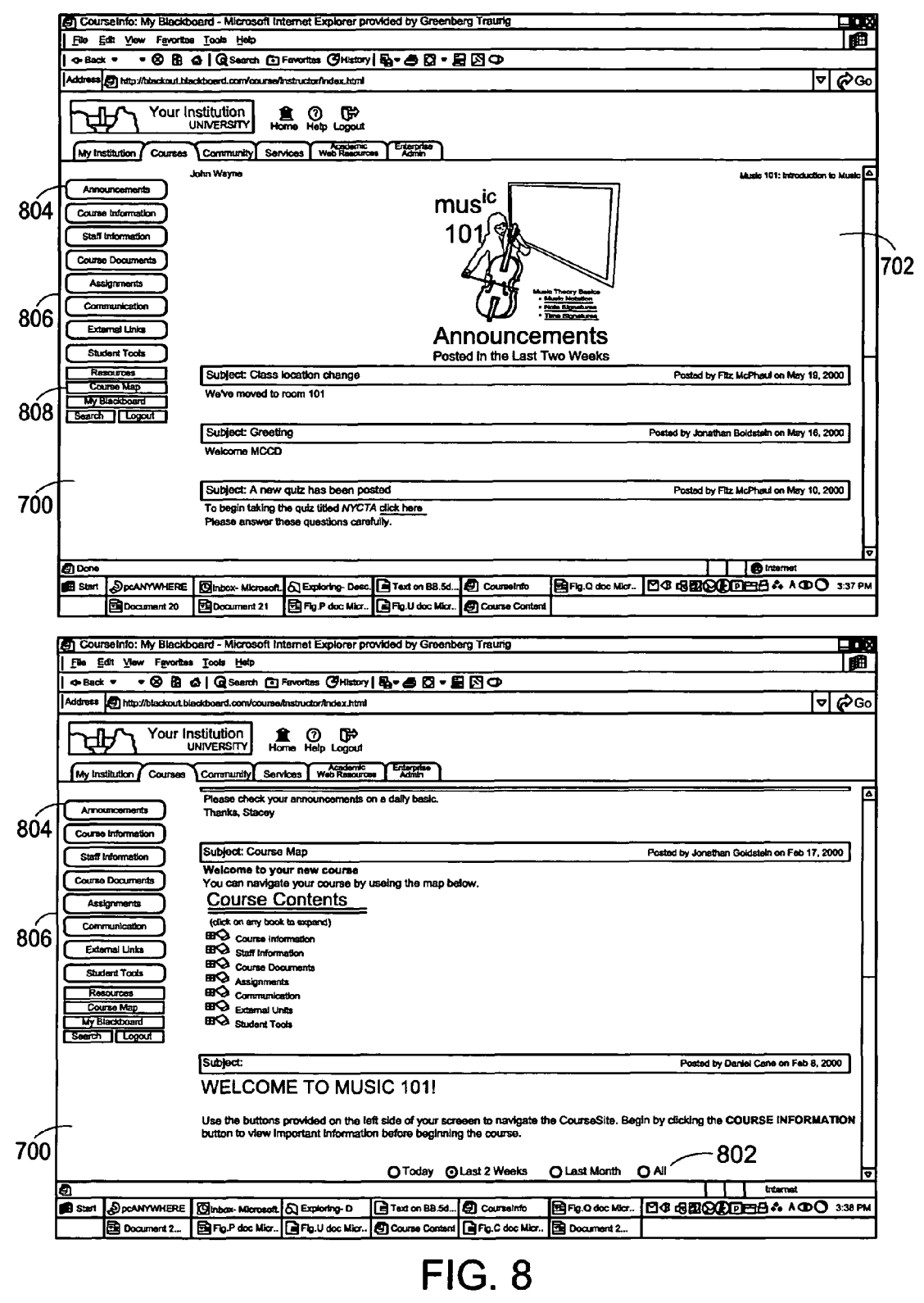

For example, by selecting the link 602 for the Introduction to Music course, which the user in this example is teaching, the user is shown the web page 700 illustrated in FIG. 7. The default view for the course web site 700 in this embodiment is the Announcements page 702, as shown in FIGS. 7 and 8. As seen at the lower part of the screen in FIG. 8, the user has the option of selecting various types of views by filtering out certain time-based announcements, i.e., today, last 2 weeks, last month, or all, by selecting button 802. The Announcements section can also be linked to after the user has left that page by simply clicking the Announcements button 804 on the navigation toolbar 806 on the left of the web page.

Figure 9:
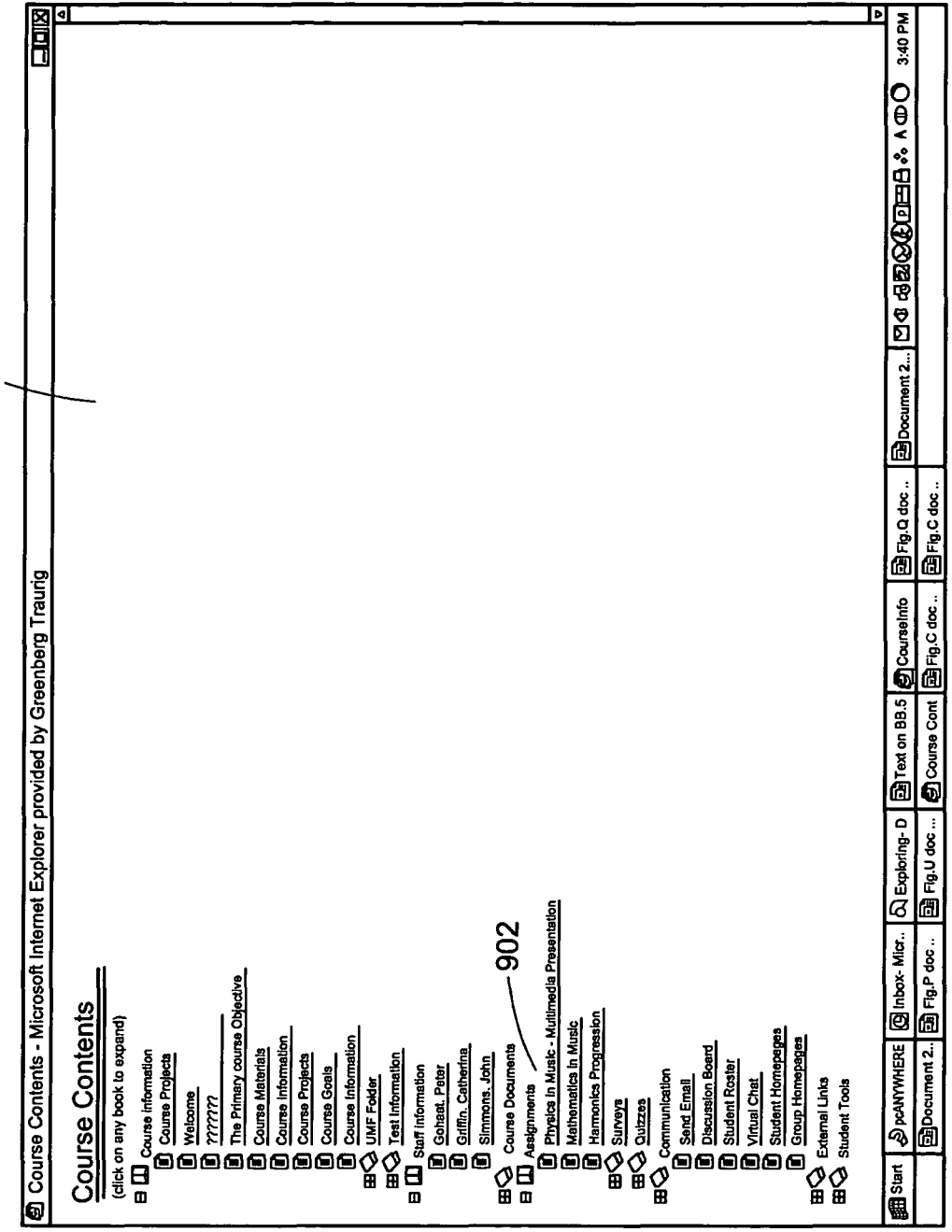
FIG. 9 is a screen shot of a course contents window according to the present invention.

Within the course web-site environment, the user is able to access all of the relevant course material and communication features as shown herein. The entire course outline may be displayed in a separate browser window 900, as shown in FIG. 9. At the browser window, the course contents are available for perusal and hyperlinking as desired. FIG. 8 shows the entire web page for Introduction to Music in two parts: an upper part and a lower part, which is scrollable as desired. One of the function buttons provided is labeled "Course Map" 808, which upon being clicked will pop-up the Course Contents window 900. The user will be able to expand or collapse the various headings provided in order to drill down into the entire course contents as currently configured. So, for example, the user can expand the Assignments section 902 and get a linkable list of all the assignments that have been created for the course to date. Any of the assignments may then be clicked for easy access. This separate window 900 is especially advantageous since it allows users to browse the entire course, regardless of their current location in the web-site.

Figure 10:
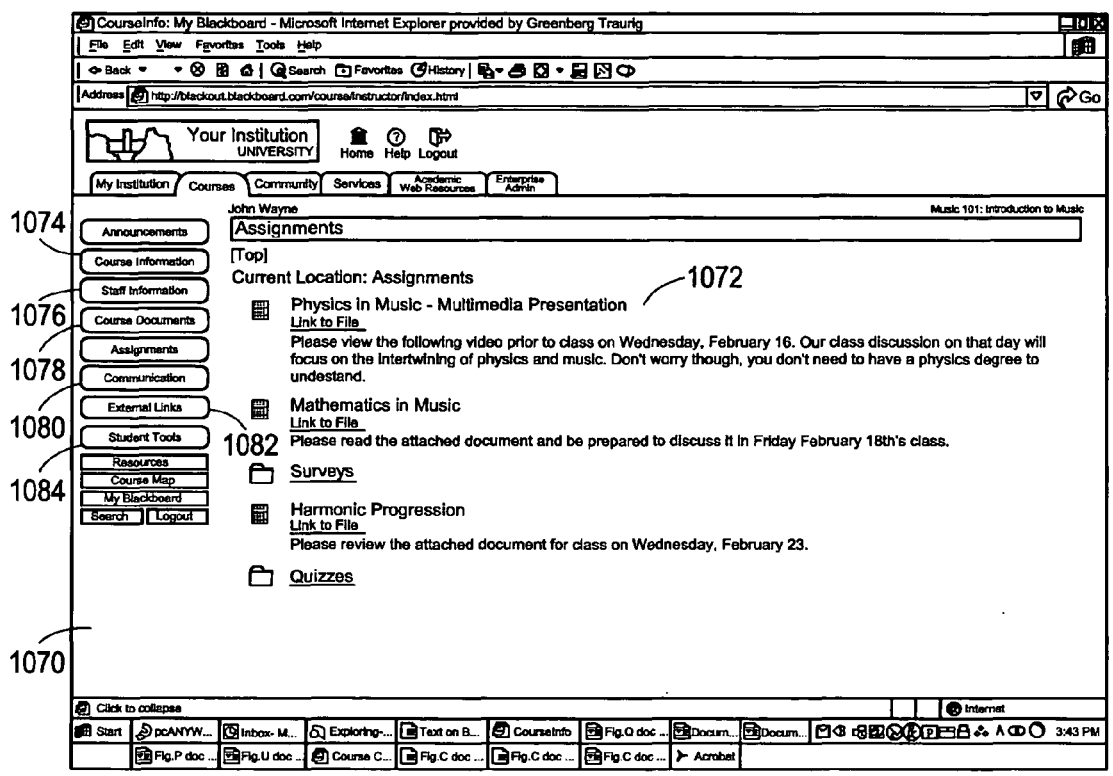
FIG. 10 is a screen shot of an assignment web page according to the present invention.

By selecting any of the Assignments links 902, the user would be linked to the web page 1070 set forth in FIG. 10.

This web page lists each assignment that has been compiled for the course, each of which can be linked to web pages that contain the full details of the particular assignment. The assignment page 1070 shown in FIG. 10 may be viewed by clicking the "Assignments" button 804 on the toolbar at the left of the course home page shown in FIG. 8. In general, any of the functions that are provided by toolbar buttons on the navigation bar at the left of the course home page will be available in any page accessed for that site, so that easy navigation may be had and the user may jump around and visit any desired portion of the course web site no matter where the user is currently located. Likewise, the Course Contents window provides similar functionality as described above.

As shown in FIG. 10, folders that have quizzes and surveys may be linked to by viewing the assignments web page. Clicking on these folders will present the student and/or instructor with a quiz that may be taken on-line. The answers may be graded automatically, in real time, as soon as the student has finished the quiz. This assessment functionality will be explained in greater detail subsequently.

In general, assignments may be provided in virtually any type of media that he instructor has at his disposal. For example, shown in FIG. 10 is a link 1072 to a multimedia presentation for "Physics in Music" that will give the student a content-enriched lesson that will be useful prior to the next lesson. Assignments may also be as simple as a text-based file that the student would read in preparation for the required class session.

In addition to selecting the Assignments page 1070 or the Announcements page 700, the user may select the Course Information button 1074 on the toolbar. This will link the user to a web page that will list information provided by the instructor that is useful to the student, such as an introductory welcome message or links to helpful resources. Resources otherwise found on other parts of the course web site may also be shown here if desired by the course web site developer. Links may be in the form of URLs to other web pages or resources or to folders that include groups of logically related resources.

Selection of the Staff Information navigation button 1076 will provide the user with a web page that will list each instructor, TA, or professor, along with an abstract listing office hours, address, telephone number for each, as well as a link that be clicked to send an email. This gives the student with quick, easy access to any instructor as may be desired throughout the course. Images and other types of multimedia files may also be made available at this page for enhanced content viewing.

Figure 11:
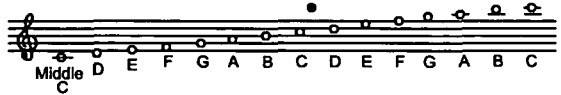
FIG. 11 is a screen shot of a course documents web page according to the present invention.

The user may select the "Course Documents" link 1078 shown in the navigational toolbar, after which the web page 1100 on FIG. 11 is provided for that course. This provides the user with immediate access to all documents relevant to the course. As a student, the user has access to all of the course materials, including additional links to information on the web that will enhance the instructional experience. As an instructor, the user has the ability to post documents of numerous file formats and from disparate locations.

Figure 12:
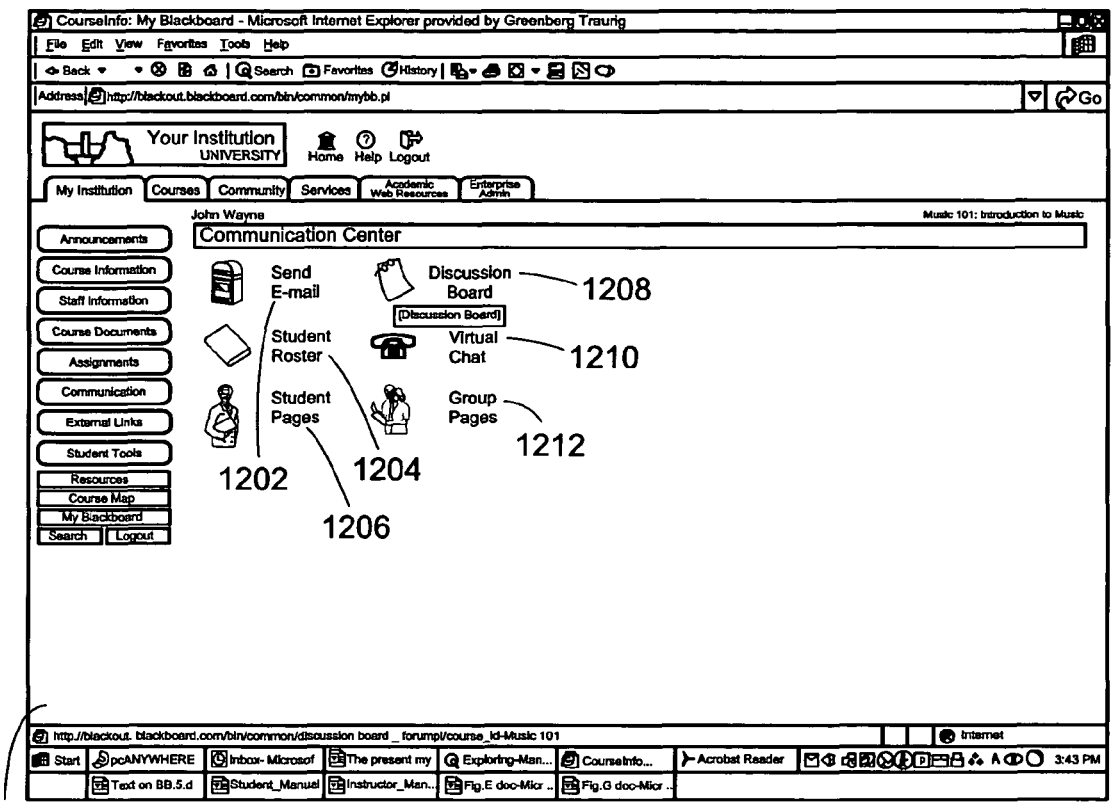
FIG. 12 is a screen shot of a communication centers web page according to the present invention.

By selecting the "Communication" tab 1080 shown in FIG. 10, the student is provided with the Communication Center web page 1200 as shown in FIG. 12. In this area, the user has at his/her disposal many different ways of establishing communications with other users of the system as well as accessing other areas of the system for various types of information. The user has access to an email utility 1202, a student roster list 1204, a list of student homepages 1206, a discussion board 1208, a virtual classroom chat 1210, and a group pages link 1212.

Selection of the Send E-Mail link 1202 loads a web page with various links that allow the user to send email to individuals registered for the course, or to students only, or to instructors only. The email function is accomplished via web-based email and allows for users to send attachments, as in many existing email packages available today. Selection of the Student Roster link 1204 displays a web page that lists all of the students registered for the course, along with contact information if allowed by the student, such as phone number, address, and email address. Selection of the Student Pages link 1206 provides a web page with links to the homepage for each student in the class.

Figure 13:
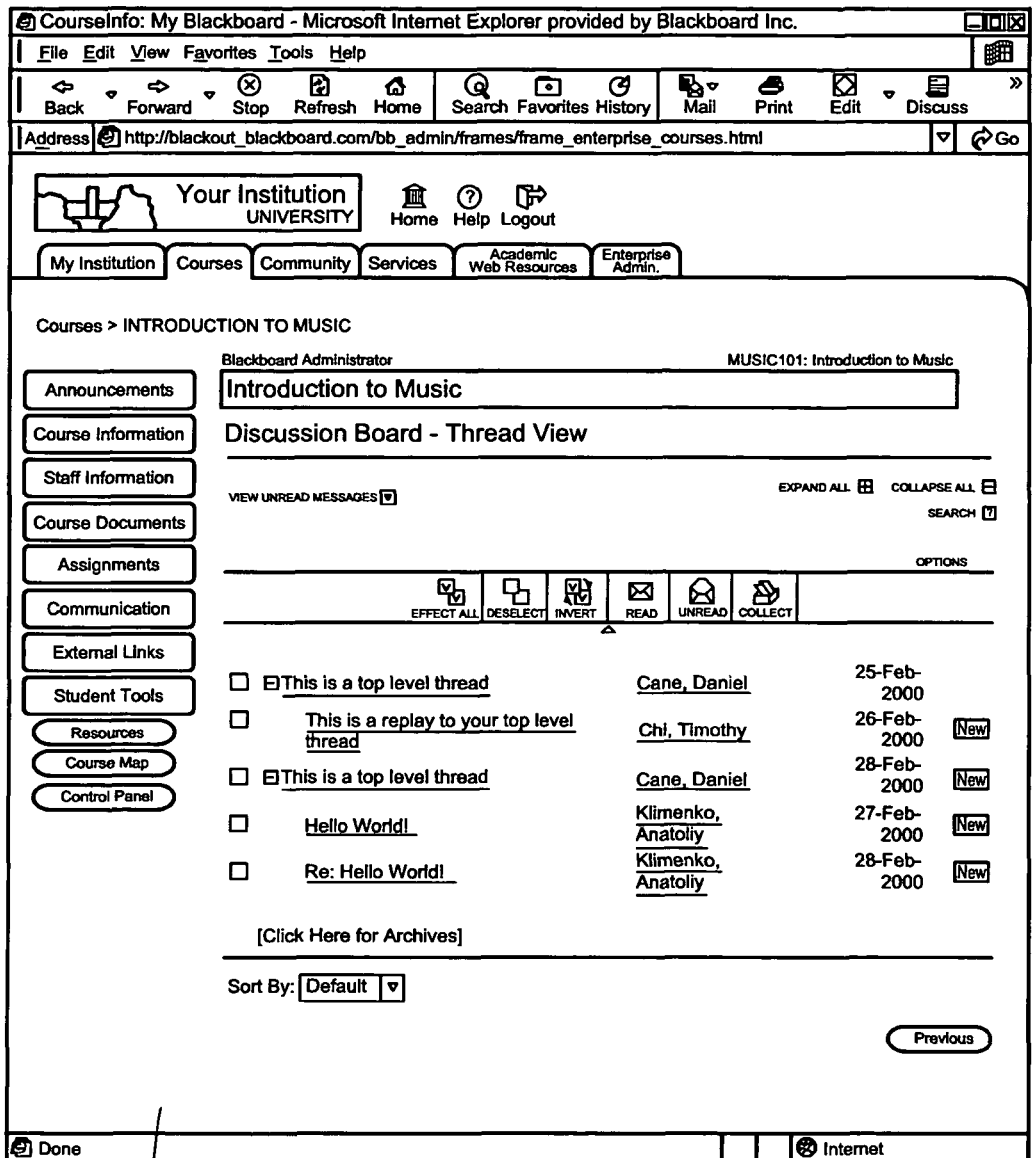
FIG. 13 is a screen shot of an asynchronous discussion board web page according to the present invention.

Another very effective communication tool is the asynchronous Discussion Board 1300, as shown in FIG. 13, which is displayed by the student selecting the Discussion Board link 1208. Students can access this for threaded discussions that are archived for easy retrieval. By using the discussion board, students can help each other learn even more easily outside of regular class hours. It can also be used as an effective method for instructors and TAs to provide a tutorial tool for out-of class questions and discussions that need to be saved for the purpose of sharing with the rest of that class. This utility operates in accordance with techniques well known in the art.

Figure 33:
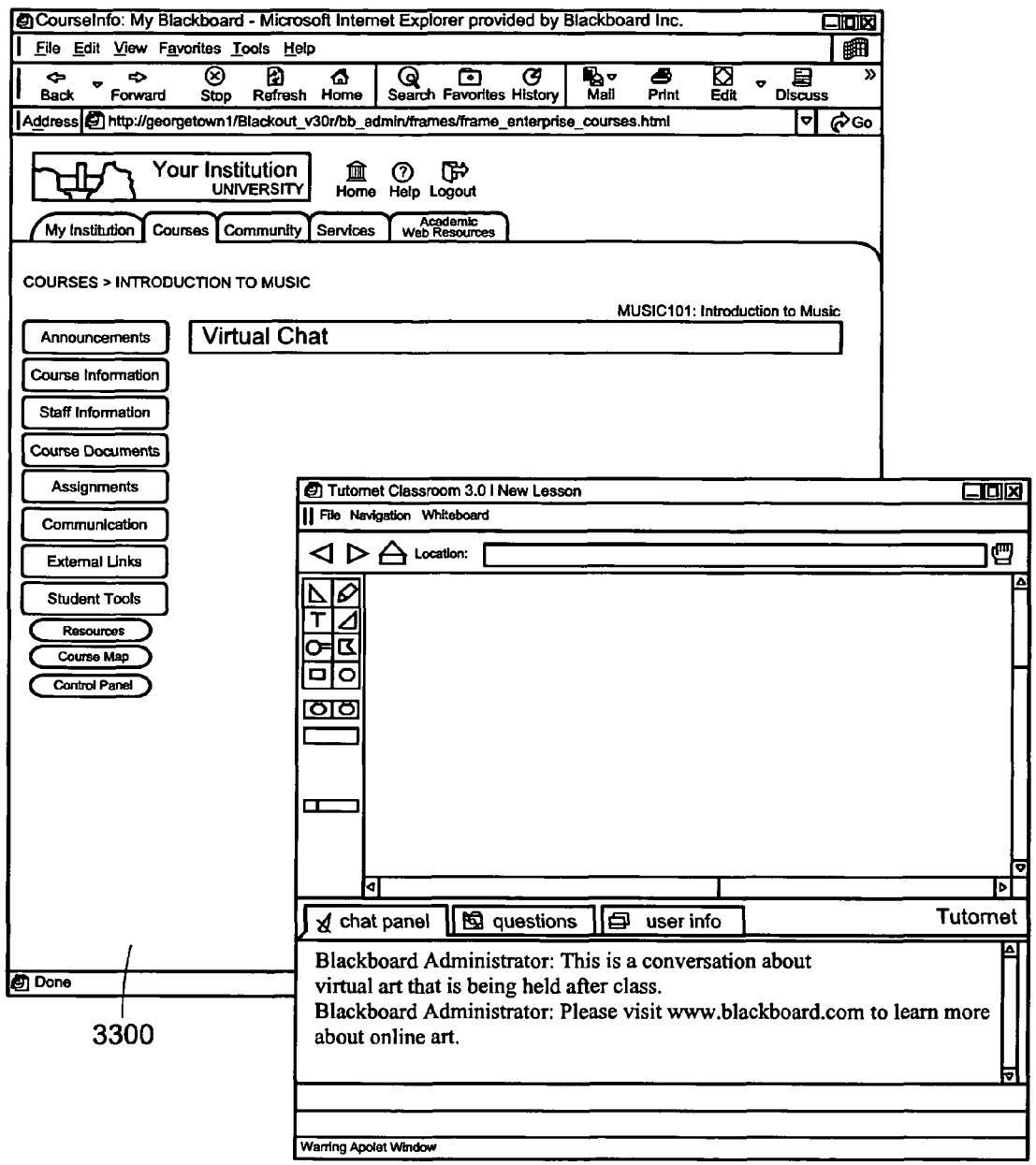
FIG. 33 is a screen shot of the virtual chat web page according to the present invention.

By clicking on the Virtual Chat link 1210, the student is provided with a web page 3300 as shown in FIG. 33, labeled "virtual chat". Each course has its unique chat area built into the course site. Students can engage in chats about the course, collaborate on assignments, and share information beyond the boundaries of the classroom or posted materials. The instructor can monitor the chats or actively engage in discussions. This real-time virtual chat is a feature that can also accommodate a whiteboard mode.

Selection of the Group Pages link 1212 displays a web page that lists various groups of users that are grouped by special interests, such as music lovers, bookworms, sports fans to name a few. Access to these groups is a definable parameter that is set by the system administrator.

Selection of the External Links button 1082 will display a web page that is provided with URLs for relevant content that the instructor deems may be useful to the student community. For example, in a law course, links may be provided to various legal research web sites, or a Congressional web page.

Figure 14:
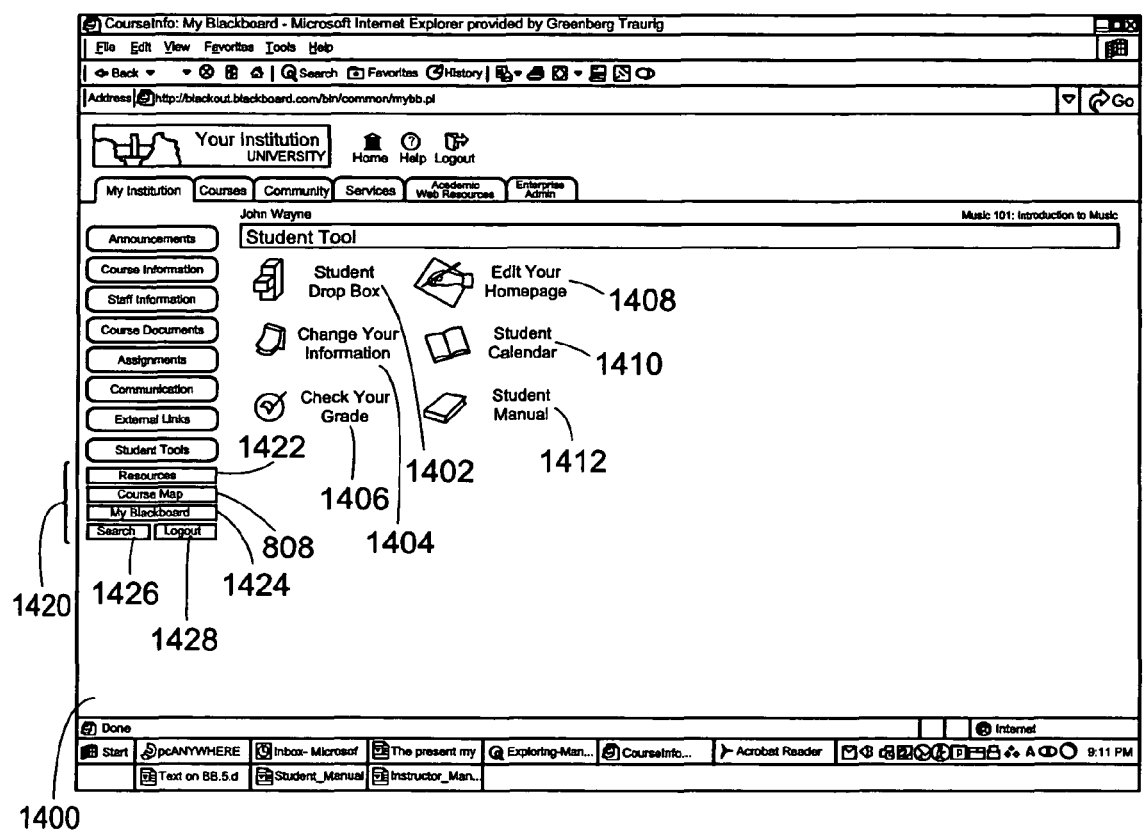
FIG. 14 is a screen shot of a student tools web page according to the present invention.

Selection of the Student Tools button 1084 will display a web page 1400 of associated links as shown in FIG. 14. These links include various tools needed by the student, such as the Student Drop Box 1402, Change your Information 1404, Check Your Grade 1406, Edit Your Homepage 1408, Student Calendar 1410, and the Student Manual 1412.

By clicking the Student Drop Box link 1402, the student is provided with a web page that will allow control and access to the student's digital dropbox, that is a folder of files that the student can exchange with the course instructor. As shown in FIG. 15, dropbox web page 1500 allows the student to type in box 1502 the resource location of a file that he wishes to provide to the instructor, or to browse his computer's hard drive with button 1504 or network drive in accordance with well known techniques to locate the file and insert the appropriate pointer. Clicking Send File button 1506 will finish the task of uploading the file. List 1508 of uploaded files that exist in the student's dropbox is also set forth in this page, along with a control link 1510 that enables the removal of files. By using this utility, the student can submit documents such as term papers to the instructor, who can then read and post comments to the file for return to the student and review.

Selection of the Change Your Information link 1404 provides the student with a web page that sets forth his personal data, such as name, address, email, phone number and password. In addition, certain system preferences may be set at this location. Similar to this link is the Edit Your Homepage link 1408, which will allow the student to access his homepage and make modifications as he desires.

Selection of the Check Your Grades link 1406 will deliver a web page that shows the grades that the student has been assessed in the course, such as for exams, quizzes, term papers, projects, and assignments. The student may be able to link to the specific exam or paper through this utility in order to review the exam again that may be useful for example in preparing for a final exam. The instructor may also provide to the student a statistical review of the entire class so that the student has a better feel for the grade he may receive: the class median, mean, curve data.

The Student Calendar button 1410 will provide well known PIM (personal information management) functionality to the student. The Calendar web page can display calendar events in a graphical display for that course, all the student's courses, all institution events, as well as personal calendar events programmed by the user. Different entities can program calendar events that can be selectively displayed by the student by selection of display functions on the page. For example, the instructor can program the calendar events for the course, and an administrator can program calendar events for the entire campus, and these will be displayed on the student's calendar since he is registered for the course. This provides the student with a greater ability to manage his calendar than has been available in the past.

The final button on the Student Tools web page is the Student Manual link 1412, which when selected provides the student with access to an on-line manual that may be used for a "help" reference in navigating the web site.

Located below the navigation button toolbar is a group of control buttons 1420. The Resources button 1422 links directly to a web page of related on-line resources to assist with course-related issues, as described further below. The Course Map button 808 gives a separate browser window with direct access to the course contents, as explained above. The My Blackboard button 1424 gives access to "My Blackboard" functionality as explained below. The Search button 1426 enables the user to search all course materials by criteria and keyword(s). The Logout button 1428 logs the user out of the current course. There may also be an Enroll in this Course button to allow students to register themselves in courses. Preferably, this button is only visible when the student accesses as a guest a course in which he is not enrolled.

Instructor Functionality

The instructor is provided with essentially the same functionality and control as is the student user, with additional functions defined herein. The instructor is provided with a complete set of navigational buttons for accessing announcements, course information, staff information, course documents, assignments, communication tools, external links, and student tools for a given course that he/she is teaching. The control panel also is given to the instructor to enable display of a set of links to course management and development tools that are available to an instructor.

Figure 16:
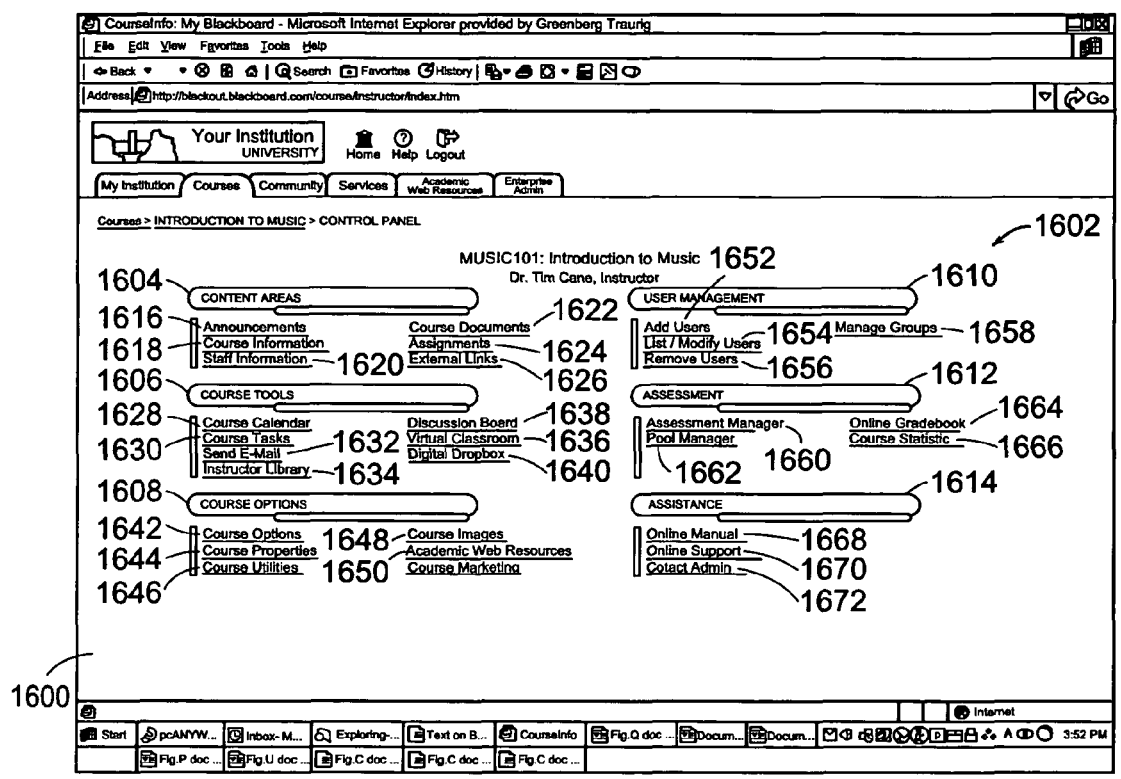
FIG. 16 is a screen shot of an instructor's control panel web page according to the present invention.

An exemplary instructor's control panel web page 1600 is shown in FIG. 16. This control panel 1602 provides the instructor with many features that are useful in managing the course he/she instructs. The control panel is divided into Content Areas 1604, Course Tools 1606, Course Options 1608, User Management 1610, Assessment 1612, and Assistance 1614, as described in detail subsequently below.

Content Areas

Figure 17:
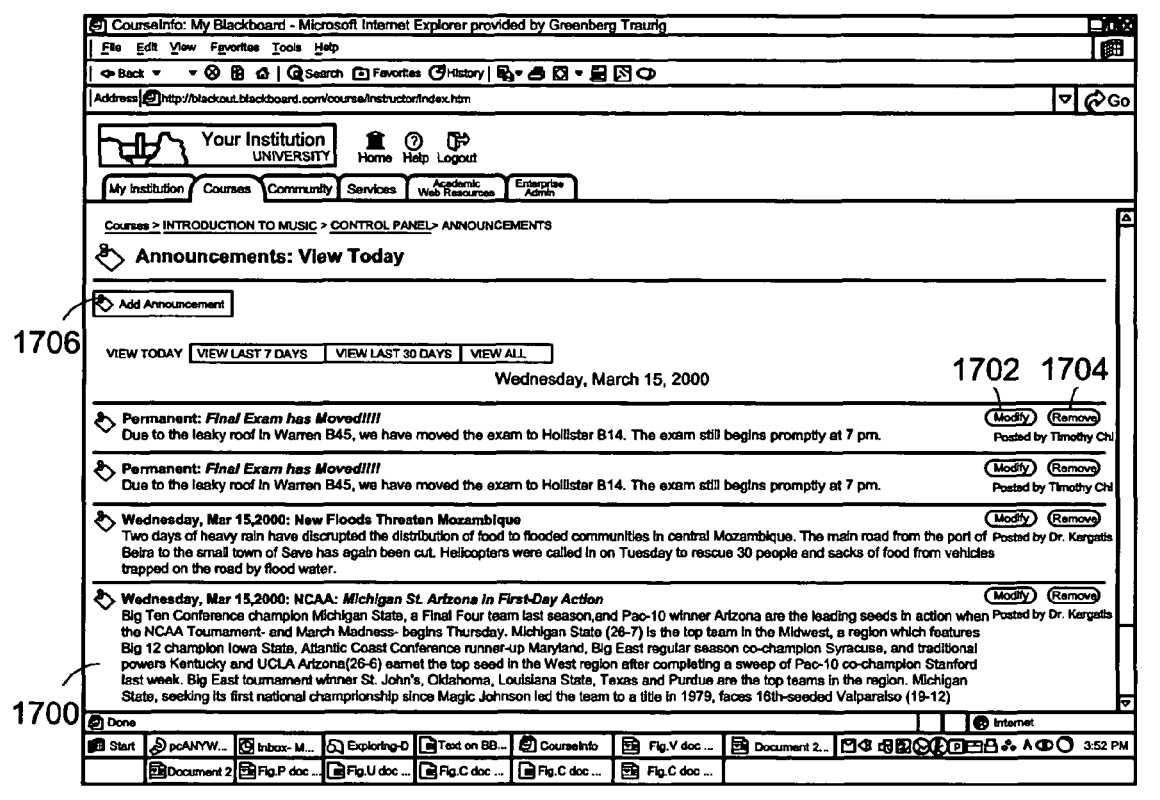

The Announcement link 1616 displays a web page 1700 as shown in FIG. 17 that will set forth all of the announcements that have been posted for the course, the author (e.g., which instructor, if there are more than one, authorized to access this area) of the announcement, and a modify button 1702 and a remove button 1704. An add announcement button 1706 is also provided, which displays a web page with a blank message field that he instructor fills in and submits to the server. The newly added announcement will then be posted to all students registered in the class.

Figure 18:
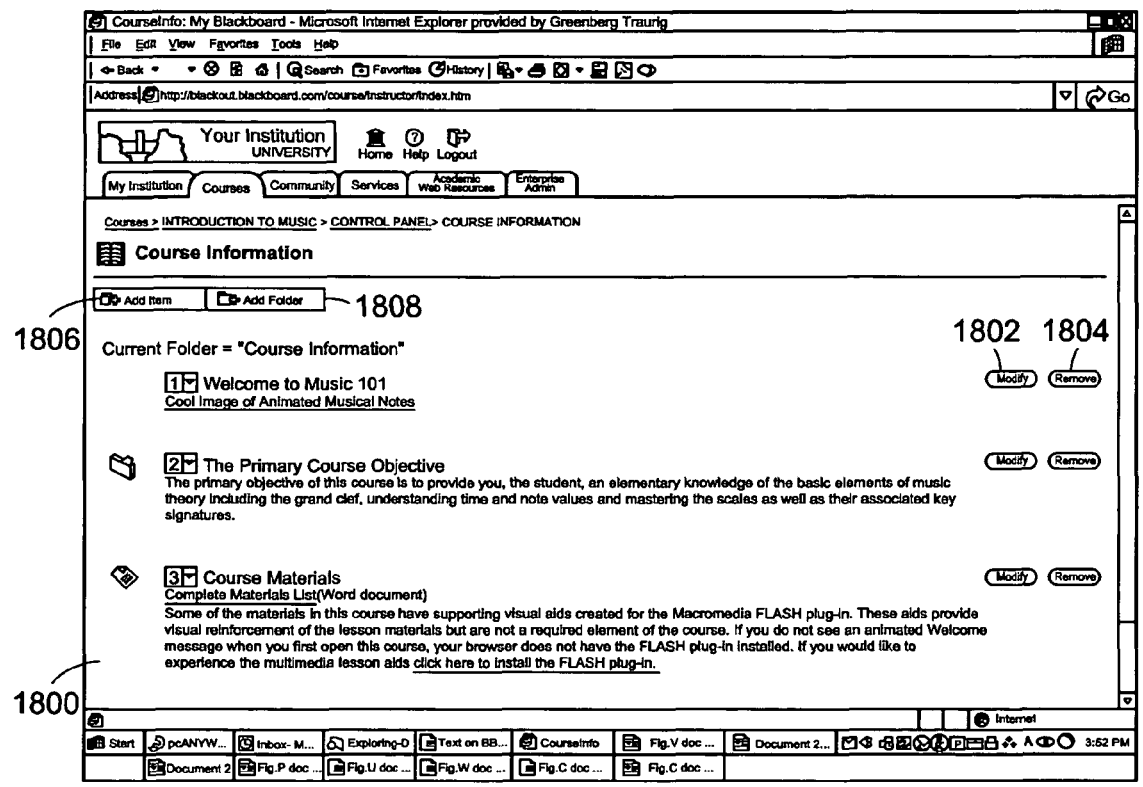
FIG. 18 is a screen shot of a course information web page according to the present invention.

The Course Information link 1618 displays a web page 1800 as shown in FIG. 18 that will set forth all of the course information documents or folders that have been posted for the course, and a modify button 1802 and a remove button 1804. An add item 1806 or add folder button 1808 is also provided, which displays a web page with various fields that the instructor will fill in to define the course information entry. After submitting the new entry to the server, the new course information is posted to all students registered in the class.

The Staff Information link 1620 displays a web page that will set forth all of the staff entries, e.g., instructors, Tasks, that are involved with the course, and a modify button and a remove button for each entry similar to those shown in FIG. 18. An add item or add folder button is also provided, which displays a web page with various fields that the instructor will fill in to define the new staff item entry. Fields are also provided for links to each staff member's email address and web page. Images of the staff member may also be inserted in the entry. After submitting the new entry to the server, the new staff information is posted to all students registered in the class as described above.

Similarly, the Course Documents link 1622 displays a web page that will set forth all of the course documents or folders that have been posted for the course, and a modify button and a remove button as discussed above. An add item or add folder button is also provided, which displays a web page with various fields that the instructor will fill in to define the course documents entry. The document may be uploaded directly to the server for later access by the student, or a link to an external referenced resource may be provided, e.g., a URL. After submitting the new entry to the server, the new course information is posted to all students registered in the class as described above.

Likewise, the Assignments link 1624 displays a web page that will set forth all of the course assignments or folders that have been posted for the course, and a modify button and a remove button. An add item or add folder button is also provided, which displays a web page with various fields that the instructor will fill in to define the course assignment entry. The assignment entry may be uploaded directly to the server for later access by the student. After submitting the new entry to the server, the new course assignment is posted to all students registered in the class as described above.

Also, the External Links link 1626 displays a web page that will set forth all of the external links or folders that have been posted for the course, and a modify button and a remove button. An add item or add folder button is also provided, which displays a web page with various fields that the instructor will fill in to define the external links entry. The external links entry may be uploaded directly to the server for later access by the student. After submitting the new entry to the server, the new external link page is posted to all students registered in the class as described above.

Course Tools

Under the Course Tools section 1606, the Course Calendar link 1628 displays a web page that will set forth all of the calendar events that have been posted for the course, and a modify button and a remove button. An add item button is also provided, which displays a web page with various fields that the instructor will fill in to define the new calendar item entry, e.g., description, date, and time. The calendar entry may be uploaded directly to the server for later access by the student. After submitting the new entry to the server, the new calendar page is posted to all students registered in the class as described above.

Figure 19:
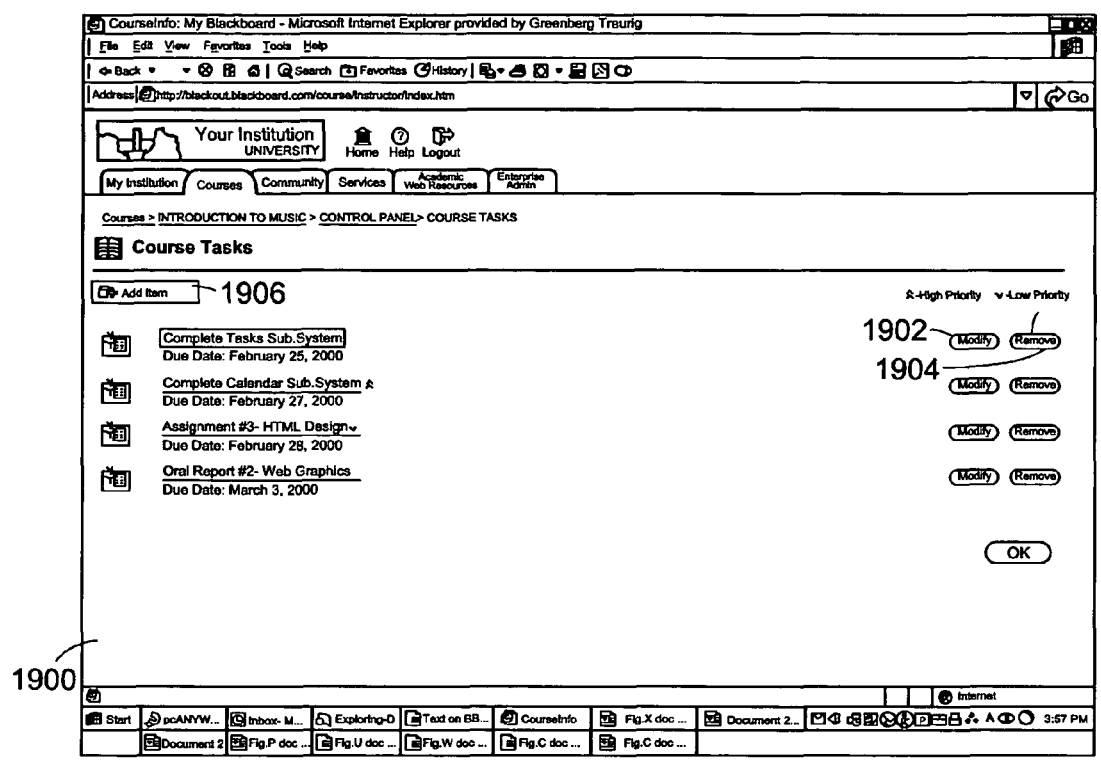
FIG. 19 is a screen shot of a course tasks web page according to the present invention.

The Course Tasks link 1630 displays a web page 1900 as shown in FIG. 19 that will set forth all of the tasks that have been posted for the course, and a modify button 1902 and a remove button 1904. An Add Task button 1906 is also provided, which displays a web page with various fields that the instructor will fill in to define the new task entry, e.g., description, date, and time. The task entry may be uploaded directly to the server for later access by the student. After submitting the new entry to the server, the new tasks page is posted to all students registered in the class as described above.

The Send Email link 1632 displays a web page that is similar to the one the user will be provided with in his email function, e.g., allows selection of individual users associated with the course, certain predefined groups of users such as all students.

Figure 20:
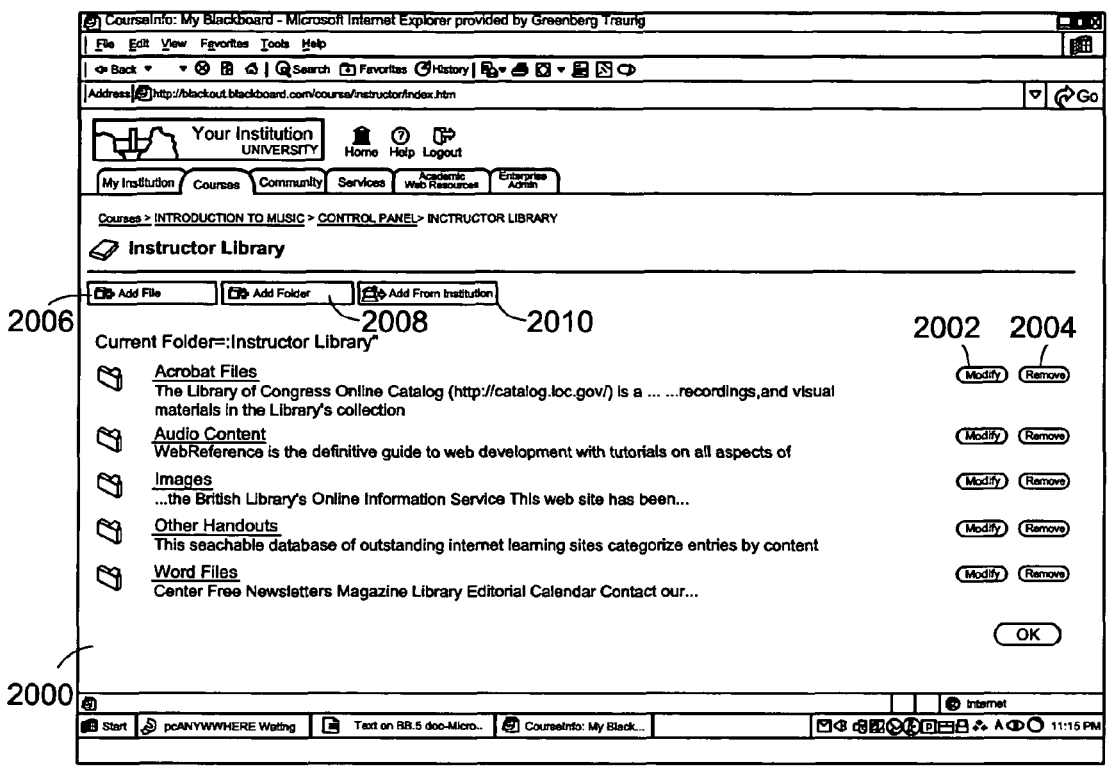
FIG. 20 is a screen shot of an instructor library web page according to the present invention.

The Instructor Library link 1634 displays a web page 2000 as shown in FIG. 20 that will set forth all of the folders and files that have been posted by the instructor for the course, and a modify button 2002 and a remove button 2004. These materials are accessible to instructors only and not to students directly. An Add File button 2006 and an Add Folder 2008 button is also provided, which displays a web page with various fields that the instructor will fill in to define the new entry. In addition, the instructor is able to select the Add From Institution button 2010 to select a new reference that is available from a pool of references made available to all instructors from the institution. The new entry may be uploaded directly to the server for later access by the instructors associated with the course. After submitting the new entry to the server, the new Instructor Library page is posted to all instructors associated with the course.

The Virtual Classroom link 1636 displays a web page that provides a link to either launch a virtual classroom and participate in real-time, synchronous classroom sessions), or to view the classroom archives, where are previous classroom session views and/or download these sessions to the instructor's computer. Each course includes a virtual Classroom, which is a synchronous chat room for student and group communications. The Virtual Classroom can be used to hold "live" classroom discussions, TA sessions, and office hour type question/answer forums. One can even have guest speakers and subject matter experts talk with the class in the Virtual Classroom.

A Virtual Classroom contains several distinct areas. The Whiteboard Space is where web pages are displayed, which is the large center area. One can also write or draw on this space using the drawing toolbar. The Menu Bar is used to change the information that appears on the whiteboard space, such as selecting a font to use on the whiteboard space and moving an object on the whiteboard space behind another object. One can also prepare lessons, navigate slides displayed on the whiteboard space, and clear the Group Discussion tab and Questions and Answers tab. The Application Tool Bar contains tools for navigating web pages. The Location Field is used to enter the URL of a web page the user would like to use during the Virtual Classroom session. The web page is then displayed on the whiteboard space. Users can also write or draw on the web page with the drawing toolbar. The Drawing Toolbar is used to write and draw on the whiteboard space. The Status s Region is where status messages are displayed at the bottom of the Virtual Classroom window. The Tab Panel is used to chat with students, respond to students' questions, control classroom behavior, and view information about the students in the Virtual Classroom.

The following panels are available:

| Name of Tab | Purpose |
| --- | --- |
| Group Discussion | Use this tab to talk with the students in the Virtual Classroom. |
| Questions and Answers | If a student uses his/her Questions tab to submit a question to the instructor, the instructor can then answer the question using the Incoming Questions tab. Thereafter, the instructor can view a log of their dialogue regarding the question on the Questions and Answers tab. |
| Participant Information | Use this tab to learn about the students in the Virtual Classroom, such as their names. |
| Slides | Use this tab to prepare and present a series of slides. (See Options in Preparing Lessons). The tab is only available to the Instructor. |
| Incoming Questions | If a student uses his/her Questions tab to submit a question to the instructor, the instructor can then answer the question using the Incoming Questions tab. Thereafter, the instructor can view a log of their dialogue regarding the question on the Questions and Answers tab. The Incoming Questions tab is only available to the instructor. |
| Access Control | Use this tab to control students' ability to conduct the four Virtual Classroom activities: Question, Chat, Drawing, and Navigating. The tab is only available to the instructor. |

Selection of the Discussion Board link 1638 displays a web page that provides links to the available discussion boards that are associated with the course. A discussion board is another communication tool to use in a classroom setting. This feature is similar to Virtual Chat, but is designed for asynchronous use, so users do not have to be available at the same time to have a conversation. An additional advantage of the discussion board is that user conversations are logged and organized. Conversations are grouped into forums that contain threads and all related replies.

Figure 21:
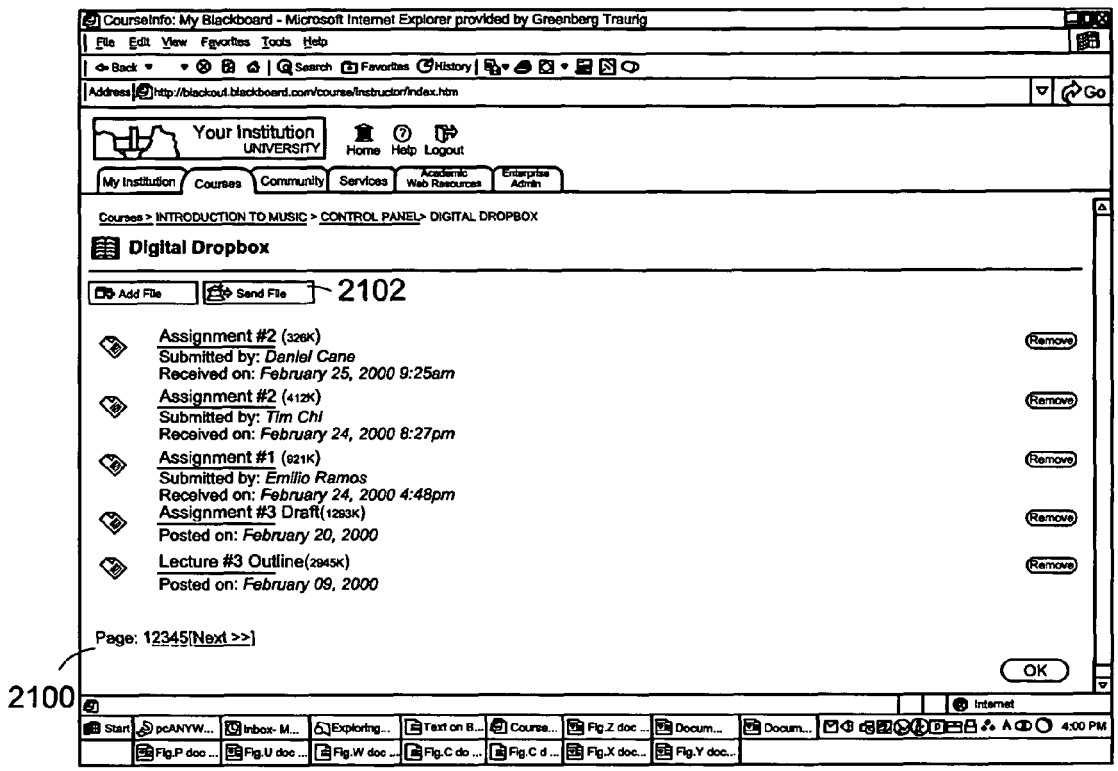
FIG. 21 is a screen shot of a digital dropbox web page according to the present invention.

Selection of the Digital Dropbox link 1640 displays a web page 2100 as shown in FIG. 21 that lists the files that exist in the digital dropbox. The Digital Dropbox is a tool that the instructor and students can use to exchange files. The Dropbox works by "uploading" a file from a disk or a computer to a central location. A participant can then come and "download" it to work locally. The Digital Dropbox is used to exchange materials between a single student and the instructor. Information that needs to be posted for all students should be placed in the Course Documents area using the Page Editors.

Individual student access to the Dropbox is available from the File Transfer Area located in Student Tools area on the Course. Students also have group access to a private dropbox from a group homepage.

The web page 2100 displayed lists the current files in the dropbox, which are the files that participants have sent to the user. Files posted here can be accessed and saved. The Send File 2102 to the s Student area is where files are uploaded and sent to specific students. The user can also delete files that are no longer needed.

Course Options

The Course Options area 1608 includes a Course Options link 1642 that will display a web page to the instructor that has the links for Button Availability, Tool Availability, Course Availability, Course Duration, Enrollment Options, Enrollment Fees, and Guest Access. Selection of the Button Availability link will display a web page that will allow the user to set and configure the buttons that are used by students in that course, including enabling or disabling them, or making them secure (i.e., only accessible by enrolled students). Selection of the Tool Availability link will display a web page that will allow the instructor to enable or disable the student tools and communication functions for that course, e.g., email, discussion board, virtual chat, student roster, group pages, student dropbox, edit homepage, personal information, calendar, grades, tasks, electric blackboard, student manual, and course search). Selection of the Course Availability link will display a web page that will allow the instructor to enable or disable the availability of the course to students, i.e., it can be kept unavailable until the course site is finished). Selection of the Course Duration link will display a web page that will allow the instructor to select the duration of the course, e.g., continuous, start and end dates, or number of days from the date of enrollment. Selection of the Enrollment Options link will display a web page that will allow the instructor to select the enrollment options as either "instructor led", which allows students to email enrollment requests to the instructor, or "self-enrollment", which also will specify the start and end dates and optionally require entry by the student of an access code to enroll. Selection of the Enrollment Fees link will display a web page that will allow the instructor to specify if fees should be charged for enrollment in the course, and what the fees should be. Selection of the Guest Access link will display a web page that will allow the instructor to specify if guests may access the course.

Selection of the Course Properties link 1644 in the Course Options area 1608 displays a web page that enables the instructor to add and/or edit course properties, including the course name, a description of the course, and a subject area for categorization purposes.

Selection of the Course Utilities link 1646 in the course options area 1608 displays a web page that enables the instructor to select a Course Recycler link, an Export Course Link, or an Import Course Cartridge link. The Course Recycler link enables the instructor to recycle the course by selectively removing areas of the course, which are displayed as check boxes next to various content categories, e.g., course documents, course information, textbooks, assignments, etc., various staff areas and external web links. The instructor can also choose to recycle other areas such as discussion boards, gradebook, assessments, etc. The Export Course link enables the instructor to export all, or specific sections, of the course, e.g., content, users, assessments, and/or discussion boards. The Import Course Cartridge link enables the instructor to download and install a course cartridge, if they have an access key.

Selection of the Course Images link 1648 in the course options area displays a web page that enables the instructor to select a Button Style link (to set the button styles for the course) and to select a Course Banner link (to add or remove a course banner on the first page of the course).

Selection of the Academic Web Resource link 1650 in the course options area displays a web page that enables the instructor to select an Enable/Disable Academic Web Button link (to enable or disable the resources button the course homepage) or a Customize Academic Web Button link (to designate the Academic Resources for the course, wherein the instructor can customize the number of links and the content that is available for the students).

User Management

Selection of the Add Users link 1652 in the user management area 1610 displays a web page that enables the instructor to select a Create User link, an Enroll Existing User link, or a Batch Add User link. The Create User link displays a web page that will enable the instructor to create a new user account and enroll him in the course, by inputting name, address, and other information regarding the user, designating the user's access level and providing a password if desired. The Enroll Existing User link displays a web page that enables the instructor to enroll a user in the course. The Batch Add Users link displays a web page that enables the instructor to create all of the user accounts by uploading a text file containing the user data.

Selection of the List/Modify Users link 1654 in the user management area 1610 displays a web page that enables the instructor to list and/or modify the users of the course, while selection of the Remove Users link 1656 displays a web page that enables the instructor to remove a user if desired from the course. Selection of the Manage Groups link 1658 enables the instructor to create and edit certain user groups, e.g., gifted students or remedial students.

Assessment

Within the course, instructors are able to provide quizzes, tests, and surveys on-line. Included may be essay, true/false, multiple choice, fill-in-the-blank, or matching questions. The questions can include text, graphics or multimedia. For the student, instant feedback is provided through automatic grading functionality. For the instructor, there is the ability to randomize the tests, time them, and create statistical reports of outcomes. Assessments within this system are an optimal way to increase student preparedness for class and to track and compare student progress over time. The Assessment area 1612 of the control panel 1602 allows the instructor to select an Assessment Manager link 1660, a Pool Manager link 1662, an On-line Gradebook link 1664, or a Course Statistics link 1666.

Selection of the Assessment Manager link 1660 in the assessment area 1612 displays a web page that enables the instructor to create, edit and otherwise manage the assessment content areas. For example, the instructor may create an assessment by entering an assessment name, a description, and setting certain parameters including Show Detailed Results, which shows the students the results for each question instead of simply their final grade, Reveal Correct Answer, which shows the students the correct answer for each question, Feedback Enabled, which allows students to view the feedback that the instructor has entered for each question, Allow Multiple Attempts, which allows students to take the assessment more than once, Set Time for Quiz, which sets a timer that is shown to the student during the exam, and Password Protect, which allows only those students with the entered password to take the test. By clicking the Modify option, a web page is displayed that enables the instructor to modify the assessment by adding items. An item is added by selecting the type of question, e.g., multiple choice, true/false, or fill in the blank, typing in the question text and possible answers with an indication of the correct one, specify the order of answers. The order of the questions also can be changed in this web page as well.

Selection of the Pool Manager link 1662 in the assessment area 1612 can display a web page that enables the instructor to Add Pool, Import Pool, Search Pool, or Export Pool. Pools are predefined groups of questions and answer sets that are logically linked, usually by subject matter, so that an instructor may draw from a pool to obtain existing questions and answers sets from other courses, instructors, semesters, etc. and not have to "recreate the wheel" every time they generate or modify a test. By clicking the Add Pool button, the instructor can add a new pool to the list of pools displayed on the Pool Manager web page. He will have to type in the name of the new pool and a description of it on this form. By clicking the Import Pool button, the instructor will enter the name of an existing pool to import, or alternatively browse a disk drive to find the pool to import. By clicking the Search Pool button, the instructor is presented with a web page that will enumerate various available pools that can be searched for questions of interest for importing. The entire pool can be previewed by selecting a preview mode, and all of the available questions in that pool may be viewed. By clicking the Export Pool button, a pool may be selected for exporting purposes. For the list of available pools set forth on the Pool manager page, the instructor may modify the pool, in which case a web page is displayed that lists all of the questions (and associated answer sets) that are in the pool. Each question in the pool may be modified in the same manner as explained above with respect to the assessment manager. Likewise, questions may be deleted entirely from a pool, and new questions may be added to the pool as described above with respect to the assessment manager.

Selection of the on-line Gradebook link 1664 in the assessment area displays a web page that enables the instructor to perform various functions with respect to the on-line course gradebook. FIG. 22 illustrates a web page 2200 entitled "Course Gradebook", which provides a variety of information including consolidated grades, individual assignment/test scores, direct access to specific assignments or tests by student, or a look at a specific test with aggregated results. This allows the instructor to organize the grade information so that it is meaningful. It provides insight into the effectiveness of certain assignments and provides a bridge for allowing instructor assessment of assignment and class content. The functions is provided on the On-line Gradebook web page in the assessment area of the control panel include Report By User, which is used to find a specific user and view statistics, assessment results, and modification of any scores for a user), Report By Item, which is used to view information about a specific gradebook item, Spreadsheet View, which is standard gradebook view as shown in FIG. 22, the instructor can modify, add or remove gradebook entries as well as view assessment results, and Export Gradebook, which is exported as a comma-delimited file.

Figures 1, 23B:
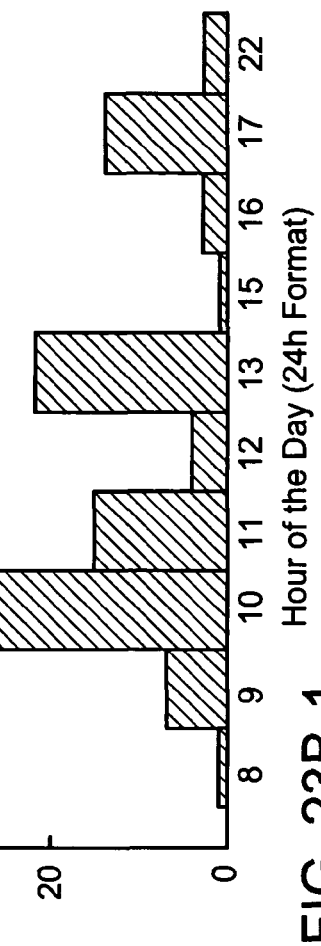
Figure 23B:
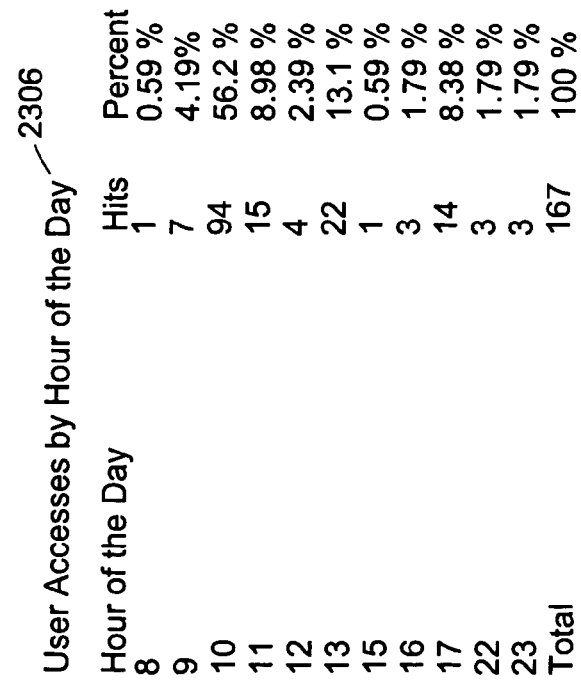
Figures 2, 23B:
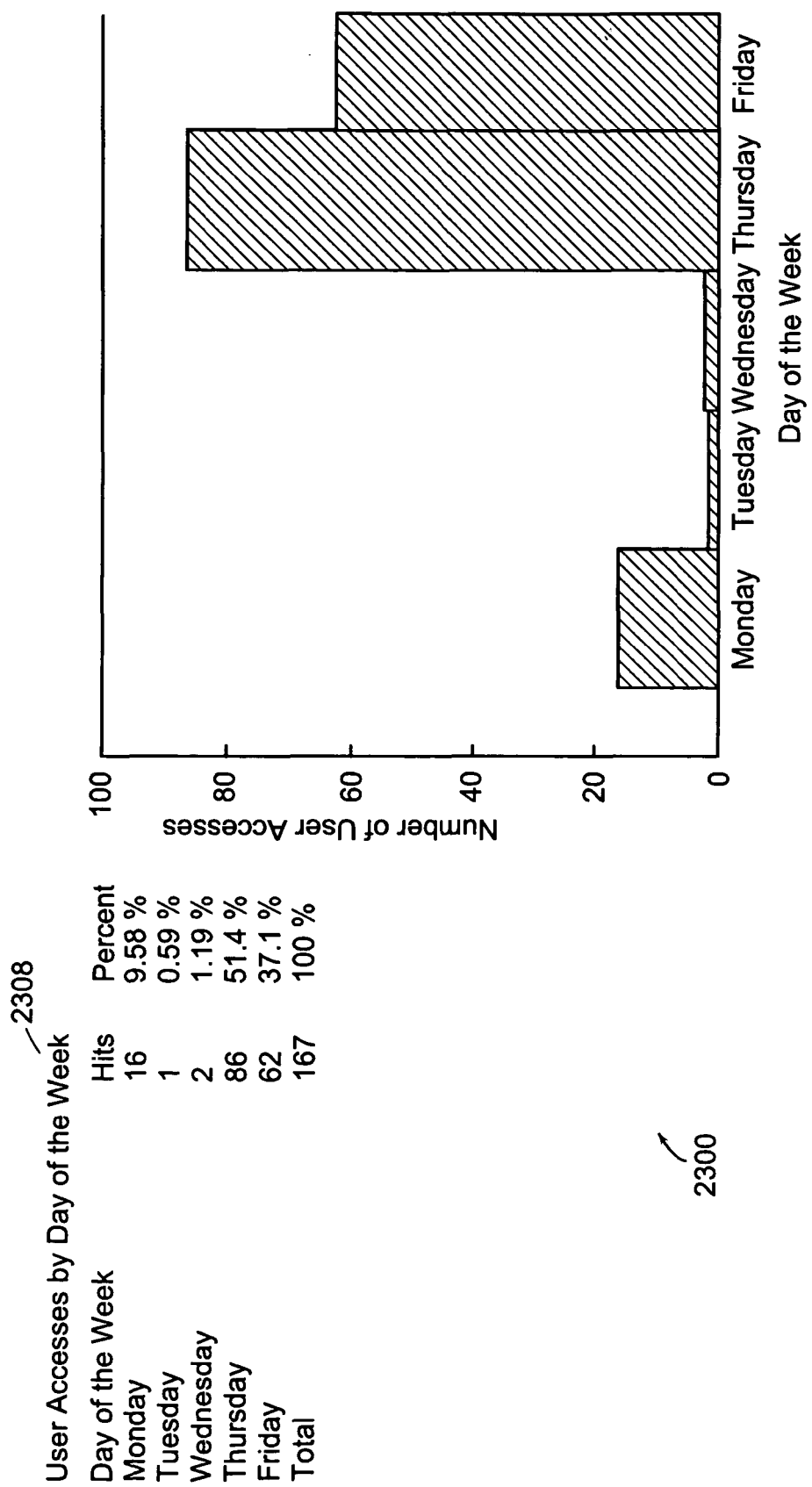

Selection of the Course Statistics link 1666 in the assessment area displays a web page that enables the instructor to set parameters and view certain statistics for their course. Most instructors want to analyze their class by how much their on-line materials are being accessed, but very few have the opportunity to take the time or the effort to determine these numbers. By using the course statistics web page 2300 shown in FIGS. 23A and 23B, the system provides a rich tool set for instructors to evaluate the relative statistics of their courses. These statistics may be valuable for evaluating on-line versus non-on-line courses to determine the relative efficacy of on-line materials and how they are enhancing the course. The Course Statistics web page has input fields for selecting a report filter, which will yield a report with Overall Summary of Course Usage, Main Content Areas report, Communication Areas Report, Group Areas Report, or Student Areas Report. A time period must be specified, which may be all dates or between a begin and an end date. The users must be selected, which will be either all users or a selected subset thereof. Other options include Total Number of Access per Area 2302, Number of Accesses over Time 2304, User Accesses per Hour of Day 2306 or Day of Week 2308, and Total Accesses by User 2310. The data, charts and graphs as shown in FIGS. 23A and 23B will then be displayed to the instructor.

Assistance

Finally, there is an Assistance area 1614 defined in the Control Panel, which sets forth links that will provide the instructor with various types of help. Selecting the On-line Manual link 1668 will retrieve an HTML based Instructor Manual in a separate browser window. The On-line Support link 1670 will retrieve a web page with contact info for sending an email to a support person, and the Contact Admin link 1672 will bring up a web page with contact info for sending an email to an administrative contact.

Administrator Functionality

The Administrator Panel 2402, shown in FIG. 24, gives the system administrator complete access to all of the features of the system including portal features, course and club creation and management, institution and system tools, e-commerce features, user management, and other various institutional options. This is accessed by selecting the Enterprise Administration tab 2404 shown on the homepage.

The Administrator panel 2402 includes a Portal Areas group 2406 of functions, a System Tools area 2408, an Enterprise Tools Area 2410, a System Options Area 2412, a Course and Community Management area 2414, a User Management Area 2416, an E-Commerce Area 2418, and an Assistance area 2420, as explained further below.

Portal Areas

Selection of the My Institution tab 2422 in the Portal Area 2406 provides a web page that lists four hyperlink selectable options: Customize Institution Tab, Institutional Module Options, All Module Options, and Off-Campus Institution Partnerships. The Customize Institution Tab link will provide a web page that allows the user (an enterprise administrator, in this case) to enable/disable the appearance of the "My Institution" tab for all users, as well as enable/disable a Welcome Message that may be displayed at logon. The user may also select an image for the tab, as well as the name, and provide a predefined URL that will be associated with the tab when selected by the end user.

The Institutional Module Options refers to the default layout is the set of modules that new users sees the first time they log in to the portal. This allows the enterprise administrator to enable/disable and/or set as required the following modules: My Courses, My Organizations, Today's Announcements, Today's Tasks, Today's Calendar, School Services, Student Module, Faculty Module, Staff Module, Alumni Module, Perspective Student Module, Guest Module, Other Module, Institution Newspaper Module, and Blank Module, which may be customized.

The All Module Options link allows the user to enable/disable and/or set as required the following modules: Bookmark, Calculator, Channels, Clip, Comment Clip, Custom is Search, Directory, Discussion Boards, various co-branded portal links, such as EXCITE news, entertainment features, stock prices, sports updates, maps, and shopping site links, yellow pages links.

The Off-Campus Institution Partnerships link allows the user to add, modify, and edit hyperlinks to web sites with which the institution has formed various partner or other types of arrangements. This could be a partnership with an off-campus bookstore may be provided as a means for supplementing the on campus bookstore.

Selection of the Course tab 2424 in the Portal Area provides a web page that lists four hyperlink selectable options: Customize Courses Tab, Enable/Disable Course Creation, Course Catalog Options, and Off-Campus Learning Partnerships. The Customize Courses Tab link will provide a web page that allows the user, again an enterprise administrator, in this case, to enable/disable the appearance of the "Courses" tab for all users. The user may also select an image for the tab, as well as the name, and provide a predefined URL that will be associated with the tab when selected by the end user.

Selection of the Enable/Disable Creation Option link provides a web page that allows the enterprise administrator to select an option to not allow users to create courses, to allow users to create courses, or to allow the user to send an email request for course creation. Selection of the Course Catalog Options link provides a web page that allows the enterprise administrator to select the use of a default course catalog or to specify the use of an internal course catalog and the URL of its location. The Off-Campus Learning Partnerships link allows the user to add, modify, and edit hyperlinks to web sites with which the institution has formed various learning partner arrangements. Examples are a link to the KAPLAN or TUTORNET web sites.

Selection of the Community tab 2426 in the Portal Area provides a web page that lists five hyperlink selectable options: Customize Community Tab, Enable/Disable User Creation of Organizations and Discussion. Boards, Organization Catalog Options, Manage Discussion Boards, and Off-Campus Community Partnerships. The Customize Community Tab link will provide a web page that allows the enterprise administrator to enable/disable the appearance of the "Community" tab for all users. The user, may also select an image for the tab, as well as the name, and provide a predefined URL that will be associated with the tab when selected by the end user.

Selection of the Enable/Disable User Creation of Organizations and Discussion Boards link provides a web page that allows the enterprise administrator to select options to allow or disallow instructors and students to generate general organizations and discussion boards from the Community Tab or limit organization/discussion board creation to the system administrator.

Selection of the Organization Catalog Options link provides a web page that allows the enterprise administrator to select the use of a default club catalog or to specify an internal club catalog and the URL of its location. The Manage Discussion Board link provides a web page that allows the user to set various parameters and otherwise add and manage various discussion boards on the system. The Off-Campus Community Partnerships link allows the user to add, modify, and edit hyperlinks to web sites with which the institution has formed various arrangements.

Selection of the Services tab 2428 in the Portal Area provides a web page that lists three hyperlink selectable options: Customize Services Tab, Institution Services, and Off-Campus Service Partnerships. The Customize Services Tab link will provide a web page that allows the enterprise administrator to enable/disable the appearance of the "Services" tab for all users. The user may also select an image for the tab, as well as the name, and provide a predefined URL that will be associated with the tab when selected by the end user.

Selection of the Institution Services tab allows the user to create and manage links to other relevant parts of the campus intranet. The Off-Campus Service Partnerships link allows the user to add, modify, and edit hyperlinks to web sites with which the institution has formed various service arrangements.

Under the System Tools area 2408 of the Portal Manager web page, various links are provided to web pages that allow the enterprise administrator to manage Announcements 2411, the Institution Calendar 2413, the Institution Tasks 2415, and Send E-Mail 2417 in a manner similar to what was described with respect to similar tabs in the previously described sections above.

Under the Enterprise Tools area 2410 of the Portal Manager, links are provided to web pages that allow the enterprise manager to manage Institution Library 2419, and View Published Requests. The Manage Institution Library web page allows the user to add new items from local disk or his inbox into the institution library, edit items, or remove items. The View Published Requests web page allows users to view, approve and reject instructor published files for the Institution Library. Under Enterprise Tools 2410, there is also Web Email Management 2421 and Advance Domain Management 2423, which provide conventional email and domain name management services.

Under the System Option area 2412 of the Portal Manager, the user is provided with links to Gateway Options 2425, System Settings 2427, System Statistics 2431, Institution Properties 2430, Colors and Images 2432, and Course Marketing 2434. The Gateway Options link 2425 provides a web page that will determine whether the login button, course catalog, and new user account button appears on the gateway page. The System Settings link 2427 provides a web page with links to Button Overrides, which sets which button areas can be used throughout the system), Tool Overrides, which sets which tools can be used throughout the system), System Settings/Overrides, which set overrides for course and club tools and properties across the entire system), and Course Disk Quotas, which sets file system disk quotas for courses.

The System Statistics link 2431 provides a web page with links to a System Reports web page, which allows the enterprise administrator to view reports covering the system and its usage, an Auto-Reporting Options web page, (which sets various options for automatically reporting statistics to a service provider), and a Send System Statistics web page, which will send the statistics to the service provider on demand.

The Institution Properties tab 2430 provides a web page that allows the enterprise administrator to view system information such the current version of the software, the registration page, and email contacts. The Colors and Images link

2432 allows access to a web page that allows the administrator to modify the aesthetic properties of the web site.

The Course and Community Management area 2414 of the Portal Manager provides hyperlinks for Create Course 2436, Manage Courses 2438, Course Utilities 2440, Course Catalog 2442, Create Organization 2444, Manage Organization 2446, organization Utilities 2448, and Organization Catalog 2450.

Figure 29:
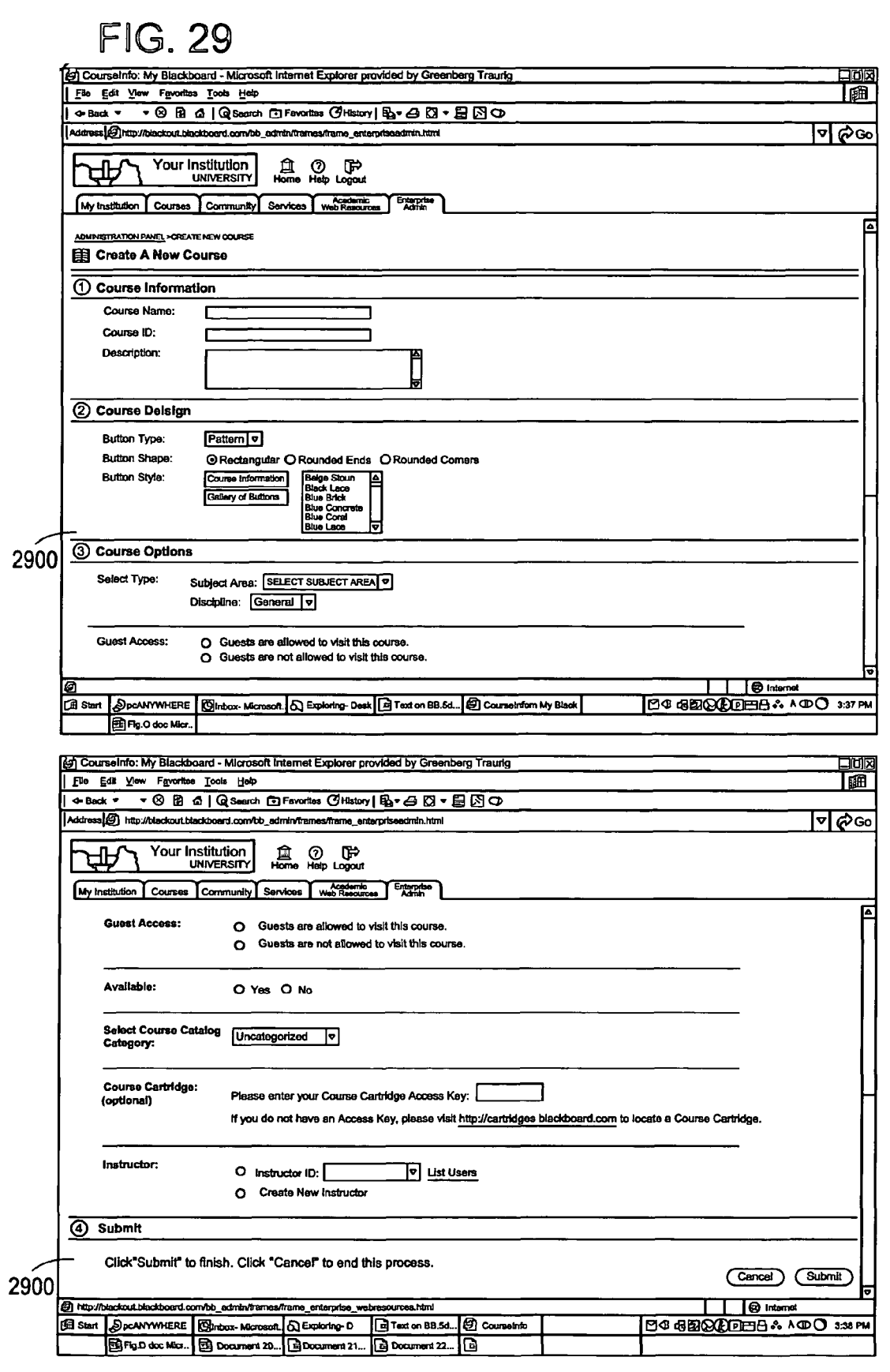

The Create Course web page 2900 is shown in FIG. 29. The administrator will enter the requested information about the desired course; e.g., the course name, and ID, and a textual description on the web page. The administrator can then specify properties of the buttons that will be used along with the course to match his aesthetic concerns. The administrator can then specify various options, such as the subject area of the course, whether guests may access the course, if the course is currently available, if a course cartridge may be obtained and its URL and access key, and the instructor ID for the course.

The Manage Courses web page allows the administrator to list and/or modify courses, remove them from the system, and set certain default tools, e.g., email, Discussion Board, Virtual Chat, Roster, and buttons, e.g., Announcements, Course Information, Staff Information, Virtual Classroom, etc.) to be used with each course in the system. The Course Utilities web page allows the administrator to select a Copy Course link (to make a copy of a course with a new course ID), an Import Course link, an Export Course link, and a Batch Create Courses link. The Course Catalog link allows the user to categorize course and otherwise manage the course catalog.

The Create Organization, Manage Organization, Organization Utilities, and Organization Catalog links allow the user to obtain similar control and functionality with organizations as with courses as described above.

Figure 30A:
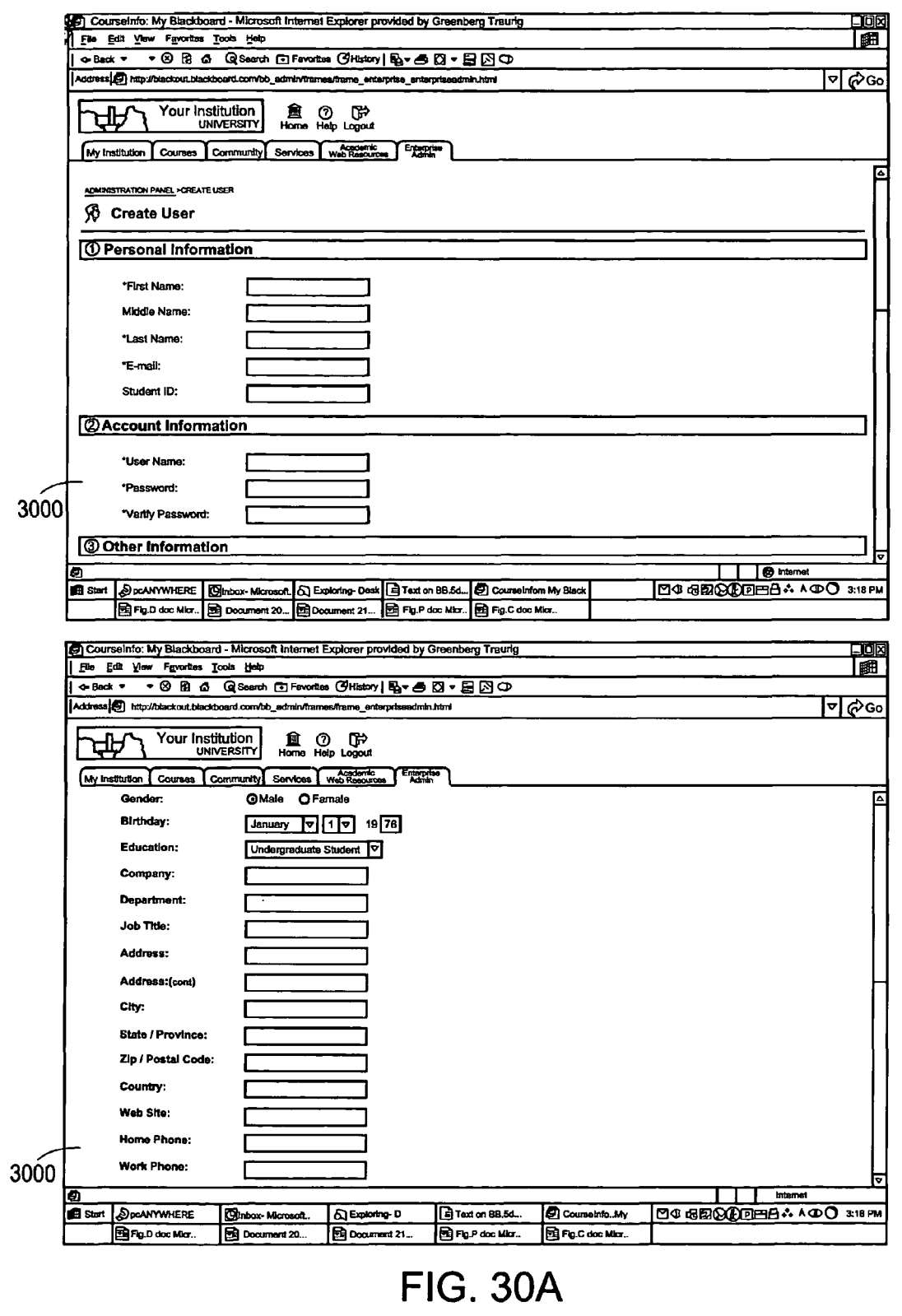
Figure 30B:
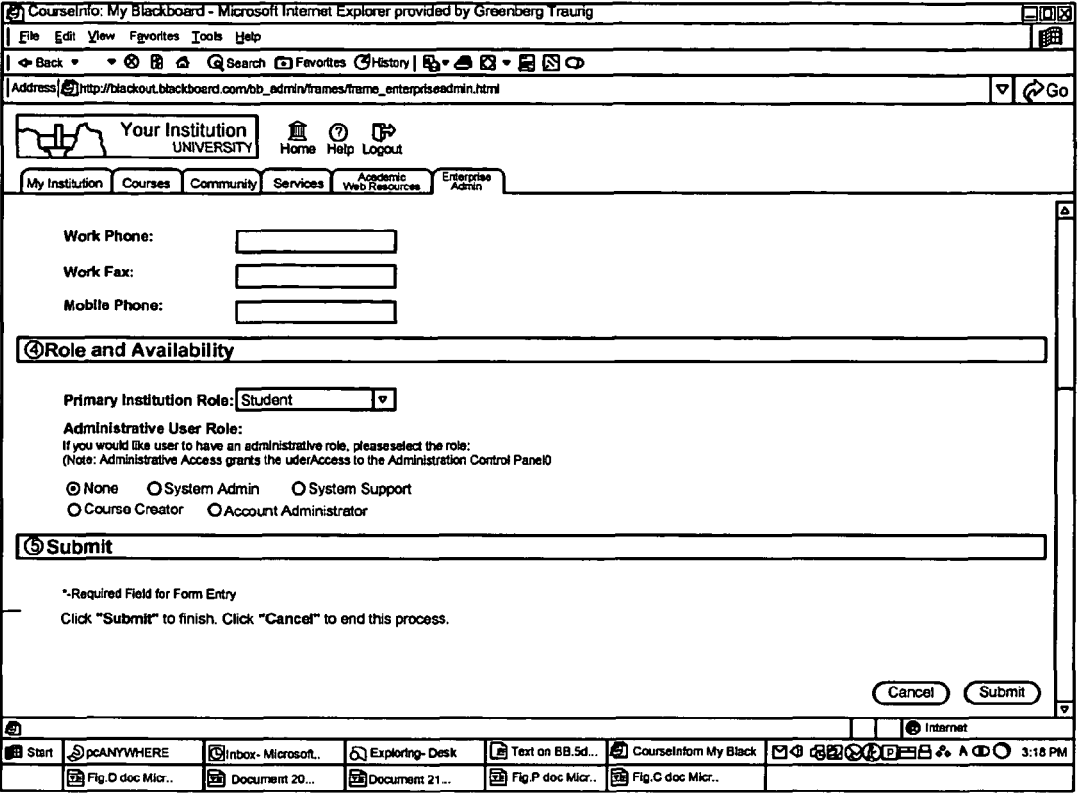

The User Management area 2416 of the Portal Manager provides hyperlinks for Create User 2452, Manage Users 2454, and User Utilities 2456. The Create User web page 3000 (FIGS. 30A and 30B) allows creation of a user entry by entering personal information, such as name, address, etc., and a user name and password. The access level of the user is set at this time, which may be a Student, Faculty, Staff, Alumni, Guest, etc. Also, the user may be given an administrative access level at this point by selecting the appropriate option that is available, such as, None, System Admin, System Support, Course Creator, Account Admin). The role of the user will determine the access and control of the system that the user will have as explained throughout this document. Once a user is created, the Manage User web page allows listing, modification, and/or removal of users. The User Utilities link 2456 allows the system administrator to Batch Create Users, which will cause the uploading of a file of user data in predefined formats compatible with the system), Batch Enroll Users, which will cause the importing of a file to enroll users in courses and clubs that exist in the system), and Batch Remove Users, which will cause the importing of a file to remove users from the system).

The E-Commerce area 2418 of the Portal Manager provides links to web pages for Sponsorships 2458, Partnership Program 2460, and Course E-Commerce 2462. The Sponsorship web page has links to Primary Site Sponsor web page a "My Institution" Area Sponsor, a Course Area Sponsor, a Community Area Sponsor, and a Services Area Sponsor. These links allow the user to designate if a sponsor is used in each of these capacities and an image of the sponsor link. The Partnership program page allows the administrator to enroll the institution in the service provider partnership program, which can bring additional e commerce opportunities to the portal environment. The Course E-Commerce page provides links to Enable/Disable Course and Club E-Commerce, which permits the selection of e-commerce options for charging fees for the courses or clubs, allow administrators to set prices and allows club leaders or instructors to set prices, and a Price Course link to manage or set the cost of enrolling in courses or organizations.

Other Utilities and Functions

One of the key elements to college and university life is the ability to socialize and take advantage of the human element on campus. The system's "Community" tab 2502 provides the web page 2500 shown in FIG. 25, which allows students to interact and be involved in all aspects of campus life from fraternities and sororities to off-campus communities that enhance the learning experience. Many campuses also provide rich services such as job availability through the community function. The Community center is the web equivalent of the student union building.

Most students are so conversant in on-line services that they prefer to have all campus administrative services available on the web. The system provides an enterprise level teaching and learning system that allows tight integration into student information systems and other campus systems to provide anytime, anywhere administrative services. The Services web page 2600 shown in FIG. 26, selected by tab 2602, enables users to register, add, drop, check records, or even pay parking tickets while on-line at anytime.

Figure 27:
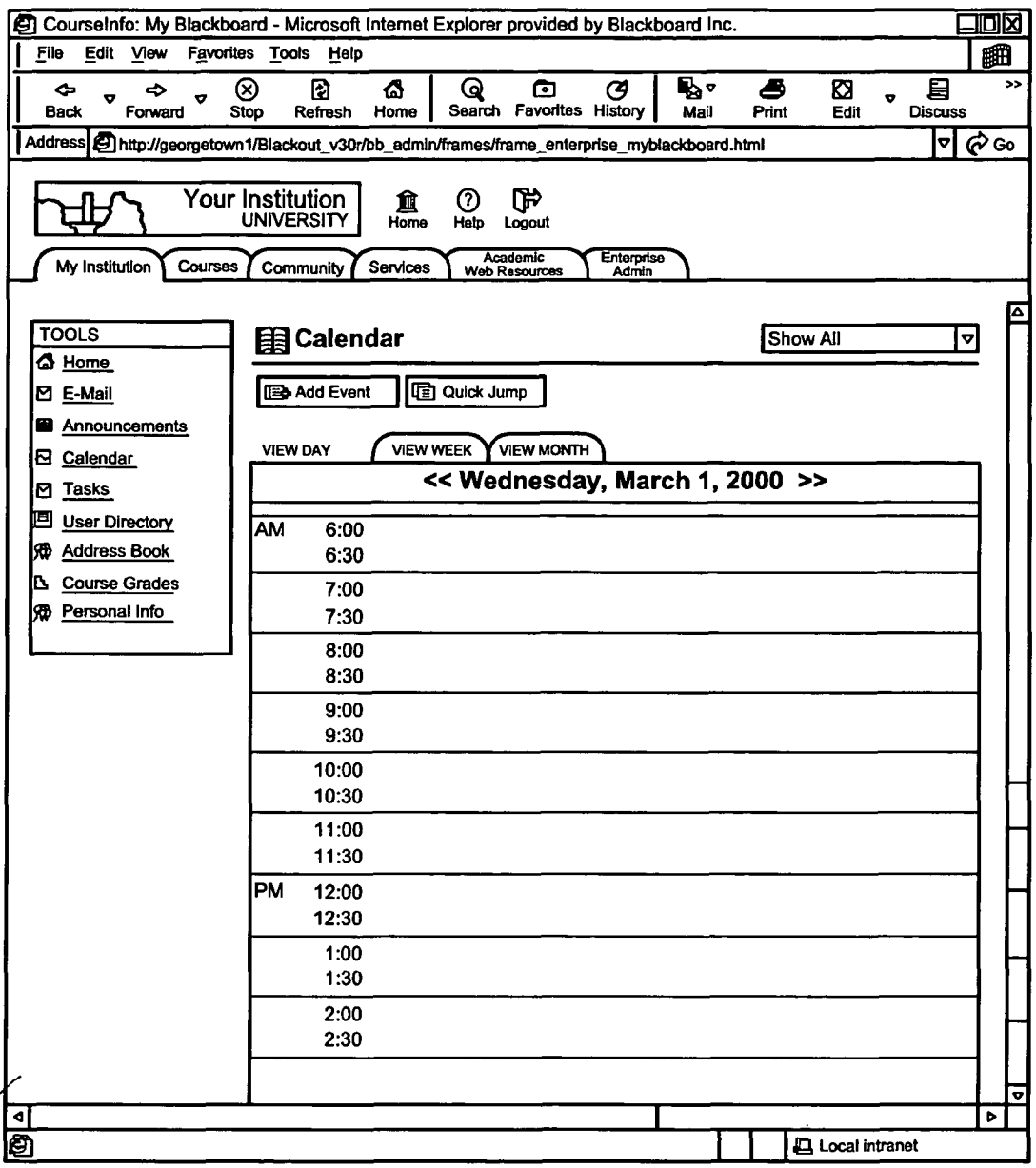
FIG. 27 is a screen shot of a calendar web page according to the present invention.

The system also provides a calendar 2700 that incorporates personal as well as institutional information in a single view, as shown in FIG. 27. The calendar utility gives students and teachers access to all calendar events for each of the courses they are enrolled in, as well as institutional calendar events.

Figure 28:
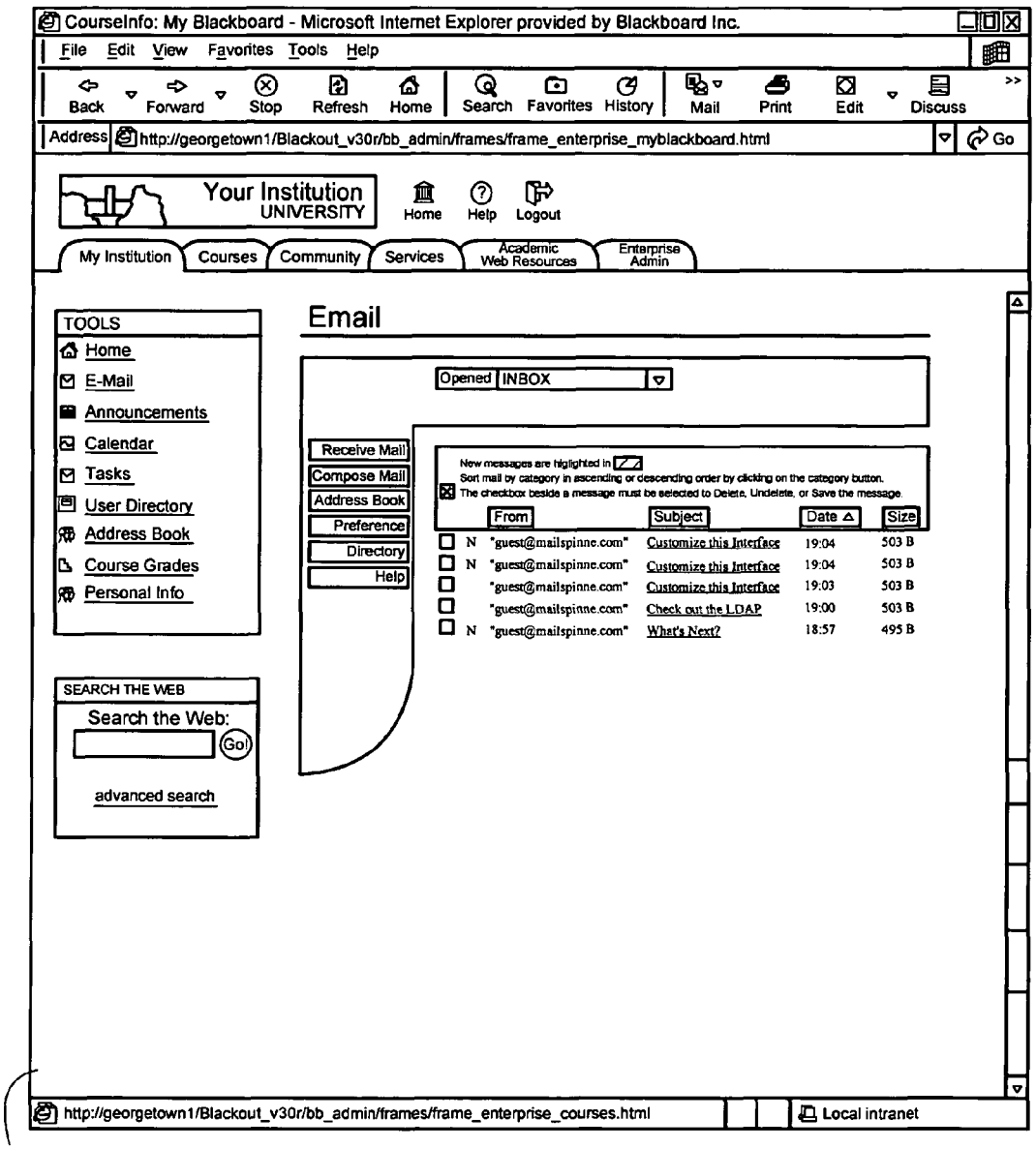
FIG. 28 is a screen shot of an email web page according to the present invention.

Since email is the single most popular application on the Internet today, and the leading reason that most people purchase personal computers, email has been integrated with the system, as shown by the web page 2800 in FIG. 28. Within a personalized home page, the user will be able to access complete email capabilities. The email system sits on top of the existing POP or IMAP server and offers a web-based front end so that the user may access messages from any machine at any time.

Figure 31:
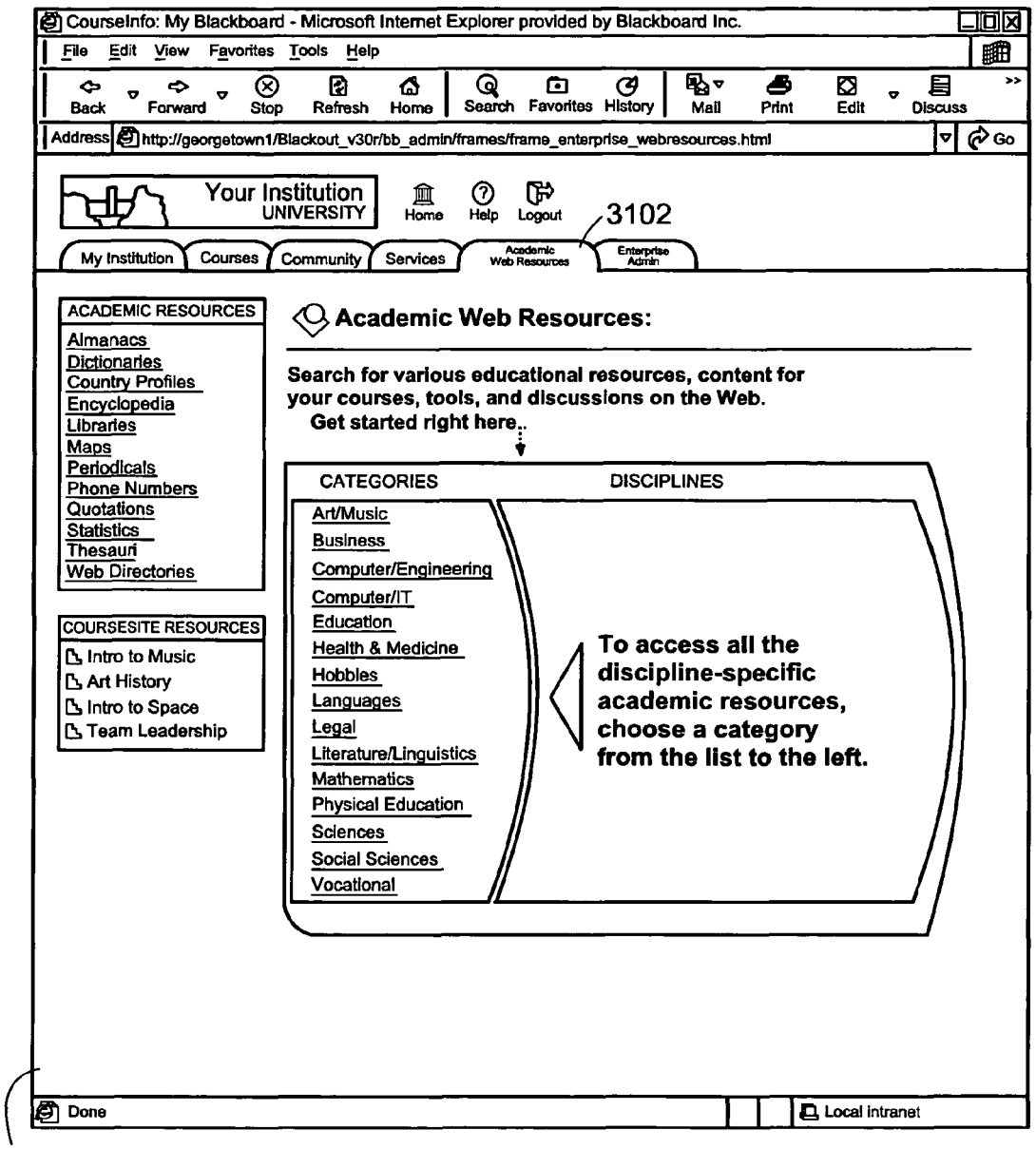
FIG. 31 is a screen shot of a web resource web page according to the present invention.
Figure 32:
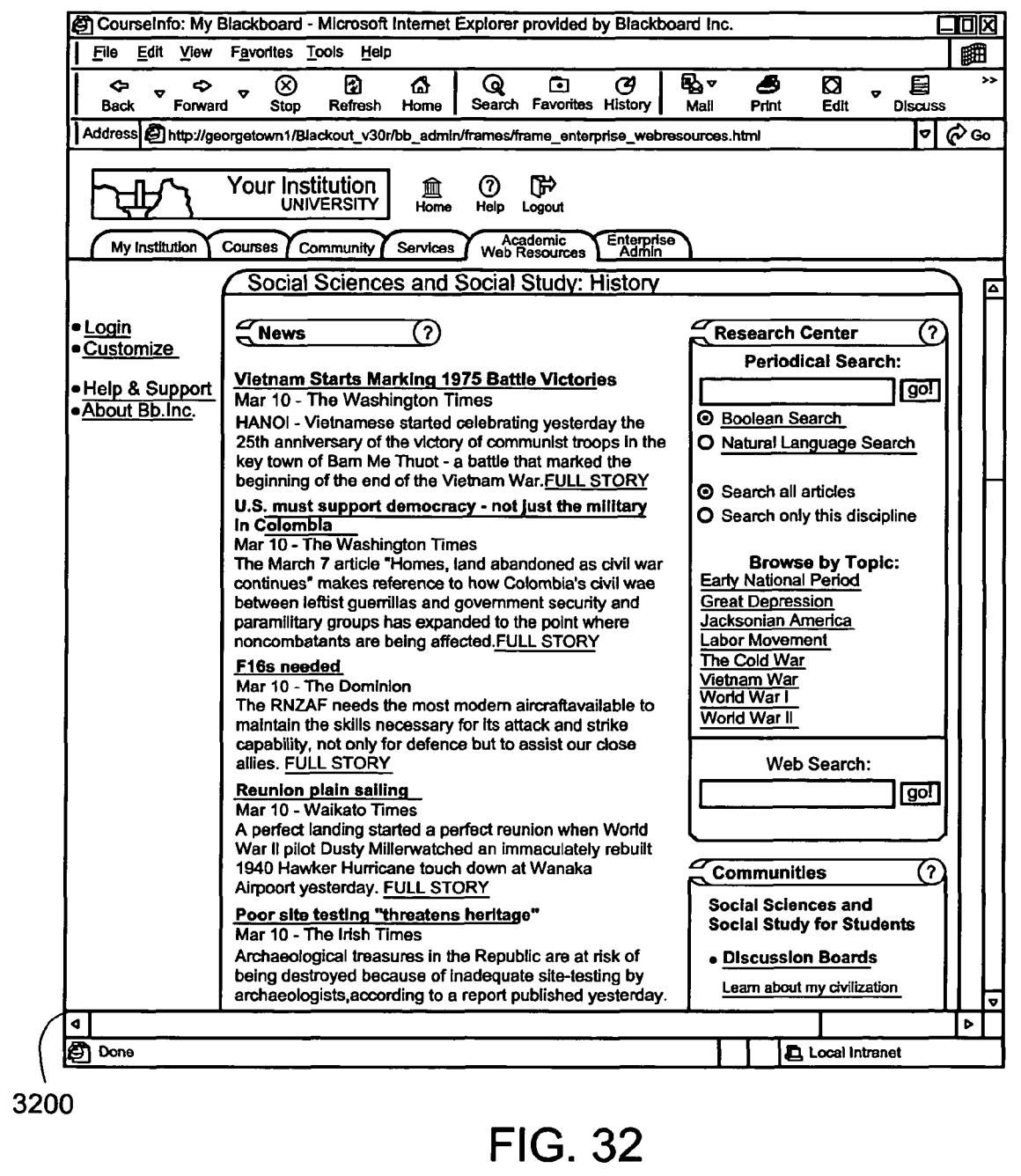

FIGS. 31 and 32 show web pages 3100 and 3200 that can be accessed by tab 3102 to provide links that allow students and teachers to find and access academic resources and content. These resources are also context-sensitive to the course discipline. For example, if one accesses the academic web resources from an accounting course, he/she is automatically directed to news and information sources that are relevant to accounting. The user has access to news, web links, reference works, and search engines that enhance the ability to locate relevant information quickly.

In another aspect of the invention, provided is a system and method for applying E-commerce to education. Specifically, this aspect of the invention allows users visiting a web site to register and pay for courses provided by a college, university, or other institution.

FIG. 34 is a diagram illustrating information passed from a course registration server to a payment server. As a current or prospective student reviews courses offered by a college, university, or other institution, a student may add courses of interest to a list, or "shopping cart".

When a student has selected courses for which they would like to register, a student may proceed from a registration or review area (Block 100) to a "checkout" area (Block 110), as illustrated in FIG. 34. When a student proceeds to a checkout, information, such as, but not limited to, name, address, cost of courses, order identifier, order description, and a page to which a user is to be returned when an order is complete, is passed on. Information passed from a registration or review area may be used to generate a payment form.

FIG. 35 at 205 shows a sample of a payment form. A payment form may consist of an introductory paragraph 210, a purchase summary 220, and a payment information area 230. An introductory paragraph 210 may be used to instruct a student in requirements at each stage of the payment process. A purchase summary 220 may include services and products selected, per-unit prices, quantities requested, inventory numbers for each product or service selected, an invoice or purchase number, a total price, and other, similar information.

A payment information area 230 can be used to collect payment information from a student. A student may be required to enter some information manually, such as, but not limited to, credit card type, credit card number, credit card expiration date, name on credit card, credit card billing address, check number, checking account number, bank routing number, debit card number, and personal identification number ("PIN code").

If a student has previously used the present invention, some information may be automatically entered based on previously submitted forms. Information transferred from a registration server may also be used to fill in some form fields. When a student has reviewed entered information, a form may be submitted for processing by activating a button or other interface element.

Figure 36:
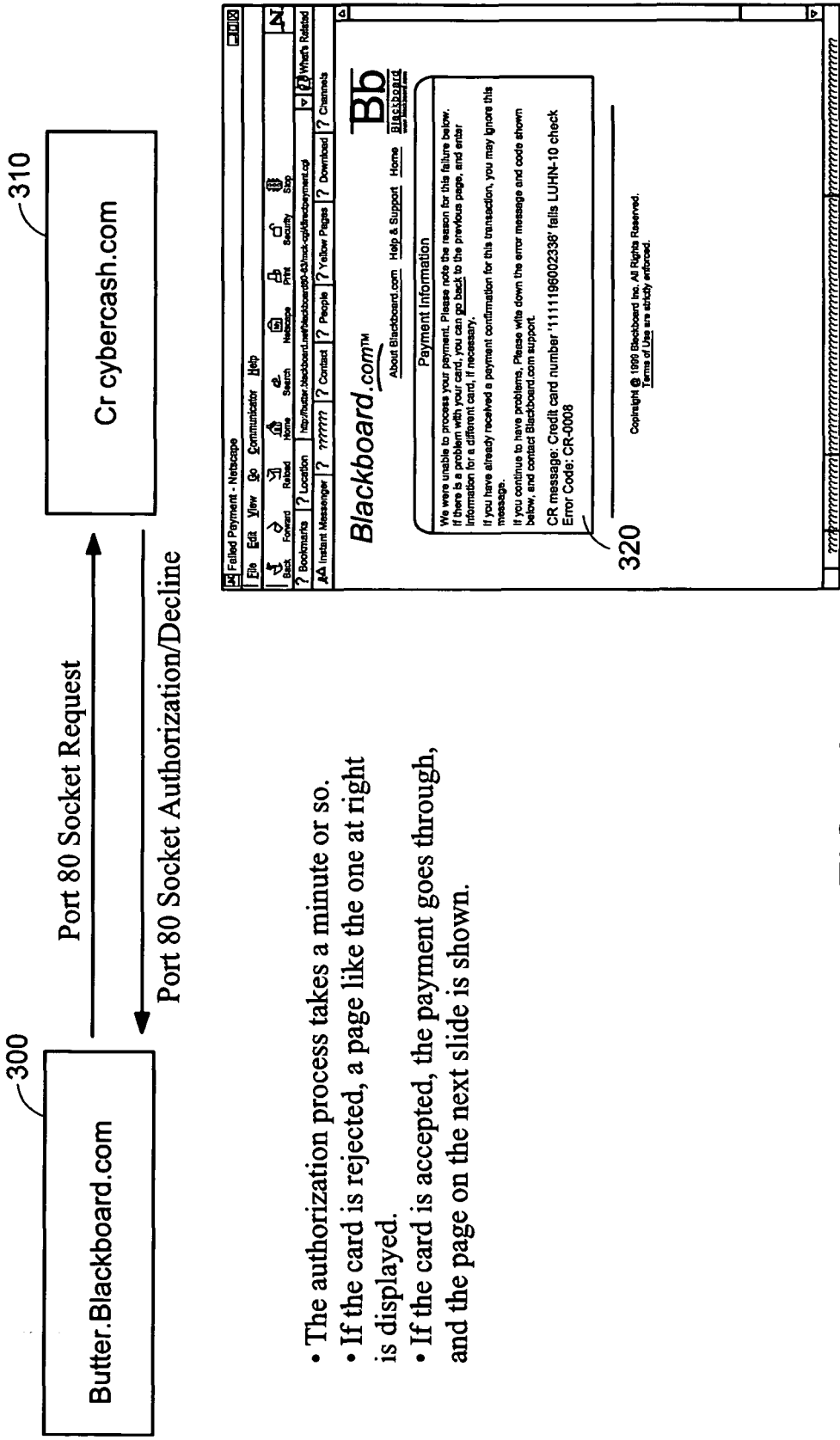
FIG. 36 is a diagram showing the interaction between a payment server and a payment validation server according to the present invention.

FIG. 36 at 3600 shows a block diagram illustrating interaction between a payment server and a payment validation server. After a student has entered necessary information into a payment form and submitted the form (Block 300), some information, such as, but not limited to, amount of purchase, credit card number, name on credit card, check number, bank routing number, or billing address, may be transmitted to a payment validation server (Block 310). A payment validation server may be maintained as part of the present invention, or payment validation servers may be maintained by one or more third parties, such as, but not limited to, CyberCash, Inc.

A payment validation server processes transmitted information, contacts a bank or other institution issuing the credit card or other payment form, and verifies that a payment of the amount requested is authorized. If payment of the requested amount is authorized, authorization information, including, but not limited to, a confirmation number, may be transmitted to a payment server. If payment of the specified amount is not authorized, other information, such as a declination code, may be transmitted to a payment server. If payment is not authorized, a payment error message similar to that shown at 320 may be displayed. FIG. 37 at 3700 shows a sample of a payment information page. A student may print or otherwise record information displayed on a payment information page for his or her records. A payment information page can include a thank you, confirmation, or other message as shown at 3702. A payment information page may also include information such as, but not limited to, confirmation or declination information; goods, services, and classes purchased; and total price charged as shown at 3704. In addition, a payment information page may include a button or other interface element which a user can activate to continue processing. The exact behavior of this interface element may be determined by the referring system through the URL or other data element which is illustrated in FIG. 34.

FIG. 38 at 3800 shows a block diagram illustrating post-order processing. As previously stated, a payment information page may also contain a button or other interface element which, when activated, causes a web page to be displayed or performs other processing steps. Activating the button or interface element may also cause some authorization/declination information to be transferred to a college, university, or other institution's accounting department for processing as shown at 3802.

Open Web Environment

The present invention may be used as an open platform environment, where anyone with access to the Internet may register as an instructor to create, administer, and make available a course to anyone else with Internet access. Thus, by entering a publicly available web-site such as www.blackboard.com, a user may register as an instructor and be provided with an instructor control panel for creating course as described herein. To create the course, the user will define course parameters, such as a description, enrollment options, announcements, assessments, and course materials, etc., and provide them in the various web pages as described above. The user can then let others know about the availability of the course on-line, and a potential student may access the publicly available web site to enroll in the course. In this manner, anyone can create a virtual classroom without the need to be affiliated with an institution, and disseminate knowledge through the course as previously unavailable.

Implementing Multiple Locales in a Course Management System

The multi-language (ML) embodiment of the present invention provides an interactive system and method that may be used by system users at various levels for distributing and using information over a network such that it is readily adaptable for more than one language. This embodiment may be implemented through the system shown, for example, in FIG. 1B. The ML feature, or embodiment, of the present invention can be used in various settings, such as the delivery of academic course work and/or corporate training. The system and method accommodate system users such that users at different levels will have different types of system access and control, particularly in the context of the multi-language capabilities and/or functionality.

In particular, the ML embodiment of the present invention can utilize two or more languages in conjunction, for example, with recognizing and displaying multiple locales at run-time. As used herein, a "locale" can include, for example, a collection of translated text (e.g., English to Italian) and/or text formats (e.g., currency, numeric formats, dates) that are used to display the text of an application. The locale can be specified by a user, a course instructor, and/or a system administrator.

Figure 39:
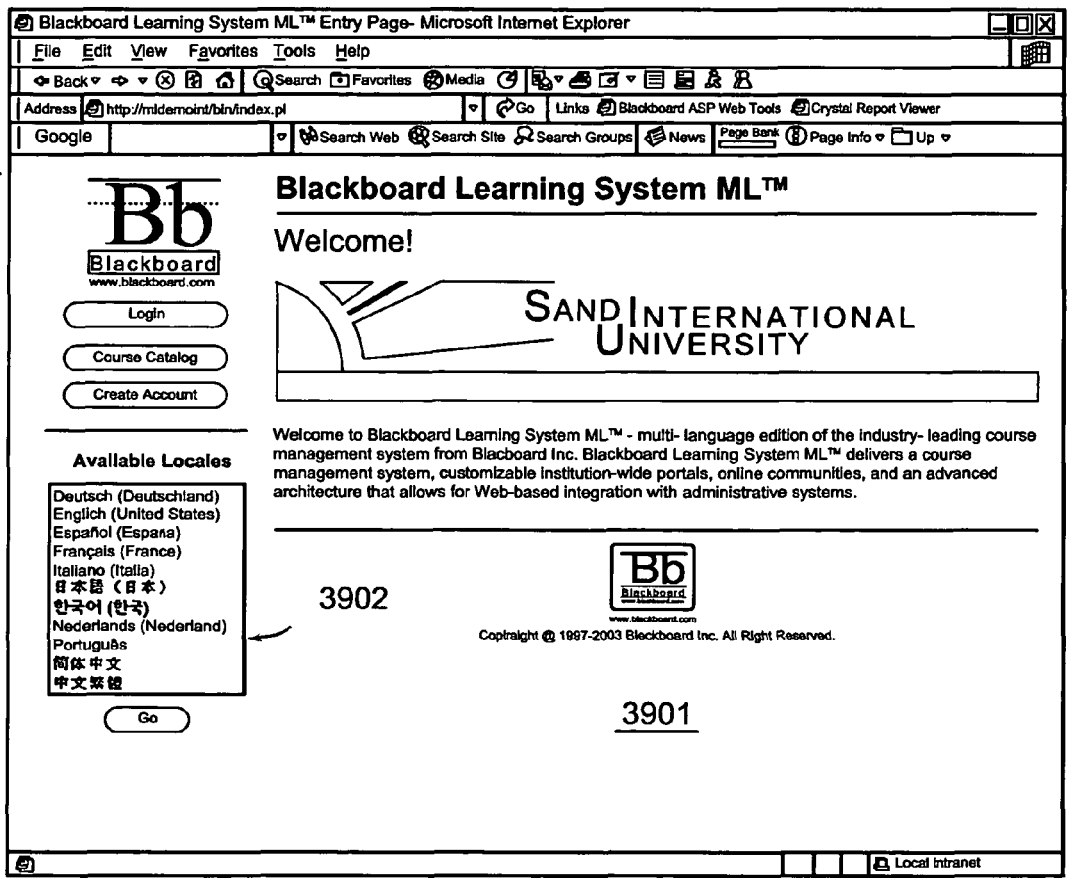
FIG. 39 shows an exemplary user interface according to the present invention.

Turning now to FIG. 39, an exemplary gateway screen display is shown that can facilitate the use of various locales. When a user types in or selects a URL in address field 3904, server 1040 (FIG. 1B) determines which locale to display by, for example, examining HTTP headers and/or one or more cookies from a web browser 1008. For example, the HTTP header <html><head><meta HTTP-EQUIV="content-type" CONTENT="text/html; charset=UTF-8" can be used to invoke the UTF-8 character set in a user's browser 1008. The UTF-8 charset set is representative of an encoding of International Standards Organization/International Electrotechnical Commission (ISO/IEC) 10646, using a different number of bytes for different characters. ISO/IEC 10646-1 (1993), ISO/IEC 10646-1 (2000), and ISO/IEC 10646-2 (2001) are incorporated herein by reference. The following exemplary header <META HTTP-EQUIV="Content-Language"

CONTENT="en-GB"> sent by browser 1008 can cause server 1040 to select an appropriate natural language document. In this case, the CONTENT="en-GB" indicates that the natural language is English, and that the dialect is British.

As indicated by the header(s), the Unicode Standard can be used for character encoding. The Unicode Standard, Version 4.0.0, defined by: The Unicode Standard, Version 4.0 (Reading, Mass., Addison-Wesley, 2003. ISBN 0-321-18578-1), is incorporated herein by reference. The basic encoding scheme is called Universal Character Set-2 (UCS-2), which stores each character as a 16-bit value. This 16-bit value corresponds directly to its value in the Unicode Standard. Universal Transformation Format-8 (UTF-8) is a format that breaks Unicode values into 8-bit sequences that work well on the WWW. UTF-8 is supported by Internet Explorer (Microsoft Corp., Redmond, Wash.) and Netscape Communicator (AOL-Time Warner Inc., New York, N.Y.).

Referring again to FIG. 1B, in an embodiment of the invention, user interface 1008, which may be a browser, can utilize UTF-8, and database 1020 and/or database 1052 can utilize UTF-8 or UCS-2. In an embodiment of the present invention, the UTF-8 and UCS-2 encoding can be facilitated by the underlying relational database technologies (e.g., database 1020). Microsoft SQL Server and/or Oracle databases can be utilized. Data structures which are to store locale-dependent data should be encoded using the proper encoding supported by the particular database 1020 utilized.

If the selected locale matches an available locale made available, for example, by server 1040, that locale is used to display the gateway page 3901. The list of installed locales 3902 is displayed on gateway page 3901, using the negotiated locale. Exemplary pseudo-code that can be used to implement the gateway negotiation is as follows:

Locale=GetBrowserLocale( )
    If Locale !=null
        SetSessionLocale(Locale)
    Else
        SetSessionLocale(SystemDefaultLocale)

In the above pseudo-code, the browser locale will be obtained. If the browser locale is identified (or specified), then the obtained browser locale is used as the session locale. If a browser locale is not identified, then a system default locale can be used.

FIG. 40 shows an exemplary screen display 4000 that demonstrates how a system administrator can specify a default locale. Locales 3902 are displayed with corresponding locale codes 4004. Column 4002 allows the administrator select a locale as the default locale. Column 4006 can be selected to determine whether the default locale selected is allowed for users. For example, if locale 4) François (France) was not checked, the Francais (France) locale would not appear in locale display 4102. Similarly, column 4008 can be selected to determine whether the default locale selected is allowed for course use. For example, if locale 7) Español (España) was not checked, courses being offered taught could not utilize the Español (España) locale.

Figure 41:
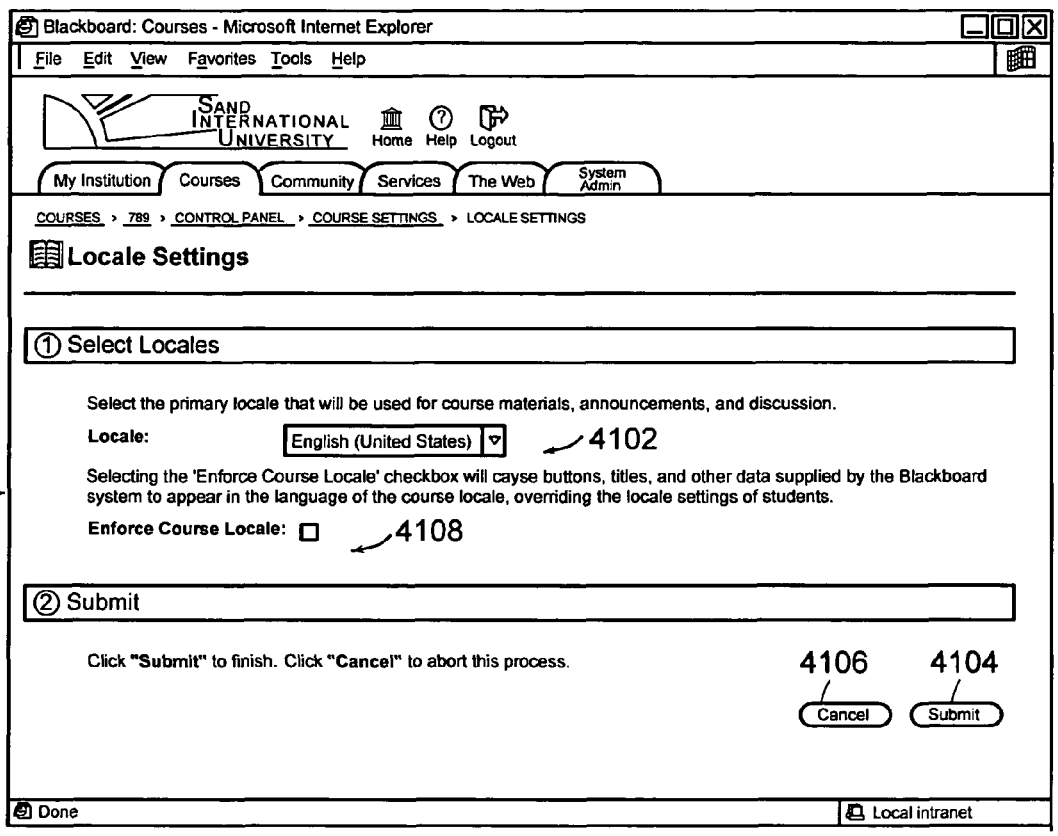
FIG. 41 shows an exemplary screen display directed to how a system administrator and/or course instructor and/or other individual having privileges can specify a course locale according to the present invention.

FIG. 41 shows an exemplary screen display 4100 that demonstrates how, for example, a system administrator and/or course instructor and/or other individual having privileges can specify a course locale. Pulldown menu 4102 can be used to select the course locale. The pulldown menu will include those locales that have been checked in column 4008 (FIG. 40). Once the desired locale has been selected, the instructor, administrator, or other authorized user, can select, using, for example, a conventional mouse, the Submit icon 4104 to invoke the locale. The Cancel icon 4106 can be selected, for example, to return to the previous menu. Box 4108 can be checked to make the locale mandatory, in which case the course menu frame 4206, and navigation frame 4204 will be displayed in the selected locale, as will be described subsequently.

Figure 42:
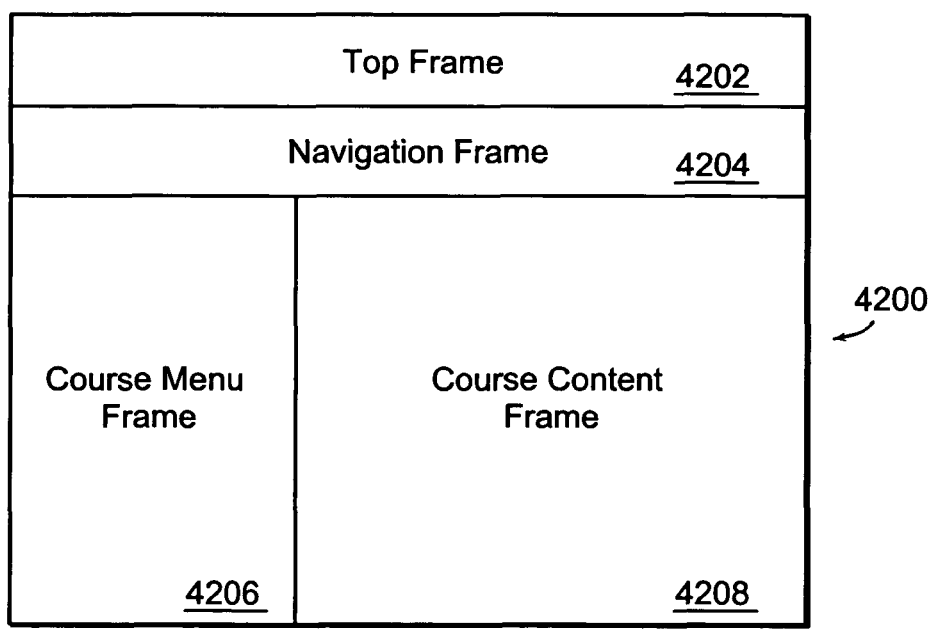
FIG. 42 shows an exemplary browser display environment according to the present invention.

An exemplary browser display environment 4200 that can be used in connection with a locale is shown in FIG. 42. The browser display environment can include a top frame 4202, a navigation frame 4204, a course frame menu 4206, and a course content frame 4208. Top frame 4202 may include, for example, the File, Edit, View, Favorites, Tools, and Help selections, as well as, for example, Back, Forward, Stop, Refresh, Home, Search, Favorites, Media, History, Mail, Print, and/or Edit icons that typically appear on conventional web browsers. Top frame 4202 can also include, for example, a location (or address) bar, where a user can type in the location, e.g., a URL of a desired web-site. A Go icon, for example, can then be pressed or selected to go to the web-site. Top frame 4202 can also optionally include various WWW search tools.

Course menu frame 4206 can include various course related icons, such as: Announcements, Course Information, Course Documents, Assignments, and the like. Finally, course content frame 4208 can display information associated with a selected icon from the course menu frame 4206. Navigation frame 4204 can be used to display the current course.

Figure 43:
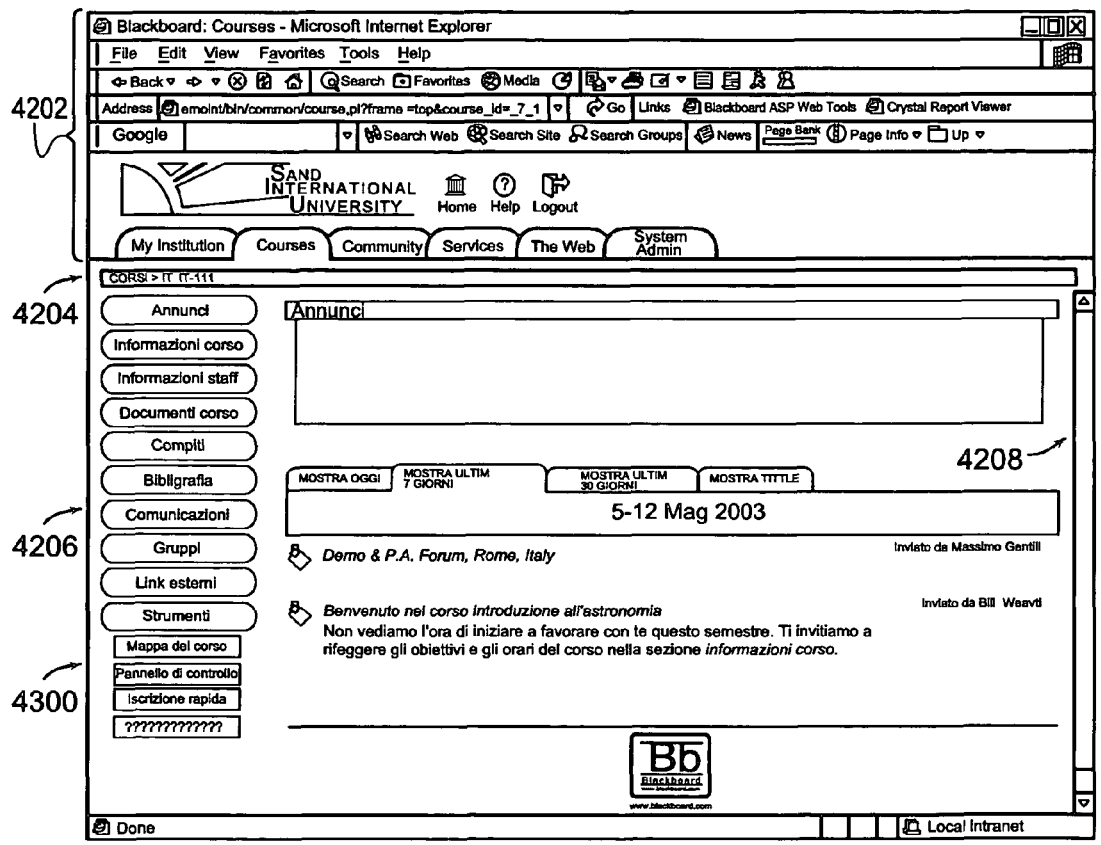
FIG. 43 shows a first exemplary course navigation screen display with a mandatory locale according to the present invention.

FIG. 43 at 4300 shows an exemplary screen display of an offered course. An exemplary top frame 4202, navigation frame 4204, course menu frame 4206 and course content frame 4208 are shown. In FIG. 43, the associated Enforce Course Locale: box 4108 (FIG. 41) has been checked, as indicated by navigation frame 4204, course menu frame 4206 and course content frame 4208, each of which are displayed in the selected locale, in this case, Italian. The user's selected locale, in this case, English, for navigation frame 4204 and course menu frame 4406 has been overridden, but remains for top frame 4202.

In an embodiment of the present invention, course content frame 4208 (FIG. 42) can include material that does not conform with the selected locale. In this embodiment, no translation, e.g., English to Italian, is performed for material submitted for course content frame 4208. This advantageously allows, for example, a course instructor to provide material that can be displayed in course content frame 4208 that is not of the selected locale (e.g., Italian). That is, an instructor can provide course material in Italian in course content frame 4208, as well as material in one or more languages other than Italian.

Figure 44:
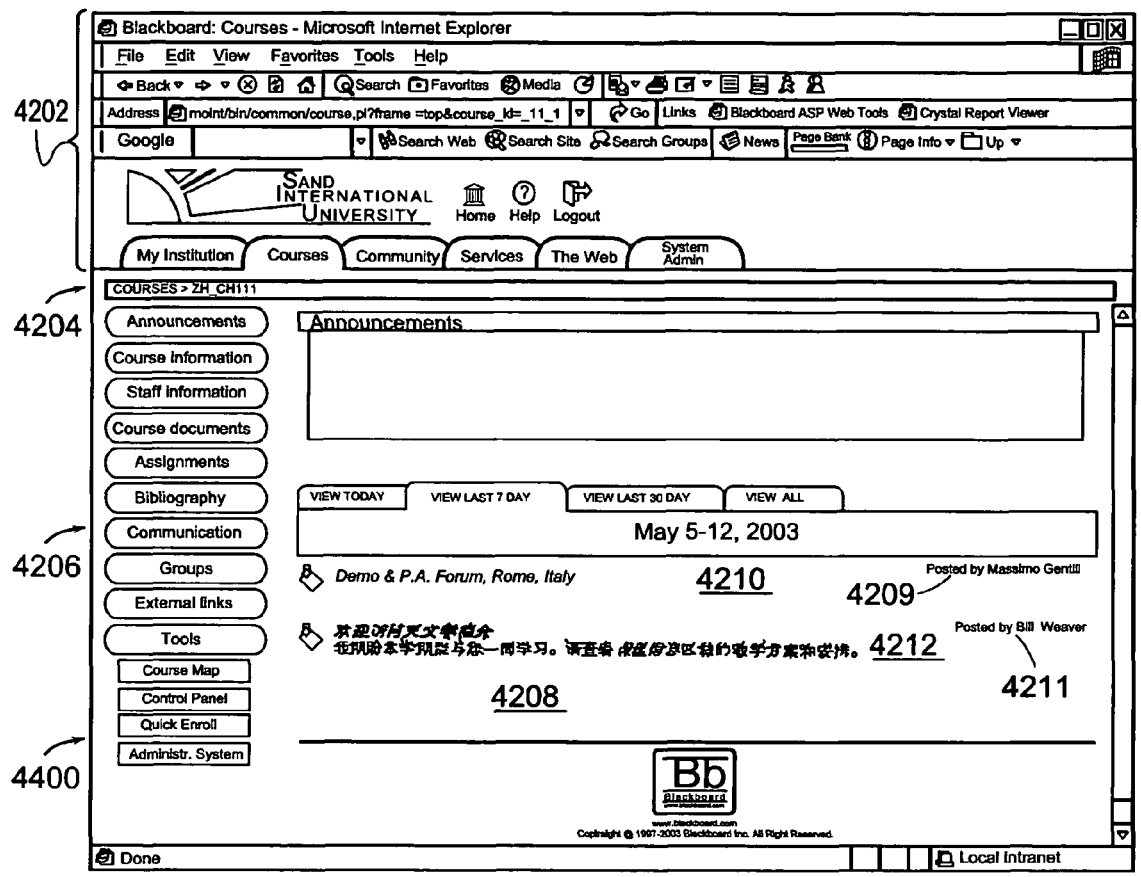
FIG. 44 shows a second exemplary course navigation screen display without a mandatory locale in-part with a multiple language according to the present invention.

FIG. 44 at 4400 shows an exemplary screen display of an offered course. Top frame 4202, navigation frame 4204, course menu frame 4206 and course content frame 4208 are shown. In FIG. 44, the associated Enforce Course Locale: box 4108 has been not been checked, which causes the navigation frame 4204 and course menu frame 4206 to be displayed in the user's default locale, in this case, English. Top frame 4202 is also displayed in the user's default locale. If a user clicks on Announcements in course menu frame 4206, a first person 4209 can post material 4210 in Italian, and a second person 4211 can post material 4212, for example, in Chinese. Other people can post other material in one or more languages of their choice.

Figure 45:
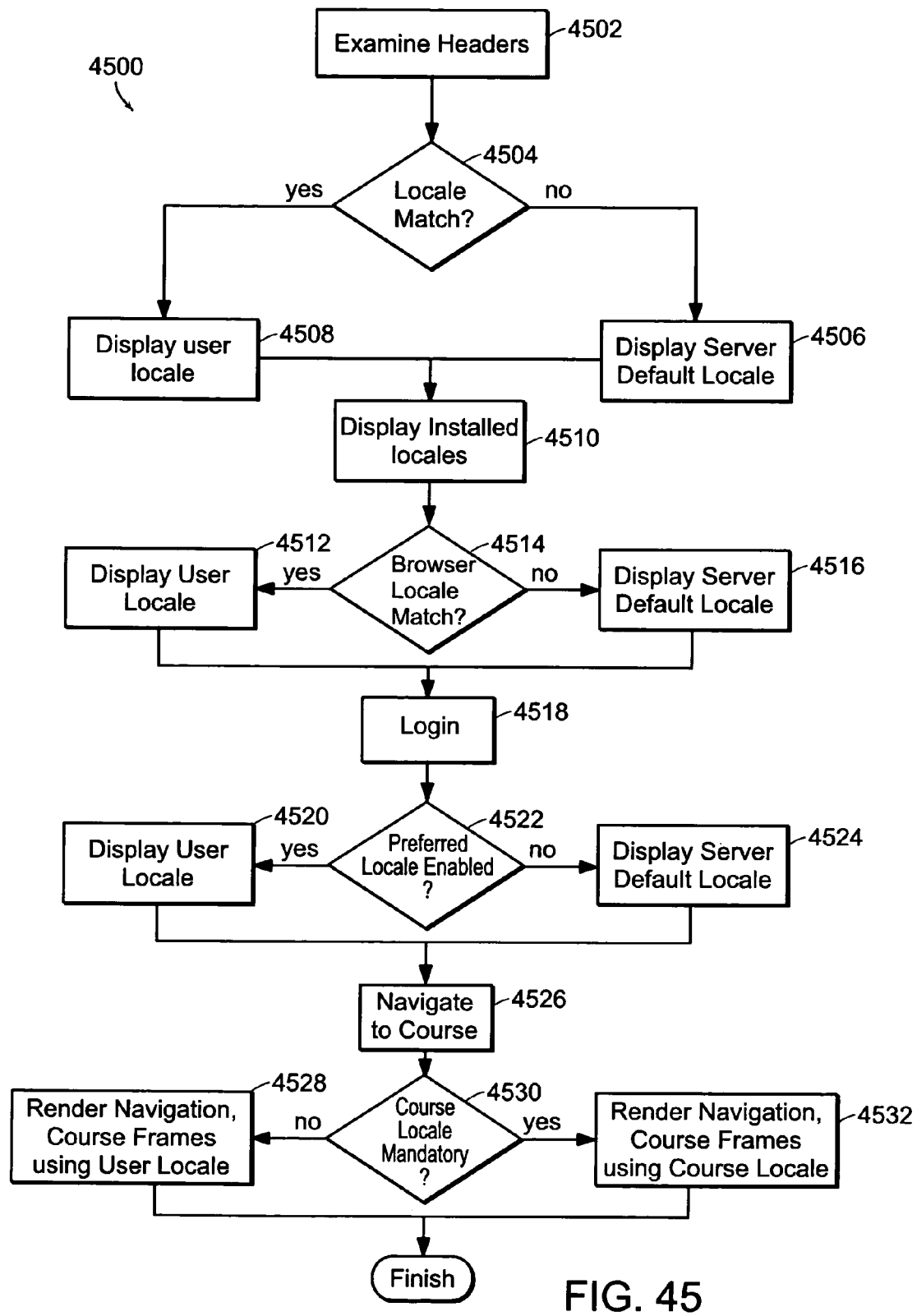
FIG. 45 shows an exemplary flow diagram for effecting multiple language use according with the present invention.

FIG. 45 at 4500 shows an exemplary method of operation of a ML embodiment of the present invention. At step 4502, server 1040 can examine headers contained of a browser transmission to determine if the server 1040 supports the specified locale in the header. If, at decision step 4504, it is determined that the locales match, then the gateway screen (FIG. 41) is displayed in the locale specified in the header at step 4508. If the locales do not match, then server 1040 can display a default locale on browser 1008 at step 4506.

At step 4510, the list of installed locales (FIG. 39, 3902) is displayed on the gateway page, using the locale negotiated at decision step 4504. When the user selects a locale from list 3902, at decision step 4514 a determination is made to verify that browser 1008 supports the selected locale. If browser 1008 supports the selected locale, the user-selected locale is displayed at 4512. If browser 1008 does not support the specified locale, the server 1040 default locale can be utilized at 4516. A login screen can be displayed with the newly specified or system default locale, as determined at decision step 4514.

At step 4518, the user can login to server 1040 which, at decision step 4522, determines the locale for the user logging on. If available, the user's preferred locale is displayed at step 4520. The user's preferred locale can be the same as the locale negotiated at decision step 4514. If the user's preferred locale is not available, the server 1040 default locale can be displayed at step 4524 which can be the same locale as provided in step 4516.

At step 4526, a user navigates to a course. Server 1040 can determine the locale configured for the course. An instructor, for example, may select a locale for the course that is allowed by the administrator, as discussed with regard to FIG. 40. Additionally, an instructor, for example, can check the Enforce Locale Box: 4108 (FIG. 41) to enforce the locale selected for the course.

At decision step 4530, a determination is made whether the course locale is mandatory. If the course locale is enforced, at step 4532 the course frames, e.g., navigation frame 4204, course menu frame 4206, can be displayed in the locale specified for the course, overriding any user-specified locale. In an embodiment, when the course locale is enforced, course content frame 4208 can also be displayed in the locale specified for the course. Course content frame 4208 can also be left to display any material supplied by, for example, an instructor, which may differ from the locale specified for the course. If the course locale is not enforced, at step 4528 the course frames, e.g., navigation frame 4204, course menu frame 4206, can be displayed in the user-specified locale as specified, for example, in an HTTP header from the user's browser 4008 that is transmitted to server 4040. In the alternative, server 4040 can return a default locale if, for example, server 4040 does not support the user-specified locale in the HTTP header While the preferred embodiment and various alternative embodiments of the invention have been disclosed and described in detail herein, it may be apparent to those skilled in the art that various changes in form and detail may be made therein without departing from the spirit and scope thereof. In addition, titles and descriptions included in the Figures are included to disclose the best mode contemplated by the inventor at the time of filing, and should not be construed as limiting the invention.

What is claimed is:

1. A method for providing data to a web browser, comprising the steps of:
    generating the data which includes a display region having associated content;
    determining if a pre-selected locale is mandatory;
    if the pre-selected locale is mandatory, formatting at least a portion of the associated content according to the pre-selected locale when generating the data;
    if the pre-selected locale is not mandatory:
        identifying a user-selected locale, and
        formatting at least a portion of the associated content according to the user-selected locale when generating the data; and
    transmitting the data to the web browser of a computer.

2. The method of claim 1, wherein the data and the pre-selected locale are related to a course.

3. The method of claim 2, wherein the step of generating the data further includes the step of:
    receiving from a memory store one or more objects associated with the course.

4. The method of claim 2, wherein the pre-selected locale is set by an instructor or administrator of the course.

5. The method of claim 1, wherein the data includes a plurality of display regions, each having respective, associated content.

6. The method of claim 5, further comprising the step of:
    formatting at least a portion of the associated content for every display region according to the user-selected locale when generating the data.

7. The method of claim 5, further comprising the step of:
    formatting at least a portion of the associated content for every display region according to the pre-selected locale when generating the data.

8. The method of claim 5, further comprising the steps of:
    formatting the associated content of one display region according to the user-selected locale and formatting the associated content of another display region according to the pre-selected locale, when generating the data.

9. The method of claim 1, further comprising the step of:
    determining whether the user selected locale is supported;
    if the user-selected locale is not supported then, formatting the associated content according to a default locale when generating the data.

10. The method of claim 1, further comprising the step of:
    receiving the user-selected locale from the web browser.

11. A method of providing course materials via a network comprising the steps of:
    receiving a request for content associated with a course;
    if the course has an associated mandatory pre-selected locale, then formatting, according to the pre-specified locale, at least a first portion of the content for display in a web browser;
    if the course does not have an associated mandatory pre-selected locale, then formatting, according to a user-specified locale, at least a first portion of the content for display in the web browser; and
    transmitting the content to the web browser of a computer.

12. The method of claim 11, wherein the request includes the user-specified locale.

13. The method of claim 11, wherein the respective conditional steps of formatting, further include the step of:
    translating the first portion of the content from a first language to a second language, the second language identified by either the pre-selected locale or the user specified locale, respectively.

14. The method of claim 11, wherein the respective conditional steps of formatting, further include the step of:
    selecting the first portion formatted according to the pre-selected or user selected locale, respectively, from among a plurality of differently formatted data.

15. The method of claim 11, further comprising the step of:
    associating the mandatory pre-selected locale with the course.

16. A system for providing data to a web browser, the system comprising:
a computer-accessible memory configured to store a plurality of objects;
a receiver configured to receive a request for a set of one or more of the plurality of objects;
a data generator configured to generate data based on the set of objects; wherein when generating the data, the data generator is further configured to:
determine if a pre-specified locale is mandatory;
if the pre-specified locale is mandatory, retrieve and format at least one member of the set of objects according to a pre-specified format, and
if the pre-specified locale is not mandatory, retrieve and format at least one member of the set of objects according to a user-specified format; and
a transmitter configured to transmit the data to the web browser.

17. The system of claim 16, wherein a user-specified locale is received from the web browser.

18. The system of claim 16, wherein the plurality of objects are related to a course.

19. The system of claim 18, wherein the pre-specified locale is set by an instructor or administrator of the course and is associated with the course.

20. The system of claim 19, wherein at least a portion of the respective associated content for every display region is formatted according to the pre-specified locale.

21. The system of claim 19, wherein at least a portion of the respective associated content for every display region is formatted according to a user-specified locale.

22. The system of claim 19, wherein the respective associated content for one display region is formatted according to a user-specified locale and the respective associated content for another display region if formatted according to the pre-specified locale.

23. The system of claim 16, wherein the data comprises a plurality of display regions, each having respective, associated content.

24. A system comprising:
a plurality of objects associated with a course; and
a pre-specified locale associated with the course, wherein the pre-specified locale has associated therewith an attribute identifying the pre-specified locale as mandatory or elective,
wherein the plurality of objects and the pre-specified locale are stored in a computer-accessible memory.

25. The system of claim 24, wherein the pre-specified locale and attribute are set by an instructor or administrator of the course.

26. The system of claim 24, further comprising:
a plurality of available locales and wherein the pre-specified locale is limited to being one of the available locales.

27. The system of claim 24, wherein one or more of the objects are formatted according to a locale different than the pre-specified locale.

28. The system of claim 24, wherein the pre-specified locale identifies a particular language.

29. The system of claim 24, wherein the pre-specified locale identifies a format for numbers.

30. The system of claim 24, wherein the pre-specified locale identifies a character-set.

31. The system of claim 24, wherein the pre-specified locale identifies a preferred spelling of one or more words.

32. The system of claim 24, wherein the pre-specified locale identifies a format for currency values.

33. The system of claim 24, wherein the pre-specified locale identifies at least a combination of two or more of the following: a language, a format for numbers, a format for currency values, one or more a preferred spelling rules, a character-set.

34. A non-transitory computer readable medium bearing instructions for providing data to a web browser, said instructions being arranged to cause one or more processors upon execution thereof to perform the steps of:
generating the data which includes a display region with associated content;
determining if a pre-selected locale is mandatory;
if the pre-selected locale is mandatory; formatting at least a portion of the associated content according to the pre-selected locale when generating the data;
if the pre-selected locale is not mandatory:
identifying a user-selected locale, and
formatting at least a portion of the associated content according to the user-selected locale when generating the data; and
transmitting the data to the web browser.

35. The non-transitory computer readable medium of claim 34, wherein the request is received from the web browser.

36. The non-transitory computer readable medium of claim 34, wherein the request includes the user-specified locale.

37. A non-transitory computer readable medium bearing instructions for providing course material via a network, said instructions being arranged to cause one or more processors upon execution thereof to perform the steps of:
receiving a request for content associated with a course and the course having a pre-specified locale associated therewith;
if the pre-selected locale is mandatory, then formatting at least a first portion of the content for display in a web browser according to the pre-specified locale;
if the pre-selected locale is not mandatory, then formatting at least a first portion of the content for display in the web browser according to the user-specified locale; and
transmitting the content to the web browser.

38. A method of providing course material for a course to a web browser, comprising the steps of:
receiving a request for content associated with the course;
determining whether the course has an associated mandatory pre-specified locale;
when the determination indicates that the course has an associated mandatory pre-specified locale, and at least a first portion of the content is not in a language or format based on the associated mandatory pre-specified locale, translating the at least a first portion of the content for display in the web browser from a first language to a second language based on the mandatory pre-specified locale, or a first format to a second format based on the mandatory pre-specified locale;
when the determination indicates that the course does not have an associated mandatory pre-specified locale, translating the at least a first portion of the content for display in the web browser from the first language to the second language based on the user-specified locale, or the first format to the second format based on the user-specified locale; and
transmitting the content to the web browser for display in the web browser,
wherein the pre-specified locale is specified by an instructor or administrator of the course, and
wherein the user-specified locale is specified by the user.

* * * * *